US010424227B1

(12) United States Patent
Valenti, Jr. et al.

(10) Patent No.: US 10,424,227 B1
(45) Date of Patent: Sep. 24, 2019

(54) LINERLESS MULTI-PART LABEL SYSTEMS

(71) Applicant: Chicago Tag & Label, Inc., Libertyville, IL (US)

(72) Inventors: F. Paul Valenti, Jr., Barrington, IL (US); Carl Opel, Carol Stream, IL (US); Daniel Hedger, Grayslake, IL (US)

(73) Assignee: Chicago Tab & Label Inc., Libertyville, IL (US)

( * ) Notice: Subject to any disclaimer, the term of this patent is extended or adjusted under 35 U.S.C. 154(b) by 0 days.

(21) Appl. No.: 16/191,036

(22) Filed: Nov. 14, 2018

Related U.S. Application Data

(63) Continuation-in-part of application No. 15/861,236, filed on Jan. 3, 2018, which is a continuation of application No. 15/785,969, filed on Oct. 17, 2017, now Pat. No. 10,140,892, which is a continuation-in-part of application No. 14/315,355, filed on Jun. 26, 2014, now Pat. No. 9,812,040, which is a continuation of application No. 13/869,052, filed on Apr. 24, 2013, now Pat. No. 8,784,598, which is a continuation of application No. 12/965,139, filed on Dec. 10, 2010, now abandoned, which is a continuation-in-part of application No. 12/951,232, filed on Nov. 22, 2010, now Pat. No. 8,142,596, application No. 16/191,036, which is a continuation-in-part of application No. 15/785,995, filed on Oct. 17, 2017, which is a continuation-in-part (Continued)

(51) Int. Cl.
*G09F 3/10* (2006.01)
*B32B 33/00* (2006.01)
*B32B 7/06* (2019.01)
*B32B 37/00* (2006.01)

(52) U.S. Cl.
CPC ............... *G09F 3/10* (2013.01); *B32B 7/06* (2013.01); *B32B 33/00* (2013.01); *B32B 37/025* (2013.01); *B32B 2519/00* (2013.01)

(58) Field of Classification Search
USPC ....... 156/196, 199, 202, 204, 217, 226, 227, 156/230, 238, 239, 240, 241, 247, 249, 156/257, 277, 289, 443, 475, 477.1, 478, 156/479, 480, 483, 515, 540, 541, 542, 156/556, 566, 580, 581, 583.8, DIG. 1, 156/DIG. 23, DIG. 33, DIG. 37, DIG. 42, 156/DIG. 5, DIG. 8
See application file for complete search history.

(56) References Cited

U.S. PATENT DOCUMENTS

| | | | |
|---|---|---|---|
| 4,255,220 A * | 3/1981 | Kucheck | B65C 9/1884 156/249 |
| 4,951,970 A * | 8/1990 | Burt | B31D 1/027 283/67 |

(Continued)

*Primary Examiner* — Sing P Chan
(74) *Attorney, Agent, or Firm* — Ice Miller LLP

(57) ABSTRACT

Multi-part label systems, and methods for their assembly. A linerless label roll separable into at least a first label and a second label is provided. The first label and second label are dispensed from the linerless label roll and applied to a surface simultaneously, whereby after application the underside of the first label is in contact with the surface and the undersurface of the second label is in contact with the top side of the first label.

19 Claims, 68 Drawing Sheets

Related U.S. Application Data of application No. 15/293,397, filed on Oct. 14, 2016, now Pat. No. 10,198,971.

(60) Provisional application No. 62/242,584, filed on Oct. 16, 2015.

(56) References Cited

U.S. PATENT DOCUMENTS

| | | | | |
|---|---|---|---|---|
| 5,337,663 | A * | 8/1994 | McKillip | B41N 1/24 101/127.1 |
| 5,376,217 | A * | 12/1994 | Janssen, Jr. | B32B 38/1833 156/361 |
| 5,413,384 | A * | 5/1995 | Principe | G09F 3/0288 206/831 |
| 5,520,629 | A * | 5/1996 | Heinecke | A61F 13/023 206/441 |
| 5,785,804 | A * | 7/1998 | Kovacs | B65B 43/465 156/216 |
| 5,840,657 | A * | 11/1998 | Mehta | G09F 3/10 504/280 |
| 6,035,568 | A * | 3/2000 | Grosskopf | B65D 23/003 40/630 |
| 6,305,717 | B1 * | 10/2001 | Chess | B42D 25/00 283/101 |
| 6,350,342 | B1 * | 2/2002 | Steidinger | B31D 1/021 156/239 |
| 6,378,588 | B1 * | 4/2002 | Nixon | B65C 9/08 156/217 |
| 6,451,149 | B1 * | 9/2002 | McKenney | B65C 9/0006 156/202 |
| 6,511,569 | B1 * | 1/2003 | Nixon | B65C 9/08 156/227 |
| 6,857,714 | B2 * | 2/2005 | Hohberger | B41J 3/4075 156/350 |
| 7,534,476 | B2 * | 5/2009 | Banks | G06K 19/041 283/81 |
| 7,762,302 | B2 * | 7/2010 | Dangami | B65C 9/1865 156/387 |
| 7,850,207 | B1 * | 12/2010 | Valenti, Jr. | G09F 3/0288 283/101 |
| 7,914,869 | B2 * | 3/2011 | Hodsdon | B32B 3/02 428/40.1 |
| 7,922,210 | B1 * | 4/2011 | Valenti, Jr. | B31D 1/021 156/277 |
| 8,142,596 | B1 * | 3/2012 | Valenti, Jr. | B65C 1/021 156/249 |
| 8,353,998 | B1 * | 1/2013 | Valenti, Jr. | B65C 1/021 156/249 |
| 8,784,598 | B1 * | 7/2014 | Valenti, Jr. | B65C 1/021 156/247 |
| 9,550,637 | B2 * | 1/2017 | DiNello | B65G 57/005 |
| 9,812,040 | B1 * | 11/2017 | Valenti, Jr. | B65C 1/021 |
| 2003/0127180 | A1 * | 7/2003 | Williams | G09F 3/0288 156/247 |
| 2005/0126701 | A1 * | 6/2005 | Hodsdon | G09F 3/0286 156/289 |

* cited by examiner

LINERLESS MULTI-PART LABEL SYSTEMS

RELATED APPLICATIONS

This application is:

(i) a continuation-in-part of U.S. application Ser. No. 15/861,236, filed Jan. 3, 2018; which is a continuation of U.S. application Ser. No. 15/785,969, filed Oct. 17, 2017; which is a continuation-in-part of U.S. application Ser. No. 14/315,355, filed Jun. 26, 2014, now U.S. Pat. No. 9,812,040; which is a continuation of U.S. application Ser. No. 13/869,052, filed Apr. 24, 2013, now U.S. Pat. No. 8,784,598; which is a continuation of U.S. application Ser. No. 12/965,139, filed Dec. 10, 2010, now abandoned; which is a continuation-in-part of U.S. application Ser. No. 12/951,232, filed Nov. 22, 2010, now U.S. Pat. No. 8,142,596; and (ii) a continuation in part of U.S. application Ser. No. 15/785,995, filed Oct. 17, 2017; which is a continuation in part of U.S. application Ser. No. 15/293,397, filed Oct. 14, 2016; which is a non-provisional of, and claims priority to U.S. Provisional Patent Application No. 62/242,584, filed Oct. 16, 2015.

The disclosure of each of the foregoing applications is incorporated herein by reference.

BACKGROUND

Labels are commonly used to secure printed indicia to packages to indicate shipping or other information. In the instance of a shipping use, a separate packing list may be enclosed within a package shipped to the customer containing a purchased item.

There is significant demand for a labeling method that allows automatic printing and application of a lower label and an upper label to a surface. For example, there is significant demand for a labeling method that allows automatic printing and application of a packing list and shipping label to the surface of a sealed carton. Because the carton is sealed prior to packing list generation, it is not efficient to open it to insert a packing list. High volume shipping of such packages requires rapid attachment of a packing list and a shipping label to the package. It is preferred to conceal the information of the packing list until the final recipient receives the shipped package.

Complicated methods have been implemented for application of a lower label and an upper label to a surface. For example, where a packing list and shipping label are to be applied to the surface of a sealed carton, complicated methods have been implemented in which a packing list is applied and adhered as a pattern adhesive label atop a carton, using a first roll of labels (packing list labels) and a first label applicator. After the packing list label is applied, an address label is applied and adhered atop the packing list label, to conceal the packing list information, using a second roll of labels (address labels) and a second label applicator. Such methods have many shortcomings. For example, precise timing between the packing list application and the shipping label application is required to properly align the two labels, and to avoid mismatches between the packing list and the shipping label (e.g., where the packing list contains information about goods to be shipped to a first customer and the shipping label contains the address of a different customer. In addition, because two printers and two label applicators, along with related hardware and software, are required to apply a packing list and shipping label in sequence, such methods require significant floor space and investment.

For the foregoing reasons, it is desired to provide labeling methods that allows automatic printing and application of a lower label and an upper label to a surface while avoiding the many shortcomings of existing labeling methods. For the foregoing reasons, it is desired to provide labeling methods that allows automatic printing and application of a packing list label and shipping label to the surface of a sealed carton while avoiding the many shortcomings of existing labeling methods.

SUMMARY

The present disclosure includes disclosure of at least one system of labels for automatic application to a surface. In at least one embodiment, a label system according to the present disclosure comprises a carrier material, an upper label, and a lower label. An upper label of at least one such embodiment comprises a top surface and an opposing undersurface, the top surface and the undersurface having a leading edge and a trailing edge, and the undersurface in contact with the carrier material. A lower label of at least one such embodiment comprises a top side and an opposing underside, the top side and the underside having a leading margin and a trailing margin, and the underside being in contact with the carrier material. According to at least one such embodiment of the present disclosure, the upper label and the lower label are in contact with the carrier material in adjacent positions with the trailing edge adjacent to the leading margin, and the upper label and the lower label are configured for dispensing sequentially from the carrier material onto a label applicator apparatus such that when the upper label and the lower label are dispensed onto the label applicator apparatus the lower label is positioned against the undersurface of the upper label prior to attachment of the upper label and the lower label to an article.

In an aspect of at least one embodiment of the present disclosure, an upper label comprises a removable segment and a lower label comprises a removable region, and when the upper label and the lower label are dispensed onto a label applicator apparatus, the removable segment and the removable region are in registration.

In an aspect of at least one embodiment of the present disclosure, an undersurface comprises a zone with reduced adhesive properties and an underside comprises an area with reduced adhesive properties, and when an upper label and a lower label are dispensed onto a label applicator apparatus the zone with reduced adhesive properties and the area with reduced adhesive properties are in registration.

In an aspect of at least one embodiment of the present disclosure, the zone with reduced adhesive properties comprises an adhesive layer covered with an adhesive deadening agent.

In an aspect of at least one embodiment of the present disclosure, the area with reduced adhesive properties comprises an adhesive layer covered with an adhesive deadening agent.

In an aspect of at least one embodiment of the present disclosure, an upper label comprises one or more holes therethrough, and when the upper label and a lower label are dispensed onto a label applicator apparatus, the lower label is held in position against the undersurface of the upper label by a vacuum force generated by the label applicator apparatus, the vacuum force acting through the one or more holes.

In an aspect of at least one embodiment of the present disclosure, all of the underside comprises reduced adhesive properties.

In an aspect of at least one embodiment of the present disclosure, all of the underside comprises an adhesive layer covered with an adhesive deadening agent.

In an aspect of at least one embodiment of the present disclosure, the undersurface comprises pressure sensitive adhesive that removably adheres the undersurface to the carrier material.

In at least one embodiment, a label system according to the present disclosure comprises a carrier material, an upper label, and a lower label. An upper label of at least one such embodiment is removably adhered to the carrier material, and comprises a top surface, an undersurface, and a removable segment. An upper label of at least one such embodiment is bounded by a leading edge, a trailing edge, and first and second side edges. The undersurface of an upper label of at least one such embodiment comprises adhesive on at least a portion thereof and such an upper label is removably adhered to the carrier material by the adhesive. A lower label of at least one such embodiment is removably adhered to the carrier material in a position on the carrier material adjacent to the upper label and comprises a top side and an opposing underside. A lower label of at least one such embodiment is bounded by a leading margin, a trailing margin, and a first and second side margins. According to at least one such embodiment of the present disclosure, the upper label and the lower label are configured for dispensing sequentially from the carrier material onto a label applicator apparatus, such that when the upper label and the lower label are dispensed onto the label applicator apparatus the top surface is positioned against the label applicator apparatus, the top side of lower label is positioned against the undersurface of the upper label, and the underside is exposed.

In an aspect of at least one embodiment of the present disclosure, the top side of an upper label comprises a first surface area circumscribed by the leading margin, the trailing margin, and the first and second side margins, and the top surface of a lower label comprises a second surface area circumscribed by the leading edge, the trailing edge, and the first and second side edges, and the second surface area is not larger than the first surface area.

In at least one embodiment, a label system according to the present disclosure comprises a carrier material, a removable upper label on the carrier material, and a removable lower sheet on the carrier material in a position on the carrier material adjacent to the upper label. An upper label of at least one such embodiment comprises a top surface and an opposing undersurface, the undersurface facing the carrier material. A lower sheet of at least one such embodiment comprises a top side and an opposing underside, the underside facing the carrier material. According to at least one such embodiment of the present disclosure, wherein the upper label and the lower sheet are configured for dispensing sequentially from the carrier material onto a label applicator apparatus such that the top side of the lower sheet is positioned against the undersurface when the upper label and the lower sheet are dispensed onto the label applicator apparatus.

In an aspect of at least one embodiment of the present disclosure, an upper label comprises a removable segment, and a lower sheet comprises a removable region, and when the lower sheet is dispensed onto the label applicator apparatus, the removable segment and the removable region are in registration.

In an aspect of at least one embodiment of the present disclosure, the undersurface of an upper label comprises a zone with reduced adhesive properties, and the underside of a lower sheet comprises an area with reduced adhesive properties, and when the lower sheet is dispensed onto the label applicator apparatus, the zone with reduced adhesive properties and the area with reduced adhesive properties are in registration.

In an aspect of at least one embodiment of the present disclosure, the zone with reduced adhesive properties comprises an adhesive layer covered with an adhesive deadening agent.

In an aspect of at least one embodiment of the present disclosure, the area with reduced adhesive properties comprises an adhesive layer covered with an adhesive deadening agent.

In an aspect of at least one embodiment of the present disclosure, an upper label comprises one or more holes therethrough, and a lower sheet is held in position against the undersurface of the upper label by the vacuum force generated by a label applicator apparatus, the vacuum force acting through the one or more holes.

In an aspect of at least one embodiment of the present disclosure, a lower sheet is held in position against the undersurface of the upper label by a vacuum force generated by a label applicator apparatus.

In an aspect of at least one embodiment of the present disclosure, all of the underside of a lower sheet comprises reduced adhesive properties.

In an aspect of at least one embodiment of the present disclosure, all of the underside of a lower sheet comprises an adhesive layer covered with an adhesive deadening agent.

In an aspect of at least one embodiment of the present disclosure, the undersurface of an upper label comprises adhesive, and when a lower sheet is dispensed onto the label applicator apparatus the adhesive on the undersurface adhesively interacts with the top side of the lower sheet.

In at least one embodiment, the present disclosure includes disclosure of a method of assembling a multi-layer label comprising the steps of providing a label dispensing apparatus, the label dispensing apparatus comprising a dispensing mechanism and a receptacle; providing a carrier material to the label dispensing apparatus, the carrier material comprising a first label thereon and a second label thereon in a position on the carrier material adjacent to the first label, wherein the first label and the second label are removably adhered to the carrier material in a non-overlapping arrangement, the first label comprising a top side and an opposing underside, the underside facing the carrier material, the second label comprising a top surface and an opposing undersurface, the undersurface facing the carrier material; with the label dispensing apparatus, dispensing the first label from the carrier material onto the receptacle, whereby the underside of the first label is against the receptacle and the top side of the first label is exposed; while the first label is on the receptacle, with the label dispensing apparatus, dispensing the second label from the carrier material, wherein the second label alights on the first label such that the second label is layered over and aligned with the first label with the undersurface of the second label in contact with the top side of the first label.

In an aspect of at least one embodiment of the present disclosure, the second label comprises a displaceable segment, and the first label comprises a removable region, and after the second label is dispensed onto the receptacle, the displaceable segment and the removable region are in registration.

In an aspect of at least one embodiment of the present disclosure, the undersurface comprises a zone with reduced adhesive properties, and the underside comprises an area with reduced adhesive properties, and after the second label is dispensed onto the receptacle, the zone with reduced adhesive properties and the area with reduced adhesive properties are in registration.

In an aspect of at least one embodiment of the present disclosure, the undersurface comprises exposed adhesive.

In an aspect of at least one embodiment of the present disclosure, the second label comprises a removable segment.

In an aspect of at least one embodiment of the present disclosure, the second label comprises one or more holes therethrough.

In at least one embodiment, the present disclosure includes disclosure of a method of applying a first label and a second label to a surface, the method comprising the steps of providing a label dispensing apparatus, the label dispensing apparatus comprising a dispensing mechanism and a receptacle; providing a carrier material to the label dispensing apparatus, the carrier material comprising a first label removably adhered thereto and a second label removably adhered thereto in a position on the carrier material adjacent to the first label, the first label comprising a top side, and an underside, the first label being bounded by a leading edge, a trailing edge, and first and second side edges, the underside comprising adhesive on at least a portion thereof, the underside removably adhered to the carrier material by the adhesive, the second label comprising a top side and an opposing undersurface, the second label being bounded by a leading margin, a trailing margin, and first and second side margins; dispensing the first label onto a receptacle, whereby the underside of the first label is adjacent to the receptacle and the top side is exposed; advancing the second label with the label dispensing apparatus; while the first label is on the receptacle, dispensing the second label onto the receptacle, wherein the second label alights on the first label such that the second label is layered over and aligned with the first label with the undersurface of the second label in contact with the top side of the first label; and applying the second label and the first label to a surface simultaneously, whereby after application the underside of the first label is in contact with the surface and the undersurface of the second label is in contact with the top side of the first label and adhered to the surface.

In an aspect of at least one embodiment of the present disclosure, the second label comprises a displaceable segment, and wherein the first label comprises a removable region, and wherein after the second label is dispensed onto the receptacle, the displaceable segment and the removable region are in registration.

In at least one embodiment, the present disclosure includes disclosure of a method of applying a first label and a second label to a container, the method comprising the steps of providing a carrier material, the carrier material comprising a first label removably adhered thereto and a second label removably adhered thereto in a position on the carrier adjacent to the first label, the carrier material comprising a release coating on a surface thereof, the first label comprising a top side and an opposing underside, the top side and the underside being bounded by a leading margin, a trailing margin, and first and second side margins, the top side comprising a first surface area, the underside comprising adhesive on at least a portion thereof, the underside removably adhered to the release coating by the adhesive, the second label comprising a top surface, and an undersurface, the top surface and the undersurface being bounded by a leading edge, a trailing edge, and first and second side edges, the top surface comprising a second surface area, the second surface area being at least as large as the first surface area, the undersurface comprising adhesive on at least a portion thereof, the undersurface removably adhered to the release coating by the adhesive; dispensing the second label onto a receptacle, whereby the undersurface of the first label is against the receptacle and the top surface is exposed; advancing the second label toward the receptacle; while the first label is against the receptacle, dispensing the second label onto the receptacle, wherein the second label alights on the first label such that the second label is layered over and aligned with the first label with the undersurface of the second label in contact with the top side of the first label; and applying the second label and the first label to a surface simultaneously, whereby after application the underside of the first label is adhered to the surface and the undersurface of the second label is adhered to the surface.

In at least one embodiment, the present disclosure includes disclosure of a method of assembling a multi-layer label, the method comprising the steps of providing a label dispensing apparatus, the label dispensing apparatus comprising a dispensing mechanism and a receptacle; providing a roll of linerless labels to the label dispensing apparatus, the roll of linerless labels being separable into at least a first label and a second label, the first label comprising a top side and an opposing underside, the second label comprising a top surface and an opposing undersurface; with the label dispensing apparatus, dispensing the first label from the roll of linerless labels onto the receptacle, whereby the underside of the first label is against the receptacle and the top side of the first label is exposed; while the first label is on the receptacle, with the label dispensing apparatus, dispensing the second label from the roll of linerless labels, wherein the second label alights on the first label such that the second label is layered over and aligned with the first label with the undersurface of the second label in contact with the top side of the first label.

In an aspect of at least one embodiment of the present disclosure, the first label comprises a first label removable region and the second label comprises a second label removable region, and wherein after the second label is dispensed onto the receptacle, the second label removable region and the first label removable region are in registration.

In an aspect of at least one embodiment of the present disclosure, the undersurface of the second label comprises an adhesive-free zone, and wherein the underside of the first label comprises an adhesive-free area, and wherein after the second label is dispensed onto the receptacle, the adhesive-free zone and the adhesive-free area are in registration.

In an aspect of at least one embodiment of the present disclosure, the first label comprises a first label removable region that includes the adhesive-free area and the second label comprises a second label removable region that includes the adhesive-free zone, and wherein after the second label is dispensed onto the receptacle, the second label removable region and the first label removable region are in registration.

In an aspect of at least one embodiment of the present disclosure, at least a portion of the underside for the first label comprises adhesive. In an aspect of at least one embodiment of the present disclosure, at least a portion of the undersurface of the second label comprises adhesive.

In an aspect of at least one embodiment of the present disclosure, the first label comprises a first label leading edge and the second label comprises a second label leading edge, and wherein after the second label is dispensed onto the receptacle, the first label leading edge and the second label leading edge are in alignment. In an aspect of at least one embodiment of the present disclosure, the first label comprises a first label trailing edge and the second label comprises a second label trailing edge, and wherein after the second label is dispensed onto the receptacle, the first label trailing edge and the second label trailing edge are in alignment. In an aspect of at least one embodiment of the present disclosure, the first label comprises opposing first label side edges and the second label comprises opposing second label side edges, and wherein after the second label is dispensed onto the receptacle, the first label side edges and the second side edges are in alignment.

In at least one embodiment, the present disclosure includes disclosure of a method of assembling a multi-layer label, the method comprising the steps of providing a roll of linerless labels, the roll of linerless labels being separable into at least a first label and a second label, the first label comprising a top side and an opposing adhesive-bearing underside, the second label comprising a top surface and an opposing adhesive-bearing undersurface; dispensing the second label onto a label applicator apparatus, whereby the top surface of the second label is held in position against the label applicator apparatus and the undersurface is exposed; while the second label is held in position against the label applicator apparatus, dispensing the first label onto the label applicator apparatus, whereby the top side of the first label is held in position against the undersurface of the second label. In an aspect of at least one embodiment of the present disclosure, the method further comprises the step of applying the second label and the first label to a surface simultaneously using the label applicator apparatus, whereby after application the underside of the first label is in contact with the surface and the undersurface of the second label is in contact with the top side of the first label.

BRIEF DESCRIPTION OF THE DRAWINGS

The features and advantages of this disclosure, and the manner of attaining them, will be more apparent and better understood by reference to the following descriptions of the disclosed methods and systems, taken in conjunction with the accompanying drawings, wherein.

DESCRIPTION

Figure 1:
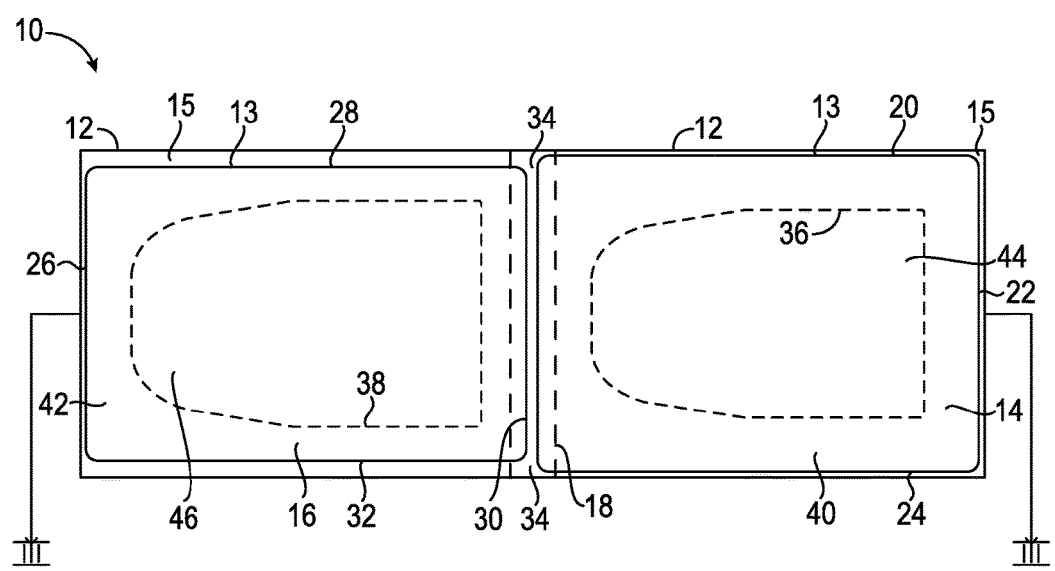
FIG. 1 shows a multi-part upper and lower label system according to at least one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 shows a multi-part upper and lower label system 10 according to at least one embodiment of the present disclosure. Shown in FIG. 1 are lower label 14 and upper label 16. In at least one embodiment of a multi-part upper and lower label system according to the present disclosure, a plurality of lower labels 14 and upper labels 16 reside alternately on carrier 12. In at least one embodiment of a multi-part upper and lower label system 10 according to the present disclosure, each lower label 14 comprises a packing list label, and each upper label 16 comprises a shipping label.

According to at least one embodiment of a multi-part upper and lower label system according to the present disclosure, lower label 14 is bounded by leading edge 18, trailing edge 22, and side edges 20 and 24. One or more lines of weakness 36 define a boundary of removable region 44. In at least one embodiment of the present disclosure where lower label 14 comprises a packing list label, removable region 44 comprises a removable packing list. Frame 40 exists between a line of weakness 36 and leading edge 18, trailing edge 22, and side edges 20 and 24.

According to at least one embodiment of a multi-part upper and lower label system according to the present disclosure, upper label 16 is bounded by leading edge 26, trailing edge 30, and side edges 28 and 32. One or more lines of weakness 38 define a boundary of removable segment 46. Frame 42 lies between line of weakness 38 and leading edge 26, trailing edge 30, and side edges 28 and 32.

According to at least one embodiment of a multi-part upper and lower label system according to the present disclosure, the area of lower label 14 bounded by leading edge 18, trailing edge 22, and side edges 20 and 24 is greater than the area of upper label 16 bounded by leading edge 26, trailing edge 30, and side edges 28 and 32. According to at least one embodiment of a multi-part upper and lower label system according to the present disclosure, the area of removable region 44 is no larger than the area of removable segment 46.

According to at least one embodiment of a multi-part upper and lower label system according to the present disclosure, upper label 16 and lower label 14 are deployed adjacent to each other on carrier 12 and removably adhered to carrier 12, thereby enabling upper label 16 and lower label 14 to be dispensed from carrier 12 in sequence as discussed herein. Carrier 12 comprises, in at least one embodiment, release coating 15 on the surface of carrier 12 facing the undersides of lower label 14 and upper label 16. In at least one embodiment of the present disclosure, release coating 15 is a silicone release coating. According to at least one embodiment of label system 10 according to the present disclosure, adhesive 13 is interposed between release coat 15 and the undersides of lower label 14 and upper label 16, as discussed hereinafter. In at least one embodiment of the present disclosure, adhesive 13 is a pressure sensitive adhesive.

In at least one embodiment of a multi-part upper and lower label system according to the present disclosure, carrier 12 comprises transverse stripe 34. Transverse stripe 34 comprises a color or shading of a region of carrier 12 that is different from the color of the remainder of carrier 12. In at least one embodiment, a transverse stripe 34 is located after each upper label 16 and before the adjacent lower label 14. In at least one embodiment, a transverse stripe 34 overlaps the trailing edge 30 of each upper label 16 and the leading edge 18 of each lower label 14.

In at least one embodiment of a multi-part upper and lower label system according to the present disclosure, one or more transverse stripes 34 are used in conjunction with a detection apparatus for purposes of synchronizing the dispensing of the upper label 16 and the adjacent lower label 14.

Figure 2:
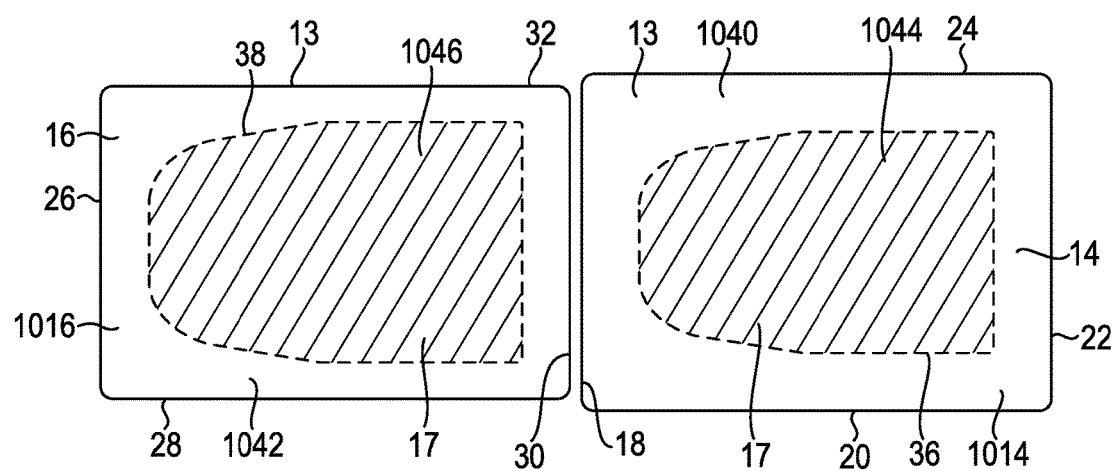
FIG. 2 shows the underside of a lower label and the undersurface of an upper label according to at least one embodiment of the present disclosure.

FIG. 2 shows the underside of lower label 14 and the undersurface of upper label 16 according to at least one embodiment of a multi-part upper and lower label system according to the present disclosure, with carrier 12 not visible for purposes of clarity. Shown in FIG. 2 is underside 1014 of lower label 14, which is bounded by leading edge 18, trailing edge 22, and side edges 20 and 24. Also shown in FIG. 2 is undersurface 1016 of upper label 16, which is bounded by leading edge 26, trailing edge 30, and side edges 28 and 32.

In at least one embodiment, underside 1014 of lower label 14 comprises a first portion 1040 and a second portion 1044, separated by a line of weakness 36. First portion 1040 comprise the underside of frame 40. Second portion 1044 comprises the underside of removable region 44. In at least one embodiment, first portion 1040 comprises adhesive 13 on all of or substantially all of or a majority of its surface area. In at least one embodiment, second portion 1044 is free of or substantially free of adhesive. In at least one embodiment, second portion 1044 comprises adhesive 13 on all of or substantially all of or a majority of its surface area, but an adhesive deadening agent 17 such as, for example, a non-adhesive varnish, covers adhesive 13 in those areas thereby rendering adhesive 13 ineffective in those areas. In at least one embodiment of the present disclosure, adhesive deadening agent 17 is selected so as to not render adhesive 13 completely ineffective in those areas treated by adhesive deadening agent 17. In such an embodiment, after treatment of adhesive 13 with adhesive deadening agent 17, the treated areas retain a slight tackiness.

In at least one embodiment of the present disclosure, undersurface 1016 of upper label 16 comprises a first portion 1042 and a second portion 1046, separated by a line of weakness 38. First portion 1042 comprises the undersurface of frame 42. Second portion 1046 comprises the undersurface of removable segment 46. In at least one embodiment, first portion 1042 comprises adhesive 13 on all of or substantially all of or a majority of its surface area. In at least one embodiment, second portion 1046 is free of or substantially free of adhesive. In at least one embodiment, second portion 1046 comprises adhesive 13 on all of or substantially all of or a majority of its surface area, but an adhesive deadening agent 17 thereby such as, for example, a non-adhesive varnish, covers adhesive 13 in those areas rendering adhesive 13 ineffective in those areas. In at least one embodiment of the present disclosure, adhesive deadening agent 17 is selected so as to not render adhesive 13 completely ineffective in those areas treated by adhesive deadening agent 17. In such an embodiment, after treatment of adhesive 13 with adhesive deadening agent 17, the treated areas retain a slight tackiness.

Figure 3A:
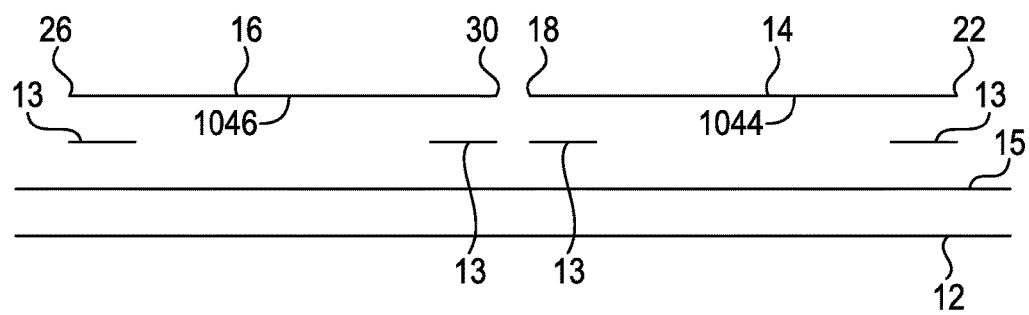
FIG. 3A shows a cross-sectional view of a multi-part upper and lower label system according to at least one embodiment of the present disclosure.

FIG. 3A shows a cross-sectional view of a multi-part upper and lower label system according to at least one embodiment of the present disclosure taken on line III-III of FIG. 1. The multi-part upper and lower label system is shown in FIG. 3A in a semi-exploded state for purposes of clarity. Shown in FIG. 3A are carrier 12, adhesive 13, lower label 14 comprising leading edge 18 and trailing edge 22, release coating 15, and upper label 16 comprising leading edge 26 and trailing edge 30. As shown in this embodiment of a multi-part upper and lower label system according to the present disclosure, second portion 1044 and second portion 1046 are free of adhesive 13.

Figure 3B:
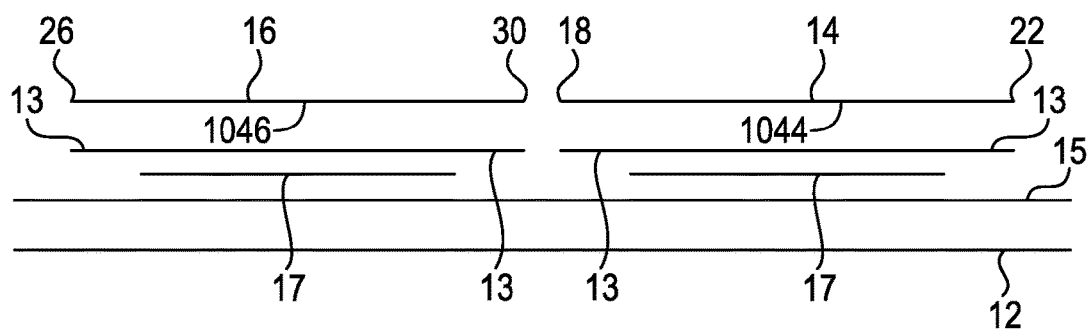
FIG. 3B shows a cross-sectional view of a multi-part upper and lower label system according to at least one embodiment of the present disclosure.

FIG. 3B shows a cross-sectional view of a multi-part upper and lower label system according to at least one embodiment of the present disclosure taken on line III-III of FIG. 1. The multi-part upper and lower label system is shown in FIG. 3B in a semi-exploded state for purposes of clarity. Shown in FIG. 3B are carrier 12, adhesive 13, lower label 14 comprising leading edge 18 and trailing edge 22, release coating 15, upper label 16 comprising leading edge 26 and trailing edge 30, and adhesive deadening agent 17. As shown in this embodiment of a multi-part upper and lower label system according to the present disclosure, second portion 1044 comprises adhesive 13 on all of or substantially all of or a majority of its surface area, but adhesive deadening agent 17 such as, for example, a non-adhesive varnish, covers adhesive 13 in those areas. Second portion 1046 also comprises adhesive 13 on all of or substantially all of or a majority of its surface area, but adhesive deadening agent 17 such as, for example, a non-adhesive varnish, covers adhesive 13 in those areas.

Figure 4A:
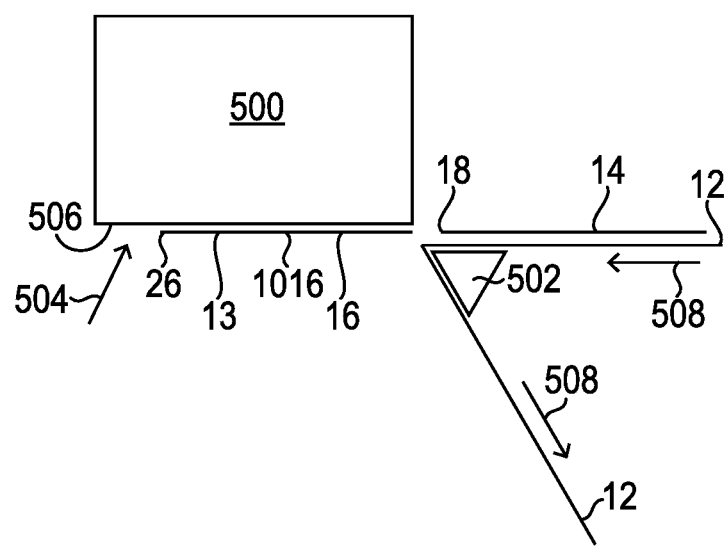
FIGS. 4A-B show side views of a multi-part upper and lower label system according to at least one embodiment of the present disclosure.
Figure 4B:
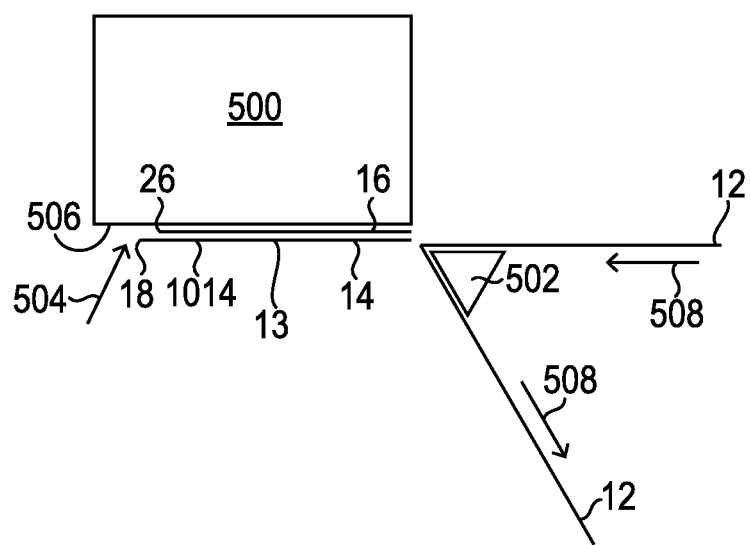

FIGS. 4A-B show side views of a multi-part upper and lower label system according to at least one embodiment of the present disclosure while in use. As shown in FIG. 4A, carrier 12 with upper label 16 and lower label 14 thereon is advanced in direction 508. Carrier 12 is routed around member 502, causing upper label 16 to be dispensed from carrier 12 beginning with leading edge 26. At least a portion of undersurface 1016 of upper label 16 comprises adhesive 13 after it is dispensed from carrier 12. As upper label 16 is dispensed from carrier 12, upper label 16 passes under label applicator 500. Force 504 generated by label applicator 500 causes upper label 16 to be lifted and held against screen 506. Screen 506 forms a lower surface of label applicator 500. In at least one embodiment of the present disclosure, force 504 is a vacuum force. In at least one embodiment of the present disclosure, force 504 is an electrostatic force.

Turning now to FIG. 4B, after upper label 16 is dispensed from carrier 12, carrier 12 with lower label 14 thereon is advanced in direction 508. Carrier 12 is routed around member 502, causing lower label 14 to be dispensed from carrier 12 beginning with leading edge 18. At least a portion of underside 1014 of lower label 14 comprises adhesive 13 after it is dispensed from carrier 12. As lower label 14 is dispensed from carrier 12, lower label 14 passes under label applicator 500. Force 504 generated by label applicator 500 causes lower label 14 to be lifted and held against, and in registration with, upper label 16. Because in such an embodiment of a multi-part upper and lower label system according to the present disclosure the area of lower label 14 is greater than the area of upper label 16, force 504 acts on the edges of lower label 14 to hold lower label 14 against screen 506. Undersurface 1016 begins to be adhered to lower label 14 by adhesive 13.

In at least one embodiment of a multi-part upper and lower label system according to the present disclosure, prior to the time upper label 16 is dispensed from carrier 12, indicia is printed on or applied to upper label 16. In an embodiment of applied upper and lower label system according to the present disclosure where upper label 16 is a shipping label, indicia, such as, for example, destination address and/or other relevant shipping indicia, may be printed on or applied to upper label 16.

In at least one embodiment of a multi-part upper and lower label system according to the present disclosure, prior to the time lower label 14 is dispensed from carrier 12, indicia is printed on or applied to lower label 14. In an embodiment of applied upper and lower label system according to the present disclosure where lower label 14 is a packing list label, indicia, such as, for example, container contents and/or other packing list indicia, may be printed on or applied to lower label 14.

In at least one embodiment, label applicator 500 comprises a printing capability such as, for example, a thermal transfer printer or a direct thermal printer. In such an embodiment, indicia may be applied to upper label 16 and/or lower label 14 by label applicator 500.

Figure 5:
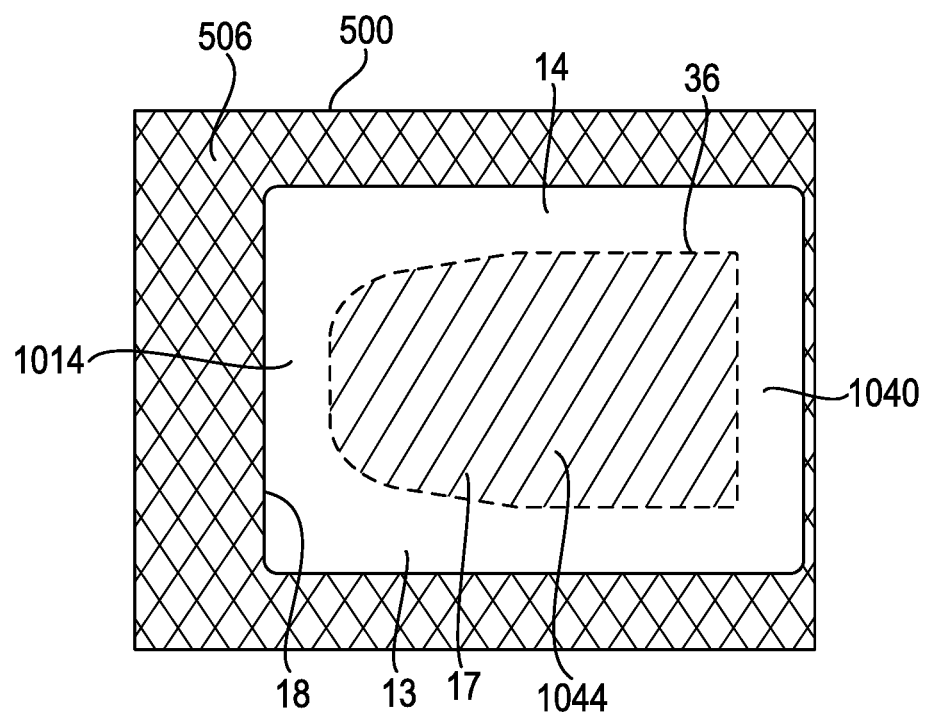
FIG. 5 shows the underside of a label applicator after an upper label and a lower label according to at least one embodiment of the present disclosure have been dispensed thereon.

FIG. 5 shows the underside of label applicator 500 after upper label 16 and lower label 14 have been dispensed thereon, according to at least one embodiment of a multi-part upper and lower label system according to the present disclosure. Visible in FIG. 5 is screen 506. As shown in FIG. 5, underside 1014 of lower label 14 is visible. From the point of view shown in FIG. 5, lower label 14 fully obscures upper label 16, although upper label 16 is in registration with lower label 14, between lower label 14 and screen 506. Adhesive 13 is present in an effective amount in first portion 1040. Second portion 1044 comprises no more than very limited adhesive properties.

Figure 6:
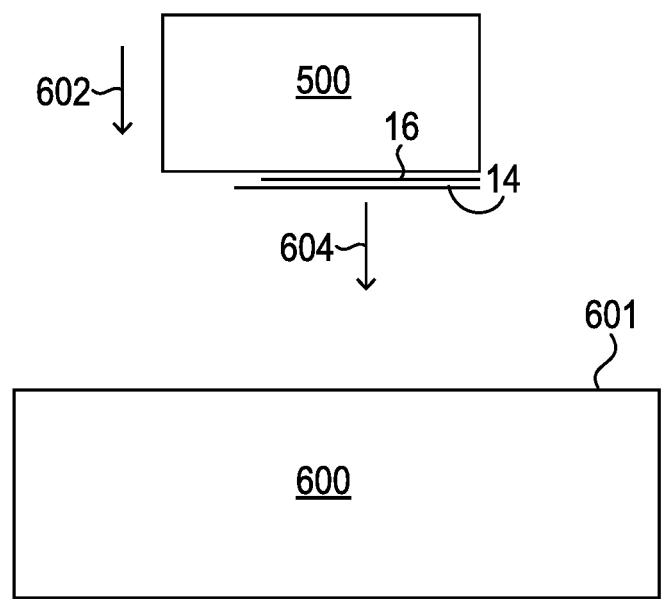
FIG. 6 shows a side view of the application of an upper label and a lower label according to at least one embodiment of the present disclosure to a surface of a container.

FIG. 6 shows a side view of the application of upper label 16 and lower label 14 to surface 601 of container 600, according to at least one embodiment of the present disclosure. As shown in FIG. 6, label applicator 500 moves in direction 602, thereby moving upper label 16 and lower label 14 in direction 604 until the underside 1014 of lower label 14 is in contact with surface 601 of container 600. The pressure of label applicator 500 against surface 601 of container 600 causes adhesive 13 to adhere the underside 1014 of lower label 14 to surface 601 of container 600, and completes the adhesion of undersurface 1016 to lower label 14.

Figure 7:
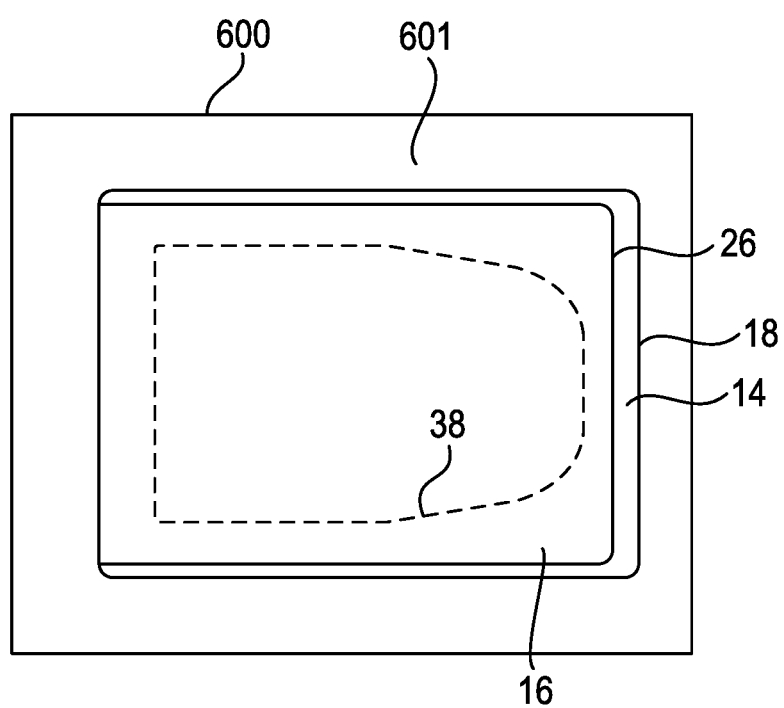
FIG. 7 shows an upper label and a lower label according to at least one embodiment of the present disclosure adhered to a surface of a container.

FIG. 7 shows lower label 14 and upper label 16 adhered to surface 601 of container 600, according to at least one embodiment of the present disclosure. As shown in FIG. 7, lower label 14 and upper label 16 are in registration. A line of weakness 38 is visible on upper label 16.

Figure 8A:
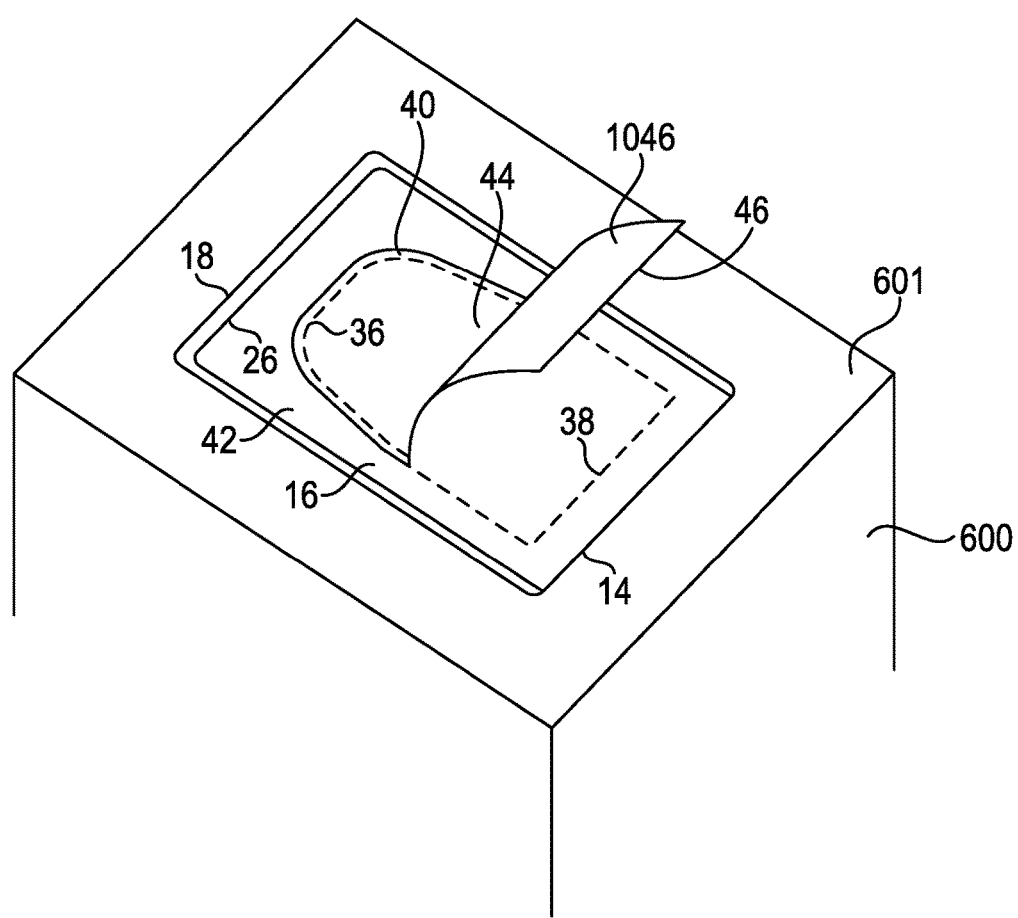
FIGS. 8A-B show an embodiment of a multi-part upper and lower label system according to at least one embodiment of the present disclosure.
Figure 8B:
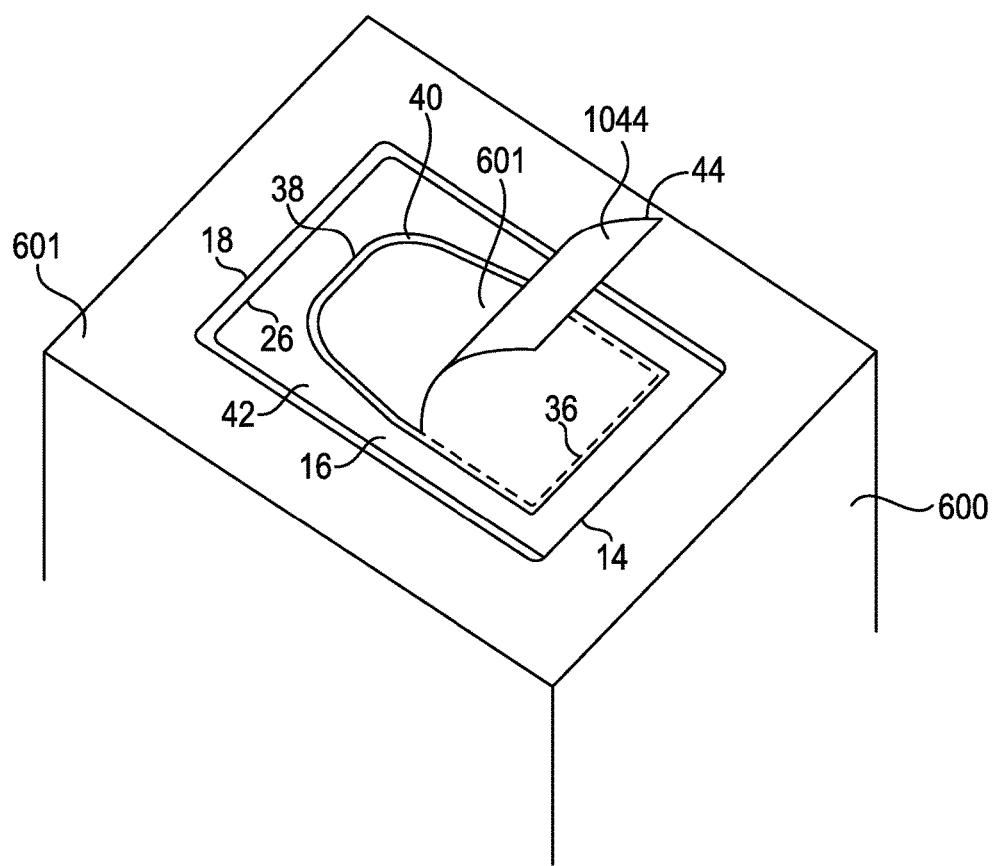

FIGS. 8A-B show an embodiment of a multi-part upper and lower label system according to the present disclosure. As shown in FIG. 8A, removable segment 46 of upper label 16 is partially removed from upper label 16 along a line of weakness 38. Removing segment 46 in this fashion reveals removable region 44 of lower label 14. In an embodiment of applied upper and lower label system according to the present disclosure where lower label 14 is a packing list label, removable region 44 may comprise a removable packing list. Because in such an embodiment of the present disclosure underside 1046 has no more than very limited adhesive properties, removable region 44 is not damaged or defaced by removing segment 46. As segment 46 is removed, frame 42 of upper label 16 remains adhered to lower label 14.

As shown in FIG. 8B, removable segment 46 of upper label 16 is fully removed from upper label 16 along a line of weakness 38. Removable region 44 may be removed from lower label 14 along a line of weakness 36. In an embodiment of applied upper and lower label system according to the present disclosure where lower label 14 is a packing list label, removable region 44 may comprise a removable packing list. Because in such an embodiment of the present disclosure underside 1044 has no more than very limited adhesive properties, removable region 44 is readily removable from surface 601 of container 600. After removable region 44 is removed, frame 42 of upper label 16 remains adhered to frame 40 of lower label 14, and frame 40 of lower label 14 remains adhered to surface 601 of container 600.

Figure 9A:
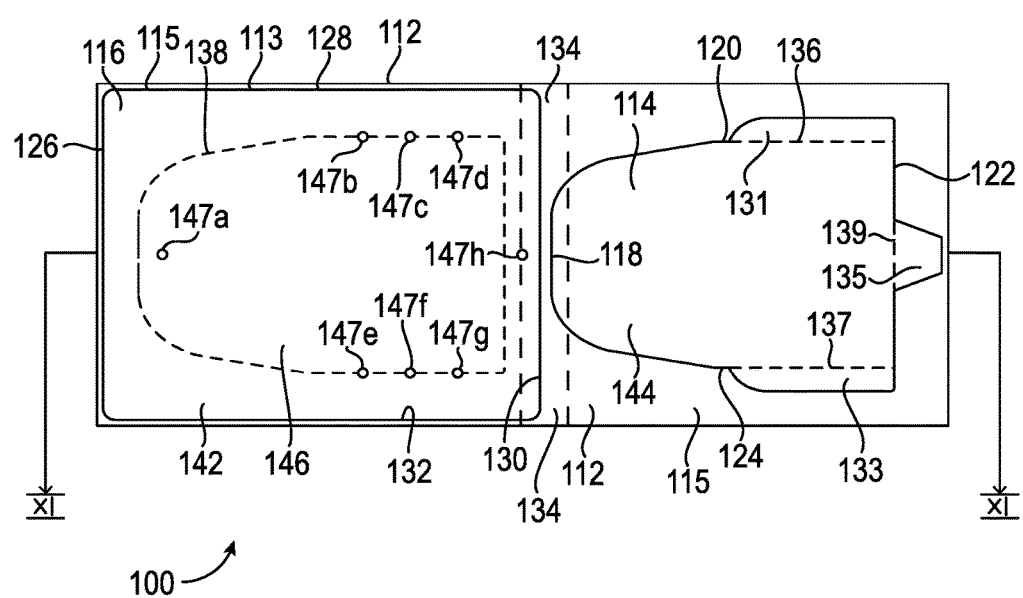
FIG. 9A shows a multi-part upper and lower label system according to at least one embodiment of the present disclosure.
Figure 9B:
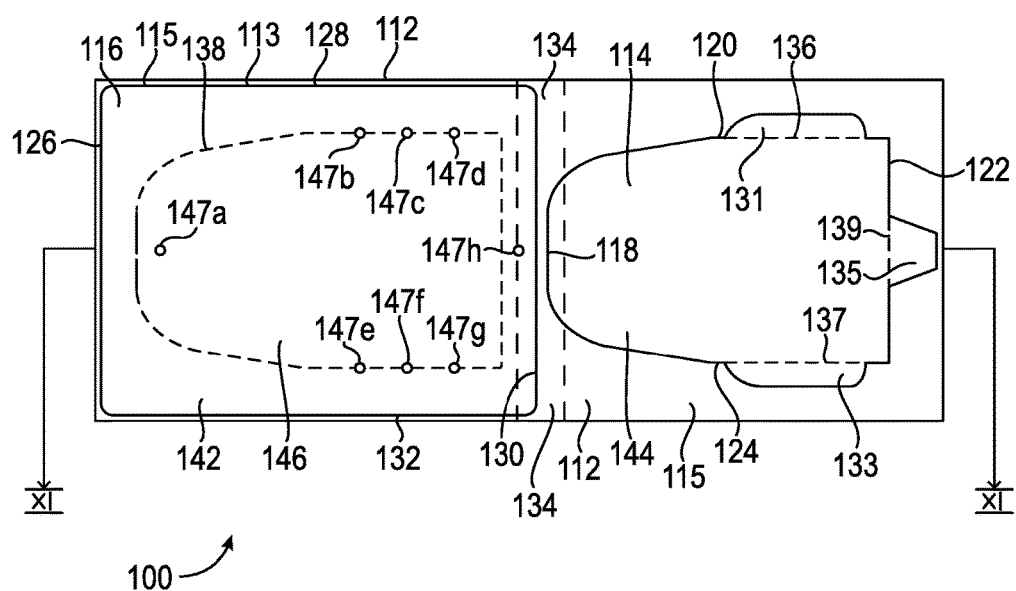
FIG. 9B shows a multi-part upper and lower label system according to at least one embodiment of the present disclosure.

FIGS. 9A-B shows multi-part upper and lower label system 100 according to at least one embodiment of the present disclosure. Shown in FIGS. 9A-B are lower label 114 and upper label 116. In at least one embodiment of the present disclosure, lower label 114 and upper label 116 reside adjacent to each other on carrier 112. In at least one embodiment of a multi-part upper and lower label system according to the present disclosure, a plurality of lower labels 114 and upper labels 116 reside alternately on carrier 112. In at least one embodiment of a multi-part upper and lower label system 100 according to the present disclosure, each lower label 114 comprises a packing list label, and each upper label 116 comprises a shipping label.

According to at least one embodiment of the present disclosure, lower label 114 comprises leading edge 118, trailing edge 122, side edges 120 and 124, side tabs 131 and 133, trailing tab 135, and removable region 144. In an embodiment of multi-part upper and lower label system 100 according to the present disclosure such as is shown in FIG. 9A, a trailing edge of side tabs 131 and 133 is substantially even with trailing edge 122. In an embodiment of multi-part upper and lower label system 100 according to the present disclosure such as is shown in FIG. 9B, a trailing edge of side tabs 131 and 133 is not even with trailing edge 122. One or more lines of weakness 136 and 137 define a boundary between removable region 144 and side tabs 131 and 133, respectively. One or more lines of line of weakness 139 define a boundary between removable region 144 and trailing tab 135. In at least one embodiment of the present disclosure, removable region 144 comprises a removable packing list.

According to at least one embodiment of the present disclosure, upper label 116 is bounded by leading edge 126, trailing edge 130, and side edges 128 and 132. One or more lines of weakness 138 define a boundary of removable segment 146. Frame 142 lies between a line of weakness 138 and leading edge 126, trailing edge 130, and side edges 128 and 132. According to at least one embodiment of the present disclosure, upper label 116 comprises one or more holes 147. Holes 147a, 147b, 147c, 147d, 147e, 147f, 147g, and 147h are shown in the embodiment of label system 100 of FIGS. 9A-B. Other embodiments of label system 100 may have a greater number or lesser number of holes. According to at least one embodiment of the present disclosure, holes 147 extend through segment 146 and carrier 112. In at least one embodiment of the present disclosure, holes 147 extend only through segment 146.

According to at least one embodiment of the present disclosure, prior to use upper label 116 and lower label 114 are deployed adjacent to each other on carrier 112, thereby enabling upper label 116 and lower label 114 to be dispensed from carrier 112 in sequence as discussed herein. Carrier 112 comprises, in at least one embodiment, release coating 115 on the surface of carrier 112 facing the undersides of lower label 114 and upper label 116. In at least one embodiment of the present disclosure, release coating 115 is a silicone release coating. According to at least one embodiment of label system 100 according to the present disclosure, adhesive 113 is interposed between release coat 115 and the undersides of lower label 114 and upper label 116, as discussed hereinafter. In at least one embodiment of the present disclosure, adhesive 113 is a pressure sensitive adhesive.

In at least one embodiment, carrier 112 comprises transverse stripe 134. Transverse stripe 134 comprises a color or shading of a region of carrier 112 that is in contrast with the color of the remainder of carrier 112. In at least one embodiment, a transverse stripe 134 is located after each upper label 116 and before the adjacent lower label 114. In at least one embodiment, a transverse stripe 134 is located after each lower label 114 and before the adjacent upper label 116. In at least one embodiment, a transverse stripe 134 overlaps the trailing edge 130 of each upper label 116 and the leading edge 118 of each lower label 114.

In at least one embodiment of a multi-part upper and lower label system according to the present disclosure, one or more transverse stripes 134 are used in conjunction with a detection apparatus for purposes of synchronizing the dispensing of the upper label 116 and the adjacent lower label 114.

Figure 10A:
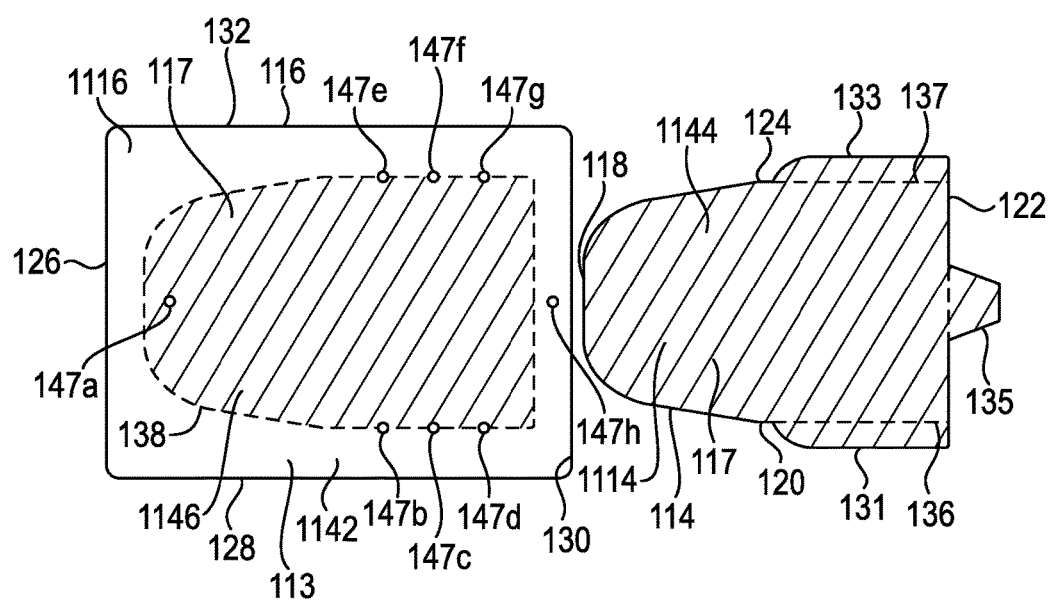
FIG. 10A shows the underside of a lower label and the undersurface of an upper label according to at least one embodiment of the present disclosure.
Figure 10B:
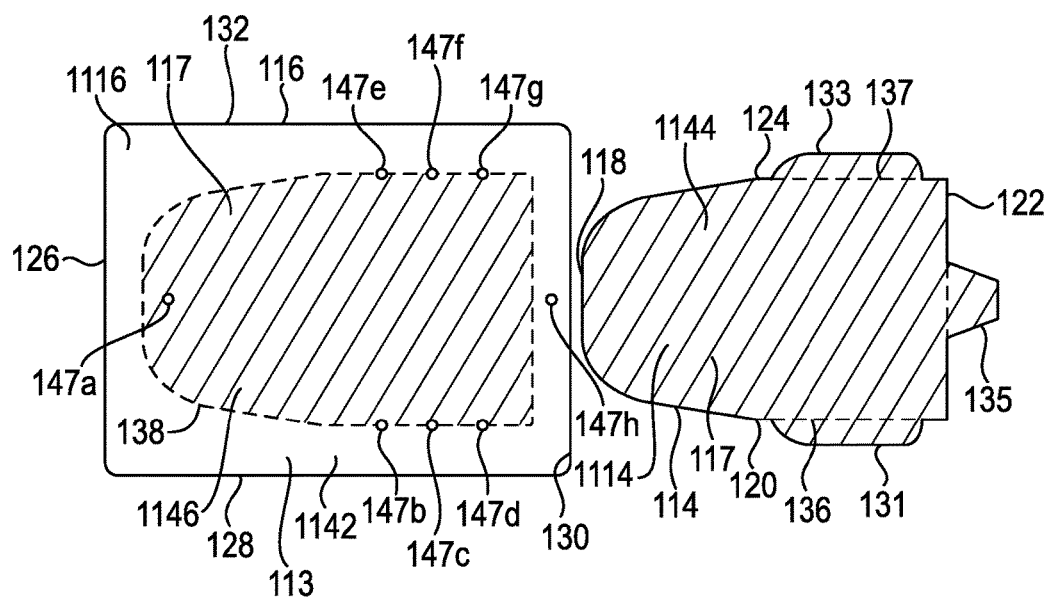
FIG. 10B shows the underside of a lower label and the undersurface of an upper label according to at least one embodiment of the present disclosure.

FIGS. 10A-B shows the underside of lower label 114 and the undersurface of upper label 116 according to at least one embodiment of the present disclosure, with carrier 112 not visible for purposes of clarity. Shown in FIGS. 10A-B is underside 1114 of lower label 114, comprising leading edge 118, trailing edge 122, side edges 120 and 124, side tabs 131 and 133, trailing tab 135, and removable region underside 1144. In an embodiment of multi-part upper and lower label system 100 according to the present disclosure such as is shown in FIG. 10A, a trailing edge of side tabs 131 and 133 is substantially even with trailing edge 122. In an embodiment of multi-part upper and lower label system 100 according to the present disclosure such as is shown in FIG. 10B, a trailing edge of side tabs 131 and 133 is not even with trailing edge 122. Also shown in FIGS. 10A-B is undersurface 1116 of upper label 116, which is bounded by leading edge 126, trailing edge 130, and side edges 128 and 132.

In at least one embodiment, underside 1114 of lower label 114 is substantially free of adhesive. In at least one embodiment, underside 1114 of lower label 114 comprises adhesive 113 on all of or substantially all of or a majority of its surface area, but underside 1114 comprises an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness. In at least one embodiment, all of underside 1114 is free of or substantially free of adhesive properties, although in such an embodiment underside 1114 may retain a slight tackiness. In at least one alternate embodiment, at least a portion of the underside of trailing tab 135 may comprise adhesive 113 on all of or substantially all of or a majority of its surface area. In such an embodiment, adhesive 113 serves to removably adhere lower label 114 to carrier 112 until lower label 114 is dispensed.

In at least one embodiment of the present disclosure, undersurface 1116 of upper label 116 comprises a first portion 1142 and a second portion 1146, separated by a line of weakness 138. First portion 1142 comprises the undersurface of frame 142. Second portion 1146 comprises the undersurface of removable segment 146. In at least one embodiment, first portion 1142 comprises adhesive 113 on all of or substantially all of or a majority of its surface area. In at least one embodiment, second portion 1146 is free of or substantially free of adhesive. In at least one embodiment, second portion 1146 comprises adhesive 113 on all of or substantially all of or a majority of its surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness.

Figure 11A:
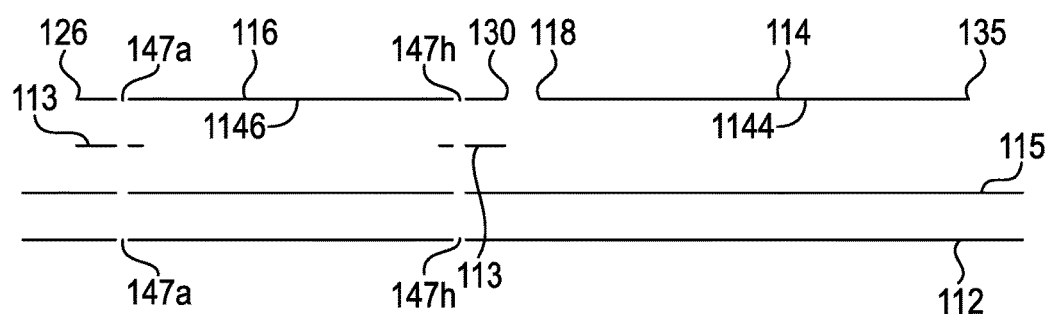
FIG. 11A shows a cross-sectional view of a multi-part upper and lower label system according to at least one embodiment of the present disclosure.

FIG. 11A shows a cross-sectional view of a multi-part upper and lower label system according to at least one embodiment of the present disclosure taken on line XI-XI of FIG. 9A or FIG. 9B. The multi-part upper and lower label system is shown in FIG. 11A in a semi-exploded state for purposes of clarity. Shown in FIG. 11A are carrier 112, adhesive 113, lower label 114 including leading edge 118 and trailing tab 135, release coating 115, upper label 116 including leading edge 126 and trailing edge 130, hole 147a, and hole 147h. As shown in this embodiment of a multi-part upper and lower label system according to the present disclosure, underside 1144 and second portion 1146 are free of adhesive 113.

Figure 11B:
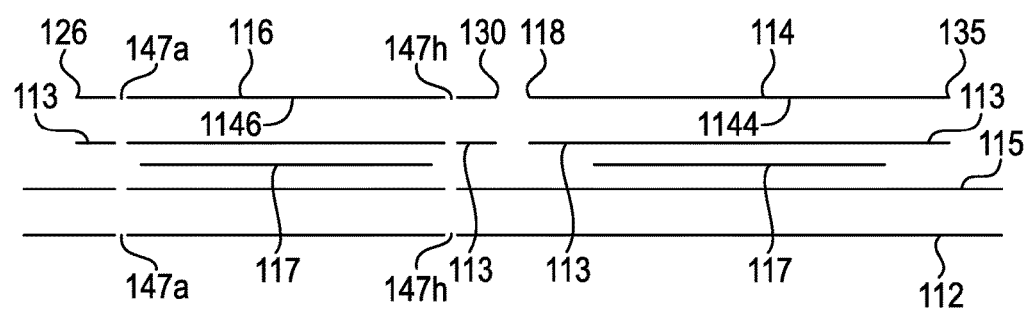
FIG. 11B shows a cross-sectional view of a multi-part upper and lower label system according to at least one embodiment of the present disclosure.

FIG. 11B shows a cross-sectional view of a multi-part upper and lower label system according to at least one embodiment of the present disclosure taken on line XI-XI of FIG. 9A or FIG. 9B. The multi-part upper and lower label system is shown in FIG. 11B in a semi-exploded state for purposes of clarity. Shown in FIG. 11B are carrier 112, adhesive 113, lower label 114 including leading edge 118 and trailing tab 135, release coating 115, upper label 116 including leading edge 126 and trailing edge 130, adhesive deadening agent 117, hole 147a, and hole 147h. In at least one other embodiment of the present disclosure, underside 1144 comprises adhesive 113 on all of or substantially all of or a majority of its surface area, but adhesive deadening agent 117 such as, for example, a non-adhesive varnish, covers adhesive 113 in those areas. Second portion 1146 also comprises adhesive 113 on all of or substantially all of or a majority of its surface area, but adhesive deadening agent 117 such as, for example, a non-adhesive varnish, covers adhesive 113 in those areas.

Figure 12A:
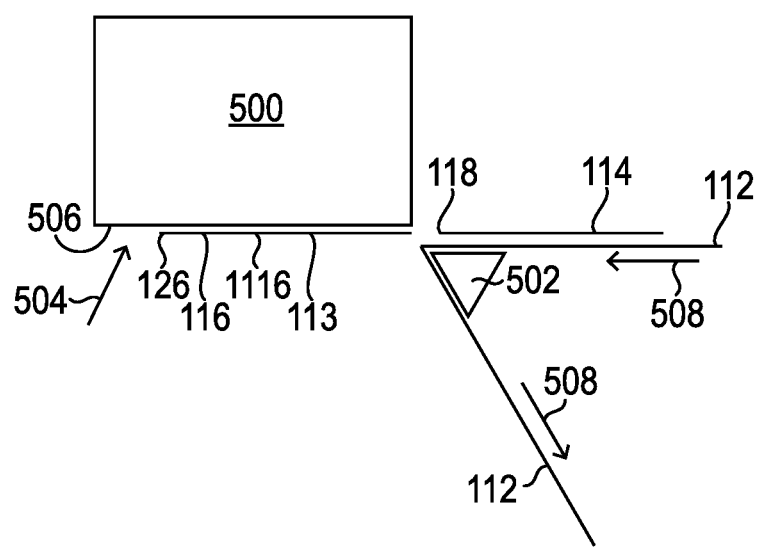
FIGS. 12A-B show side views of a multi-part upper and lower label system according to at least one embodiment of the present disclosure.
Figure 12B:
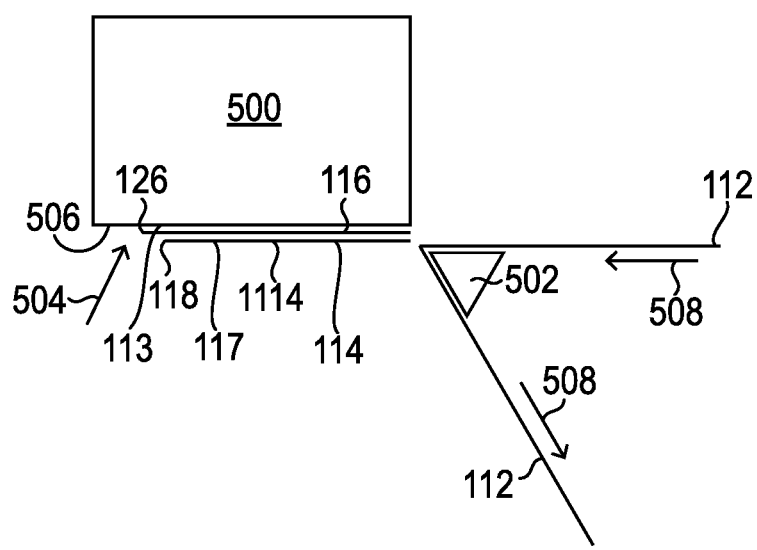

FIGS. 12A-B show a side view of a multi-part upper and lower label system according to at least one embodiment of the present disclosure while in use. As shown in FIG. 12A, carrier 112 with upper label 116 and lower label 114 thereon is advanced in direction 508. Carrier 112 is routed around member 502, causing upper label 116 to be dispensed from carrier 112 beginning with leading edge 126. At least a portion of undersurface 1116 of upper label 116 comprises adhesive 113 after it is dispensed from carrier 112. As upper label 116 is dispensed from carrier 112, upper label 116 passes under label applicator 500. Force 504 generated by label applicator 500 causes upper label 116 to be lifted and held against screen 506. Screen 506 forms a lower surface of label applicator 500.

Turning now to FIG. 12B, after upper label 116 is dispensed from carrier 112, carrier 112 with lower label 114 thereon is advanced in direction 508. Carrier 112 is routed around member 502, causing lower label 114 to be dispensed from carrier 112 beginning with leading edge 118. As lower label 114 is dispensed from carrier 112, lower label 114 passes under label applicator 500. Force 504 generated by label applicator 500 causes lower label 114 to be lifted and held against, and in registration with, upper label 116. In such an embodiment, lower label 114 is not in contact with screen 506. Because in at least one such embodiment of a multi-part upper and lower label system according to the present disclosure upper label 116 comprises one or more holes 147, even though the area of lower label 114 is less than the area of upper label 116, if force 504 is a vacuum force, force 504 acts through holes 147 in upper label 116 to hold lower label 114 against, and in registration with, upper label 116. Undersurface 1116 begins to be adhered to lower label 114 by adhesive 113.

In at least one embodiment of a multi-part upper and lower label system according to the present disclosure, prior to the time upper label 116 is dispensed from carrier 112, indicia is printed on or applied to upper label 116. In an embodiment of applied upper and lower label system according to the present disclosure where upper label 116 is a shipping label, indicia, such as, for example, destination address and/or other relevant shipping indicia, may be printed on or applied to upper label 116.

In at least one embodiment of a multi-part upper and lower label system according to the present disclosure, prior to the time lower label 114 is dispensed from carrier 112, indicia is printed on or applied to lower label 114. In an embodiment of applied upper and lower label system according to the present disclosure where lower label 114 is a packing list label, indicia, such as, for example, container contents and/or other packing list indicia, may be printed on or applied to lower label 114.

In at least one embodiment, label applicator 500 comprises a printing capability such as, for example, a thermal transfer printer or a direct thermal printer. In such an embodiment, indicia may be applied to upper label 116 and/or lower label 114 by label applicator 500.

Figure 13:
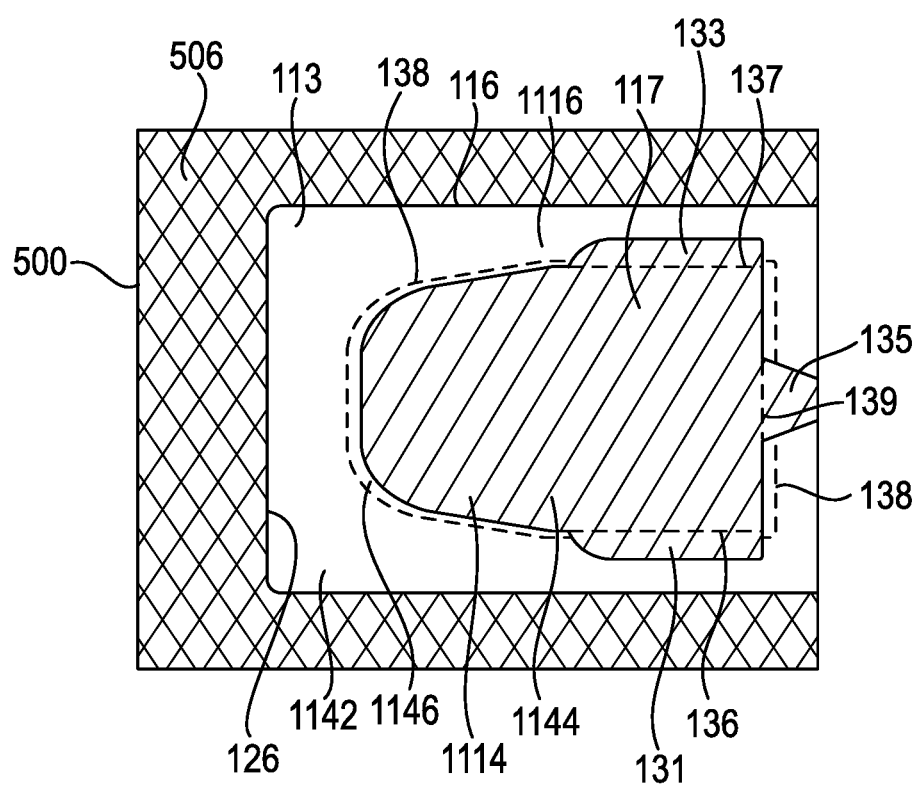
FIG. 13 shows the underside of a label applicator after an upper label and a lower label according to at least one embodiment of the present disclosure have been dispensed thereon.

FIG. 13 shows the underside of label applicator 500 after upper label 116 and lower label 114 have been dispensed thereon, according to at least one embodiment of a multi-part upper and lower label system according to the present disclosure. Visible in FIG. 13 is screen 506. Shown in FIG. 13 are undersurface 1116 comprising first portion 1142 and second portion 1146 separated by a line of weakness 138. First portion 1142 comprises effective amount of adhesive 113 on its surface area. Also shown in FIG. 13 is underside 1114 of lower label 114, comprising side tabs 131 and 133, trailing tab 135, lines of weakness 136, 137, and 139, and removable region underside 1144. As shown in FIG. 13, in at least one embodiment of a multi-part upper and lower label system according to the present disclosure only tabs 131, 133, and 135 come into contact with adhesive 113 on first portion 1142. Accordingly, in such an embodiment lower label 114 is adhered to undersurface 1116 only at tabs 131, 133, and 135.

Figure 14:
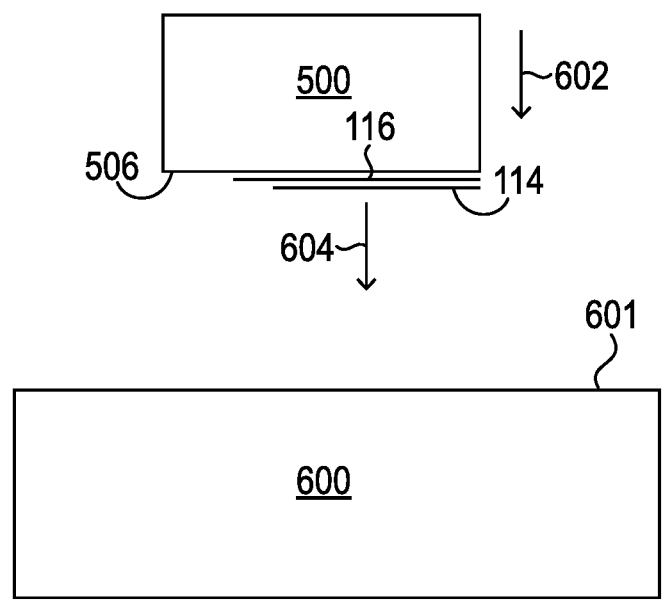
FIG. 14 shows a side view of the application of an upper label and a lower label according to at least one embodiment of the present disclosure to a surface of a container.

FIG. 14 shows a side view of the application of upper label 116 and lower label 114 to a surface 601 of container 600, according to at least one embodiment of the present disclosure. As shown in FIG. 14, label applicator 500 moves in direction 602, thereby moving upper label 116 and lower label 114 in direction 604 until the underside of lower label 114 is in contact with surface 601 of container 600. The pressure of label applicator 500 against surface 601 of container 600 causes adhesive 113 to adhere the undersurface 1116 of upper label 116 to surface 601 of container 600, and completes the adhesion of undersurface 1116 to lower label 114.

Figure 15:
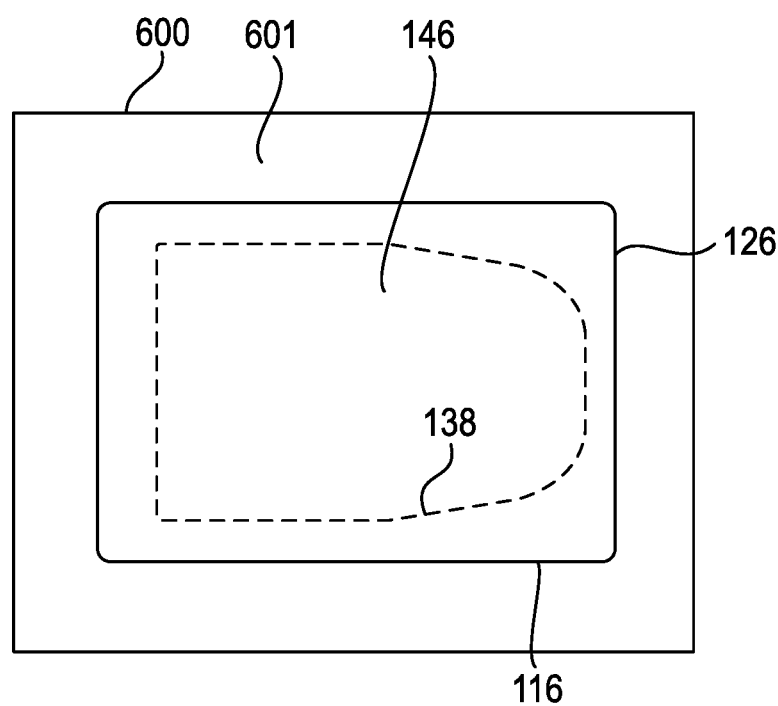
FIG. 15 shows an upper label and a lower label according to at least one embodiment of the present disclosure adhered to a surface of a container.

FIG. 15 shows lower label 114 and upper label 116 adhered to a surface of container 600. Shown in FIG. 15 is upper label 116 comprising a line of weakness 138 and removable segment 146. Lower label 114 comprising removable region 144 is concealed under upper label 116, with removable region 144 in registration with removable segment 146.

Figure 16A:
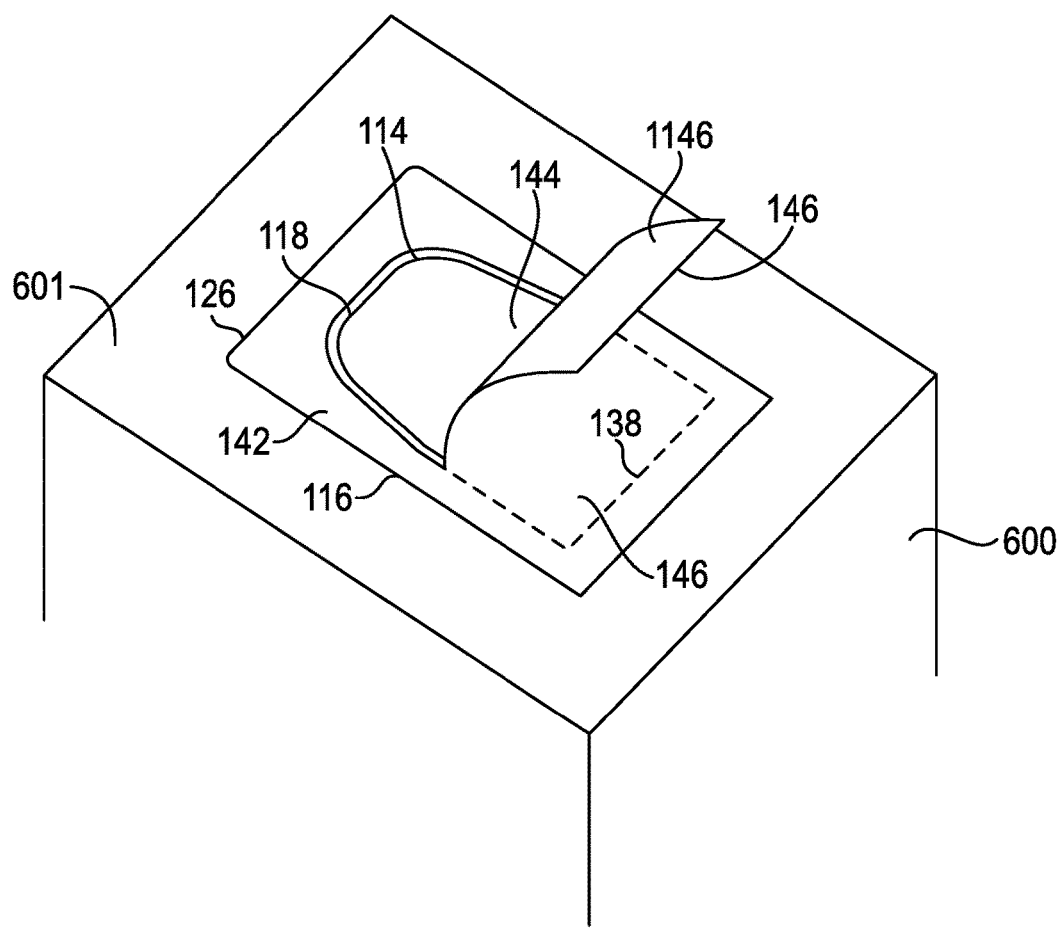
FIGS. 16A-B show a multi-part upper and lower label system according to at least one embodiment of the present disclosure.
Figure 16B:
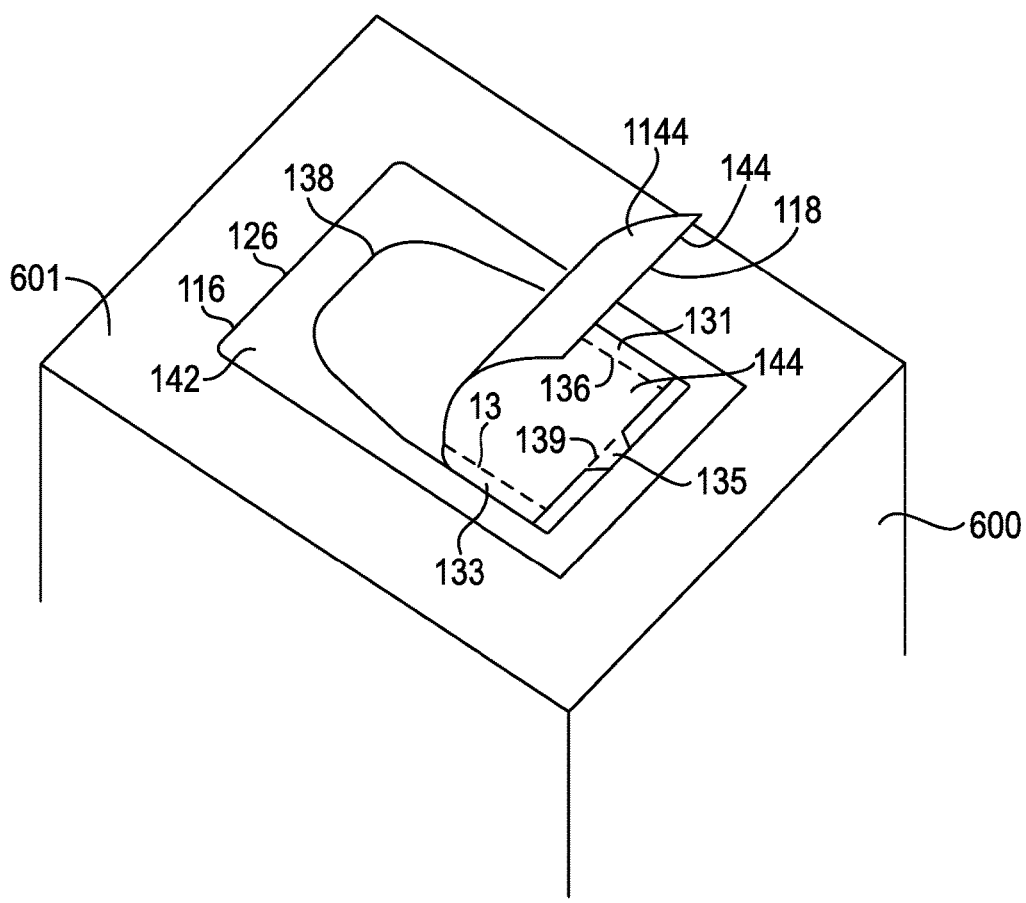

FIGS. 16A-B show an embodiment of a multi-part upper and lower label system according to the present disclosure. As shown in FIG. 16A, removable segment 146 of upper label 116 is partially removed from upper label 116 along a line of weakness 138. Removing segment 146 in this fashion reveals removable region 144. In an embodiment of applied upper and lower label system according to the present disclosure where lower label 114 is a packing list label, removable region 144 may comprise a removable packing list. Because in such an embodiment of the present disclosure underside 1146 has no more than very limited adhesive properties, removable region 144 is not damaged or defaced by removing segment 146. As segment 146 is removed, frame 142 of upper label 116 remains adhered to lower label 114 at tabs 131, 133, and 135 and also to surface 601.

As shown in FIG. 16B, removable region 144 may be removed from lower label 114 along lines of weakness 136, 137, and 139. In an embodiment of applied upper and lower label system according to the present disclosure where lower label 114 is a packing list label, removable region 144 may comprise a removable packing list. Because in such an embodiment of the present disclosure underside 1144 has no more than very limited adhesive properties, removable region 144 is readily removable from surface 601 of container 600. After removable region 144 is removed, frame 142 of upper label 116 remains adhered to surface 601 of container 600, and tabs 131, 133, and 135 are retained under frame 142.

Figure 17:
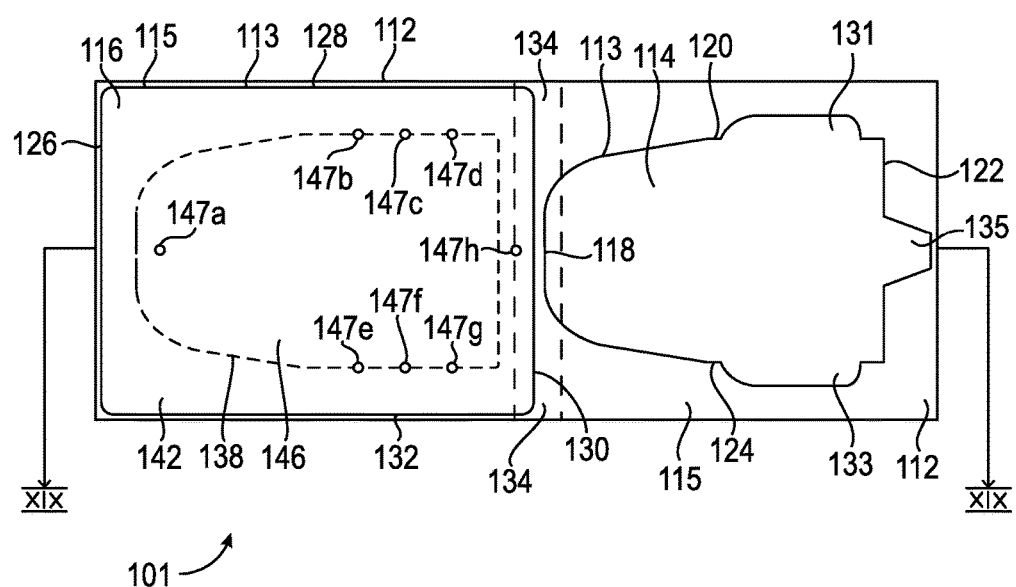
FIG. 17 shows a multi-part upper and lower label system according to at least one embodiment of the present disclosure.

FIG. 17 shows multi-part upper and lower label system 101 according to at least one embodiment of the present disclosure. Shown in FIG. 17 are lower label 114 and upper label 116. In at least one embodiment of the present disclosure, lower label 114 and upper label 116 reside adjacent to each other on carrier 112. In at least one embodiment of a multi-part upper and lower label system according to the present disclosure, a plurality of lower labels 114 and upper labels 116 reside alternately on carrier 112. In at least one embodiment of a multi-part upper and lower label system 101 according to the present disclosure, each upper label 116 comprises a shipping label, and each lower label 114 comprises a return label.

According to at least one embodiment of the present disclosure, lower label 114 comprises leading edge 118, trailing edge 122, side edges 120 and 124, side tabs 131 and 133, and trailing tab 135. In an embodiment of multi-part upper and lower label system 101 according to the present disclosure, a trailing edge of side tabs 131 and 133 may be substantially even with trailing edge 122.

According to at least one embodiment of the present disclosure, upper label 116 is bounded by leading edge 126, trailing edge 130, and side edges 128 and 132. One or more lines of weakness 138 define a boundary of removable segment 146. Frame 142 lies between a line of weakness 138 and leading edge 126, trailing edge 130, and side edges 128 and 132. According to at least one embodiment of the present disclosure, upper label 116 comprises one or more holes 147. Holes 147a-147h are shown in the embodiment of label system 101 of FIG. 17. Other embodiments of label system 101 may have a greater number or lesser number of holes. According to at least one embodiment of the present disclosure, holes 147 extend through segment 146 and carrier 112. In at least one embodiment of the present disclosure, holes 147 extend only through segment 146.

According to at least one embodiment of the present disclosure, prior to use upper label 116 and lower label 114 are deployed adjacent to each other on carrier 112, thereby enabling upper label 116 and lower label 114 to be dispensed from carrier 112 in sequence as discussed herein. Carrier 112 comprises, in at least one embodiment, release coating 115 on the surface of carrier 112 facing the underside of lower label 114 and undersurface of upper label 116. In at least one embodiment of the present disclosure, release coating 115 is a silicone release coating. According to at least one embodiment of label system 101 according to the present disclosure, adhesive 113 is interposed between release coat 115 and the underside of lower label 114 and undersurface of upper label 116, as discussed hereinafter. In at least one embodiment of the present disclosure, adhesive 113 is a pressure sensitive adhesive.

In at least one embodiment, carrier 112 comprises transverse stripe 134. Transverse stripe 134 comprises a color or shading of a region of carrier 112 that is in contrast with the color of the remainder of carrier 112. In at least one embodiment, a transverse stripe 134 is located after each upper label 116 and before the adjacent lower label 114. In at least one embodiment, a transverse stripe 134 is located after each lower label 114 and before the adjacent upper label 116. In at least one embodiment, a transverse stripe 134 overlaps the trailing edge 130 of each upper label 116 and the leading edge 118 of each lower label 114.

In at least one embodiment of a multi-part upper and lower label system according to the present disclosure, one or more transverse stripes 134 are used in conjunction with a detection apparatus for purposes of synchronizing the dispensing of the upper label 116 and the adjacent lower label 114.

Figure 18:
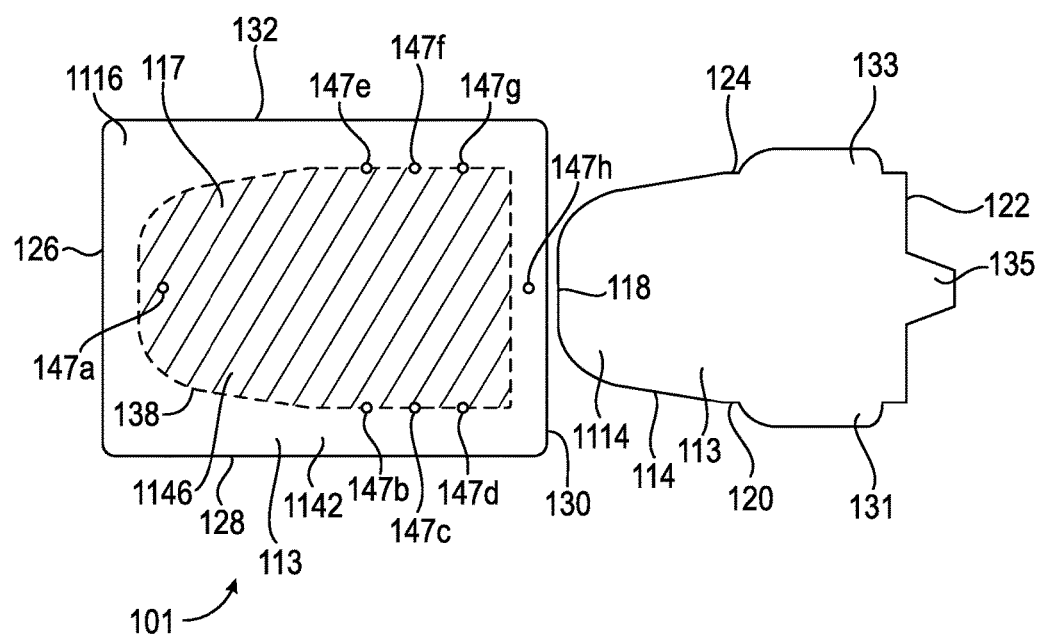
FIG. 18 shows the underside of a lower label and the undersurface of an upper label according to at least one embodiment of the present disclosure.

FIG. 18 shows the underside of lower label 114 and the undersurface of upper label 116 according to at least one embodiment of the present disclosure, with carrier 112 not visible for purposes of clarity. Shown in FIG. 18 is underside 1114 of lower label 114, comprising leading edge 118, trailing edge 122, side edges 120 and 124, side tabs 131 and 133, and trailing tab 135. In an embodiment of multi-part upper and lower label system 101 according to the present disclosure, a trailing edge of side tabs 131 and 133 may be substantially even with trailing edge 122. Also shown in FIG. 18 is undersurface 1116 of upper label 116, which is bounded by leading edge 126, trailing edge 130, and side edges 128 and 132.

In at least one embodiment, underside 1114 of lower label 114 comprises adhesive 113 on at least a portion of its surface area. In at least one embodiment, underside 1114 of lower label 114 comprises adhesive 113 on all of or substantially all of or a majority of its surface area. In at least one embodiment of the present disclosure, undersurface 1116 of upper label 116 comprises a first portion 1142 and a second portion 1146, separated by a line of weakness 138. First portion 1142 comprises the undersurface of frame 142. Second portion 1146 comprises the undersurface of removable segment 146. In at least one embodiment, first portion 1142 comprises adhesive 113 on all of or substantially all of or a majority of its surface area. In at least one embodiment, second portion 1146 is free of or substantially free of adhesive. In at least one embodiment, second portion 1146 comprises adhesive 113 on all of or substantially all of or a majority of its surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness.

Figure 19A:
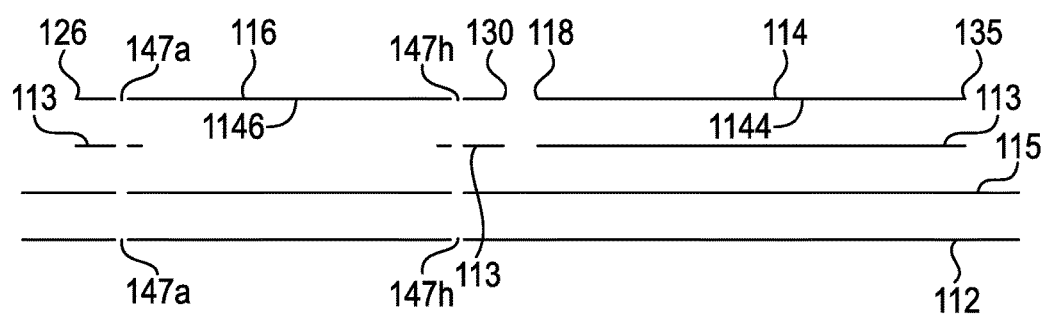
FIG. 19A shows a cross-sectional view of a multi-part upper and lower label system according to at least one embodiment of the present disclosure.

FIG. 19A shows a cross-sectional view of a multi-part upper and lower label system according to at least one embodiment of the present disclosure taken on line XIX-XIX of FIG. 17. The multi-part upper and lower label system is shown in FIG. 19A in a semi-exploded state for purposes of clarity. Shown in FIG. 19A are carrier 112, adhesive 113, lower label 114 including leading edge 118 and trailing tab 135, release coating 115, upper label 116 including leading edge 126 and trailing edge 130, hole 147a, and hole 147h. As shown in this embodiment of a multi-part upper and lower label system according to the present disclosure, second portion 1146 is free of adhesive 113 and underside 1144 comprises adhesive 113 on all of or substantially all of or a majority of its surface area.

Figure 19B:
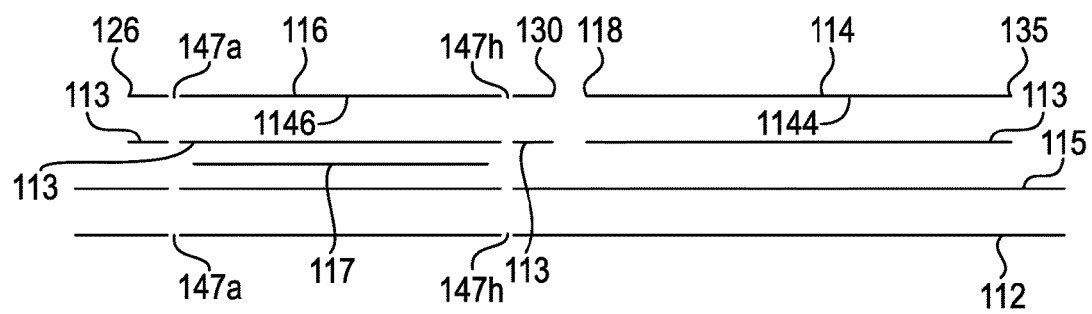
FIG. 19B shows a cross-sectional view of a multi-part upper and lower label system according to at least one embodiment of the present disclosure.

FIG. 19B shows a cross-sectional view of a multi-part upper and lower label system according to at least one embodiment of the present disclosure taken on line XIX-XIX of FIG. 17. The multi-part upper and lower label system is shown in FIG. 19B in a semi-exploded state for purposes of clarity. Shown in FIG. 19B are carrier 112, adhesive 113, lower label 114 including leading edge 118 and trailing tab 135, release coating 115, upper label 116 including leading edge 126 and trailing edge 130, adhesive deadening agent 117, hole 147a, and hole 147h. In at least one other embodiment of the present disclosure, underside 1144 comprises adhesive 113 on all of or substantially all of or a majority of its surface area. Second portion 1146 also comprises adhesive 113 on all of or substantially all of or a majority of its surface area, but adhesive deadening agent 117 such as, for example, a non-adhesive varnish, covers adhesive 113 in that area.

Multi-part upper and lower label system 101 according to at least one embodiment of the present disclosure may be automatically applied to a surface through the use of apparatuses and processes substantially similar to the apparatuses and processes shown and described in FIGS. 12A-15 and this written description. Multi-part upper and lower label system 101 according to at least one embodiment of the present disclosure may be used in a manner substantially similar to manner shown and described in FIGS. 16A-16B and this written description, provided that because underside 1114 of lower label 114 of multi-part upper and lower label system 101 according to at least one embodiment of the present disclosure comprises adhesive 113 on all of or substantially all of or a majority of its surface area, lower label 114 of multi-part upper and lower label system 101 is not readily removable from the surface to which it is applied. According to at least one embodiment of multi-part upper and lower label system 101 according to the present disclosure, upper label 116 comprises shipping address indicia and lower label 114 comprises return shipping address indicia. According to such an embodiment, if a container comprising upper label 116 and lower label 114 is to be returned to its source, upon receipt the recipient may remove upper label 116 to reveal return shipping address indicia on lower label 114. The container then may be shipped back to its source.

Figure 20:
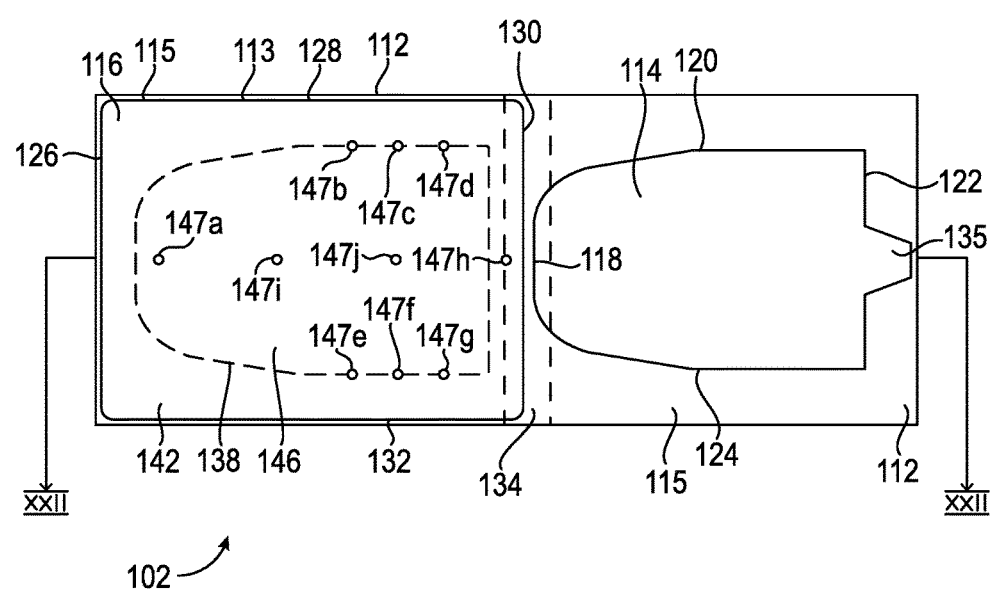
FIG. 20 shows a multi-part upper and lower label system according to at least one embodiment of the present disclosure.

FIG. 20 shows multi-part upper and lower label system 102 according to at least one embodiment of the present disclosure. Shown in FIG. 20 are lower label 114 and upper label 116. In at least one embodiment of the present disclosure, lower label 114 and upper label 116 reside adjacent to each other on carrier 112. In at least one embodiment of a multi-part upper and lower label system according to the present disclosure, a plurality of lower labels 114 and upper labels 116 reside alternately on carrier 112. In at least one embodiment of a multi-part upper and lower label system 102 according to the present disclosure, each lower label 114 comprises a packing list label, and each upper label 116 comprises a shipping label.

According to at least one embodiment of the present disclosure, lower label 114 comprises leading edge 118, trailing edge 122, side edges 120 and 124, and trailing tab 135. According to at least one embodiment of the present disclosure, upper label 116 is bounded by leading edge 126, trailing edge 130, and side edges 128 and 132. One or more lines of weakness 138 define a boundary of removable segment 146. Frame 142 lies between a line of weakness 138 and leading edge 126, trailing edge 130, and side edges 128 and 132. According to at least one embodiment of the present disclosure, upper label 116 comprises one or more holes 147. Holes 147a-147i are shown in the embodiment of label system 102 of FIG. 20. Other embodiments of label system 102 may have a greater number or lesser number of holes. According to at least one embodiment of the present disclosure, holes 147 extend through segment 146 and carrier 112. In at least one embodiment of the present disclosure, holes 147 extend only through segment 146.

According to at least one embodiment of the present disclosure, prior to use upper label 116 and lower label 114 are deployed adjacent to each other on carrier 112, thereby enabling upper label 116 and lower label 114 to be dispensed from carrier 112 in sequence as discussed herein. Carrier 112 comprises, in at least one embodiment, release coating 115 on the surface of carrier 112 facing the underside of lower label 114 and undersurface of upper label 116. In at least one embodiment of the present disclosure, release coating 115 is a silicone release coating. According to at least one embodiment of label system 102 according to the present disclosure, adhesive 113 is interposed between release coat 115 and the underside of lower label 114 and undersurface of upper label 116, as discussed hereinafter. In at least one embodiment of the present disclosure, adhesive 113 is a pressure sensitive adhesive.

In at least one embodiment, carrier 112 comprises transverse stripe 134. Transverse stripe 134 comprises a color or shading of a region of carrier 112 that is in contrast with the color of the remainder of carrier 112. In at least one embodiment, a transverse stripe 134 is located after each upper label 116 and before the adjacent lower label 114. In at least one embodiment, a transverse stripe 134 is located after each lower label 114 and before the adjacent upper label 116. In at least one embodiment, a transverse stripe 134 overlaps the trailing edge 130 of each upper label 116 and the leading edge 118 of each lower label 114.

In at least one embodiment of a multi-part upper and lower label system according to the present disclosure, one or more transverse stripes 134 are used in conjunction with a detection apparatus for purposes of synchronizing the dispensing of the upper label 116 and the adjacent lower label 114.

Figure 21:
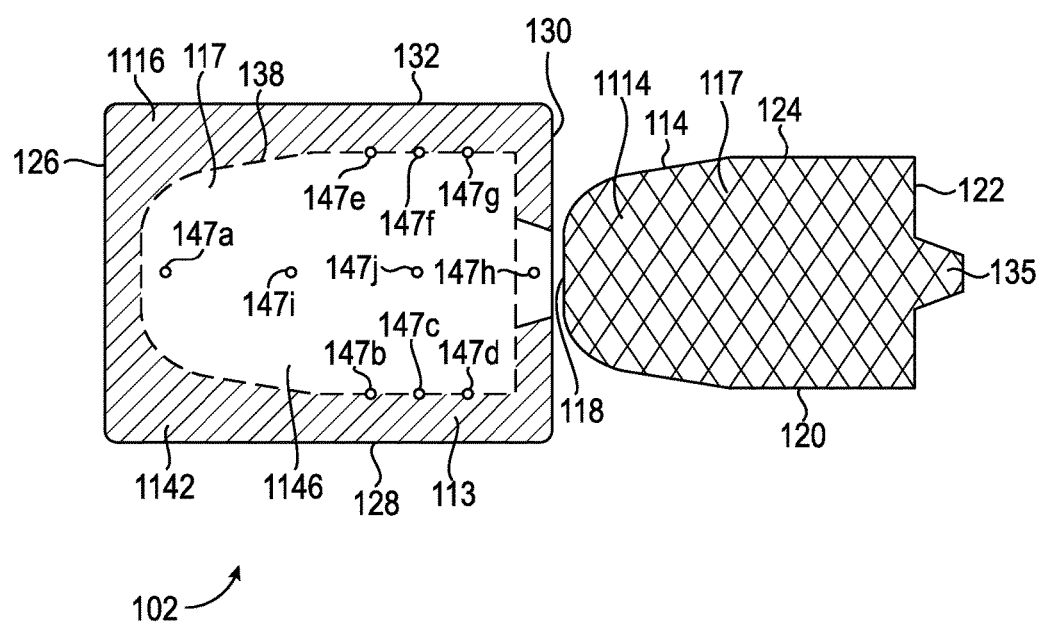
FIG. 21 shows the underside of a lower label and the undersurface of an upper label according to at least one embodiment of the present disclosure.

FIG. 21 shows the underside of lower label 114 and the undersurface of upper label 116 according to at least one embodiment of the present disclosure, with carrier 112 not visible for purposes of clarity. Shown in FIG. 21 is underside 1114 of lower label 114, comprising leading edge 118, trailing edge 122, side edges 120 and 124, and trailing tab 135. Also shown in FIG. 21 is undersurface 1116 of upper label 116, which is bounded by leading edge 126, trailing edge 130, and side edges 128 and 132.

In at least one embodiment, underside 1114 of lower label 114 is free of or substantially free of adhesive. In at least one embodiment, underside 1114 comprises adhesive 113 on all of or substantially all of or a majority of its surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness.

In at least one embodiment of the present disclosure, undersurface 1116 of upper label 116 comprises a first portion 1142, a second portion 1146, and a third portion 1147. First portion 1142 and third portion 1147 comprise the undersurface of frame 142. Second portion 1146 comprises the undersurface of removable segment 146. In at least one embodiment of the present disclosure, first portion 1142 and second portion 1146 are separated by a line of weakness 138.

In at least one embodiment, first portion 1142 comprises adhesive 113 on all of or substantially all of or a majority of its surface area. In at least one embodiment, second portion 1146 and third portion 1147 are free of or substantially free of adhesive. In at least one embodiment, second portion 1146 and third portion 1147 comprise adhesive 113 on all of or substantially all of or a majority of their surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness.

Figure 22A:
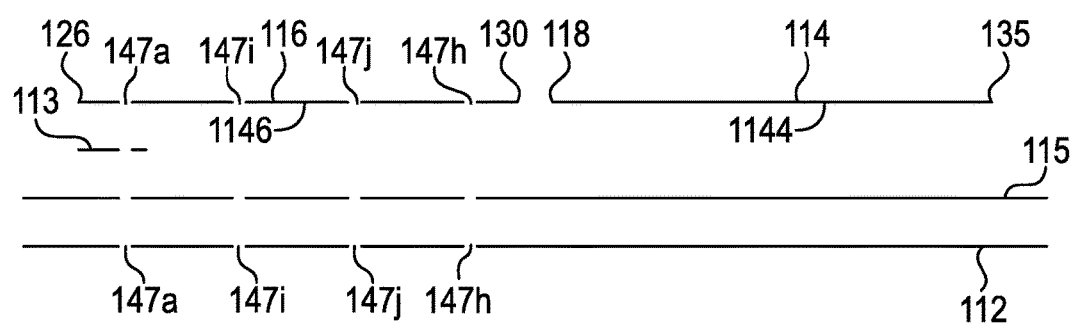
FIG. 22A shows a cross-sectional view of a multi-part upper and lower label system according to at least one embodiment of the present disclosure.

FIG. 22A shows a cross-sectional view of a multi-part upper and lower label system according to at least one embodiment of the present disclosure taken on line XXII-XXII of FIG. 20. The multi-part upper and lower label system is shown in FIG. 22A in a semi-exploded state for purposes of clarity. Shown in FIG. 22A are carrier 112, adhesive 113, lower label 114 including leading edge 118 and trailing tab 135, release coating 115, upper label 116 including leading edge 126 and trailing edge 130, hole 147a, hole 147h, hole 147i, and hole 147j. As shown in this embodiment of a multi-part upper and lower label system according to the present disclosure, second portion 1146 is free of adhesive 113 and underside 1144 is free of adhesive 113.

Figure 22B:
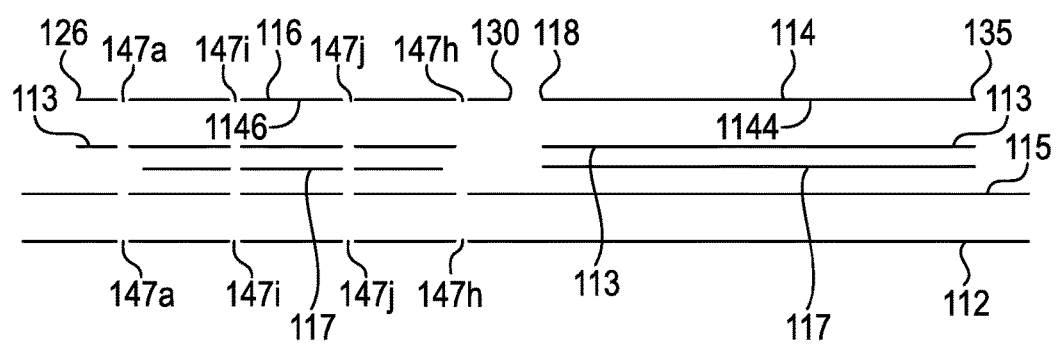
FIG. 22B shows a cross-sectional view of a multi-part upper and lower label system according to at least one embodiment of the present disclosure.

FIG. 22B shows a cross-sectional view of a multi-part upper and lower label system according to at least one embodiment of the present disclosure taken on line XXII-XXII of FIG. 20. The multi-part upper and lower label system is shown in FIG. 22B in a semi-exploded state for purposes of clarity. Shown in FIG. 22B are carrier 112, adhesive 113, lower label 114 including leading edge 118 and trailing tab 135, release coating 115, upper label 116 including leading edge 126 and trailing edge 130, adhesive deadening agent 117, hole 147a, hole 147h, hole 147i, and hole 147j. In at least one other embodiment of the present disclosure, underside 1144 comprises adhesive 113 on all of or substantially all of or a majority of its surface area, but adhesive deadening agent 117 such as, for example, a non-adhesive varnish, covers adhesive 113 in that area. Second portion 1146 also comprises adhesive 113 on all of or substantially all of or a majority of its surface area, but adhesive deadening agent 117 such as, for example, a non-adhesive varnish, covers adhesive 113 in that area.

Multi-part upper and lower label system 102 according to at least one embodiment of the present disclosure may be automatically applied to a surface through the use of apparatuses and processes substantially similar to the apparatuses and processes shown and described in FIGS. 12A-15 and this written description. Multi-part upper and lower label system 102 according to at least one embodiment of the present disclosure may be used in a manner substantially similar to manner shown and described in FIGS. 16A-16B and this written description, provided that because third portion 1147 is either free of adhesive 113 or covered with an adhesive deadening agent 117, when lower label 114 is removed from the surface to which upper and lower label system 102 has been applied, all of lower label 114 including trailing tab 135 is removed from such surface.

Figure 23:
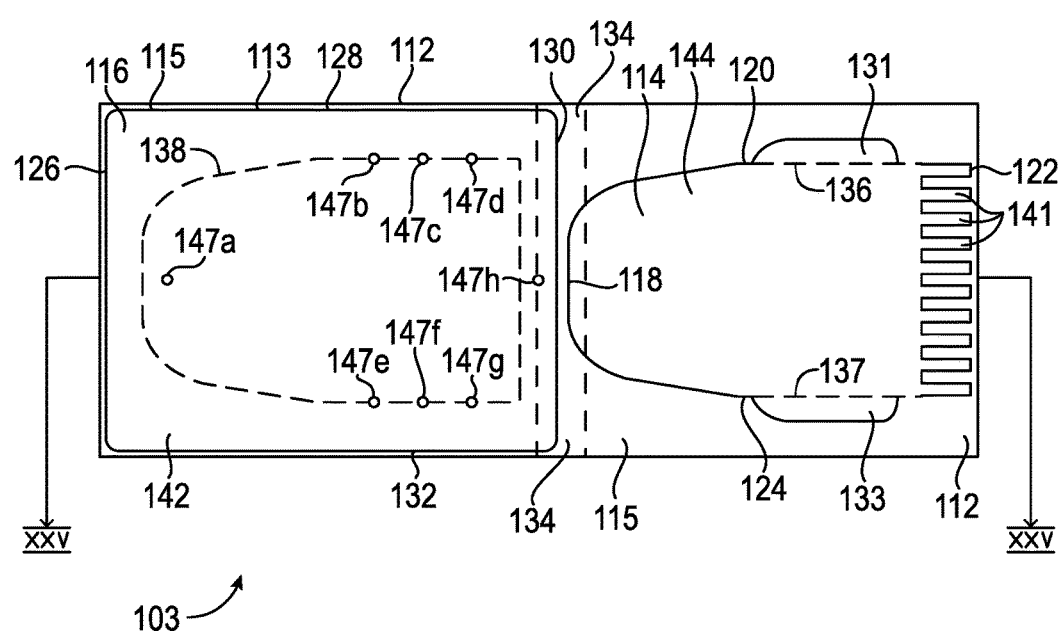
FIG. 23 shows a multi-part upper and lower label system according to at least one embodiment of the present disclosure.

FIG. 23 shows multi-part upper and lower label system 103 according to at least one embodiment of the present disclosure. Shown in FIG. 23 are lower label 114 and upper label 116. In at least one embodiment of the present disclosure, lower label 114 and upper label 116 reside adjacent to each other on carrier 112. In at least one embodiment of a multi-part upper and lower label system according to the present disclosure, a plurality of lower labels 114 and upper labels 116 reside alternately on carrier 112. In at least one embodiment of a multi-part upper and lower label system 103 according to the present disclosure, each upper label 116 comprises a shipping label, and each lower label 114 comprises a packing list label.

According to at least one embodiment of the present disclosure, lower label 114 comprises leading edge 118, trailing edge 122, side edges 120 and 124, side tabs 131 and 133, trailing tab 135, and removable region 144. One or more lines of weakness 136 and 137 define a boundary between removable region 144 and side tabs 131 and 133, respectively. In at least one such embodiment, trailing edge 122 comprises a plurality of trailing tabs 141. In at least one embodiment of the present disclosure, removable region 144 comprises a removable packing list.

According to at least one embodiment of the present disclosure, upper label 116 is bounded by leading edge 126, trailing edge 130, and side edges 128 and 132. One or more lines of weakness 138 define a boundary of removable segment 146. Frame 142 lies between a line of weakness 138 and leading edge 126, trailing edge 130, and side edges 128 and 132. According to at least one embodiment of the present disclosure, upper label 116 comprises one or more holes 147. Holes 147a-147h are shown in the embodiment of label system 103 of FIG. 23. Other embodiments of label system 103 may have a greater number or lesser number of holes. According to at least one embodiment of the present disclosure, holes 147 extend through segment 146 and carrier 112. In at least one embodiment of the present disclosure, holes 147 extend only through segment 146.

According to at least one embodiment of the present disclosure, prior to use upper label 116 and lower label 114 are deployed adjacent to each other on carrier 112, thereby enabling upper label 116 and lower label 114 to be dispensed from carrier 112 in sequence as discussed herein. Carrier 112 comprises, in at least one embodiment, release coating 115 on the surface of carrier 112 facing the underside of lower label 114 and undersurface of upper label 116. In at least one embodiment of the present disclosure, release coating 115 is a silicone release coating. According to at least one embodiment of label system 103 according to the present disclosure, adhesive 113 is interposed between release coat 115 and the underside of lower label 114 and undersurface of upper label 116, as discussed hereinafter. In at least one embodiment of the present disclosure, adhesive 113 is a pressure sensitive adhesive.

In at least one embodiment, carrier 112 comprises transverse stripe 134. Transverse stripe 134 comprises a color or shading of a region of carrier 112 that is in contrast with the color of the remainder of carrier 112. In at least one embodiment, a transverse stripe 134 is located after each upper label 116 and before the adjacent lower label 114. In at least one embodiment, a transverse stripe 134 is located after each lower label 114 and before the adjacent upper label 116. In at least one embodiment, a transverse stripe 134 overlaps the trailing edge 130 of each upper label 116 and the leading edge 118 of each lower label 114.

In at least one embodiment of a multi-part upper and lower label system according to the present disclosure, one or more transverse stripes 134 are used in conjunction with a detection apparatus for purposes of synchronizing the dispensing of the upper label 116 and the adjacent lower label 114.

Figure 24:
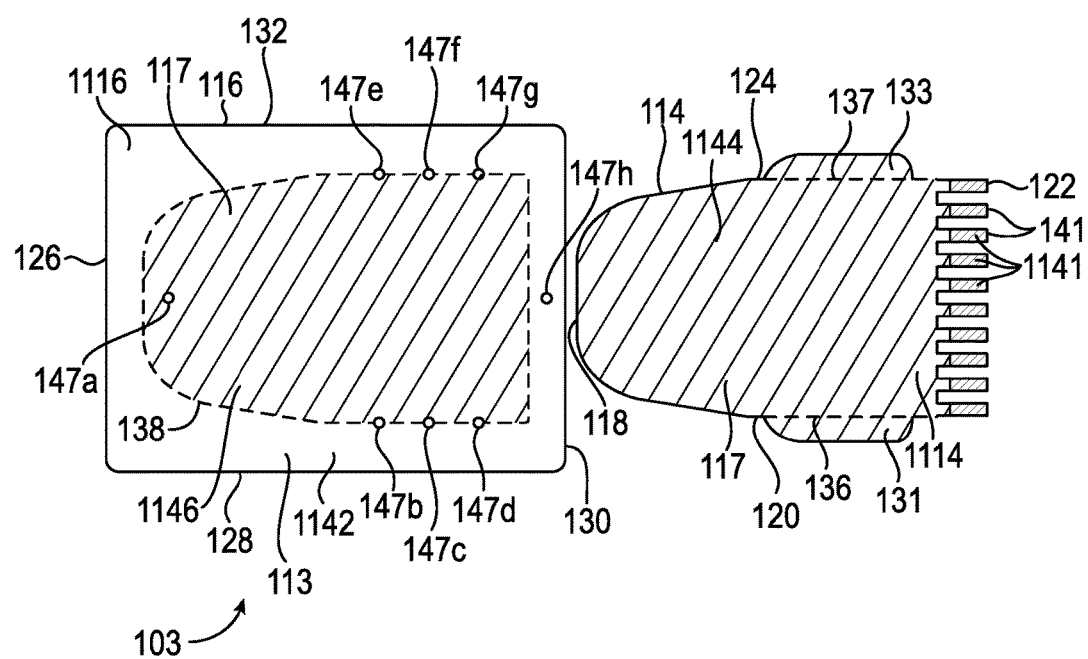
FIG. 24 shows the underside of a lower label and the undersurface of an upper label according to at least one embodiment of the present disclosure.

FIG. 24 shows the underside of lower label 114 and the undersurface of upper label 116 according to at least one embodiment of the present disclosure, with carrier 112 not visible for purposes of clarity. Shown in FIG. 24 is underside 1114 of lower label 114, comprising leading edge 118, trailing edge 122, side edges 120 and 124, side tabs 131 and 133, trailing tabs 141, and removable region underside 1144. In at least one embodiment, the underside of at least one of trailing tabs 141 comprises segment 1141. According to such an embodiment, each segment 1141 comprises adhesive 113 on all of or substantially all of or a majority of its surface area. In such an embodiment, each segment 1141 comprising adhesive 113 serves to removably adhere packing list label 114 to carrier 112 until packing list label 114 is dispensed. According to such an embodiment, the rest of underside 1114 of packing list label 114 is substantially free of adhesive. In at least one embodiment, underside 1114 of packing list label 114 comprises adhesive 113 on all of or substantially all of or a majority of its surface area, but the portions of underside 1114 other than segments 1141 comprise an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness. In at least one embodiment, all of underside 1114 is free of or substantially free of adhesive properties, although in such an embodiment underside 1114 may retain a slight tackiness.

Also shown in FIG. 24 is undersurface 1116 of upper label 116, which is bounded by leading edge 126, trailing edge 130, and side edges 128 and 132. In at least one embodiment of the present disclosure, undersurface 1116 of upper label 116 comprises a first portion 1142 and a second portion 1146, separated by a line of weakness 138. First portion 1142 comprises the undersurface of frame 142. Second portion 1146 comprises the undersurface of removable segment 146. In at least one embodiment, first portion 1142 comprises adhesive 113 on all of or substantially all of or a majority of its surface area. In at least one embodiment, second portion 1146 is free of or substantially free of adhesive. In at least one embodiment, second portion 1146 comprises adhesive 113 on all of or substantially all of or a majority of its surface area, but an adhesive deadening agent 117 such as, for example, a non-adhesive varnish, covers adhesive 113 in those areas thereby rendering adhesive 113 ineffective in those areas. In at least one embodiment of the present disclosure, adhesive deadening agent 117 is selected so as to not render adhesive 113 completely ineffective in those areas treated by adhesive deadening agent 117. In such an embodiment, after treatment of adhesive 113 with adhesive deadening agent 117, the treated areas retain a slight tackiness.

Figure 25A:
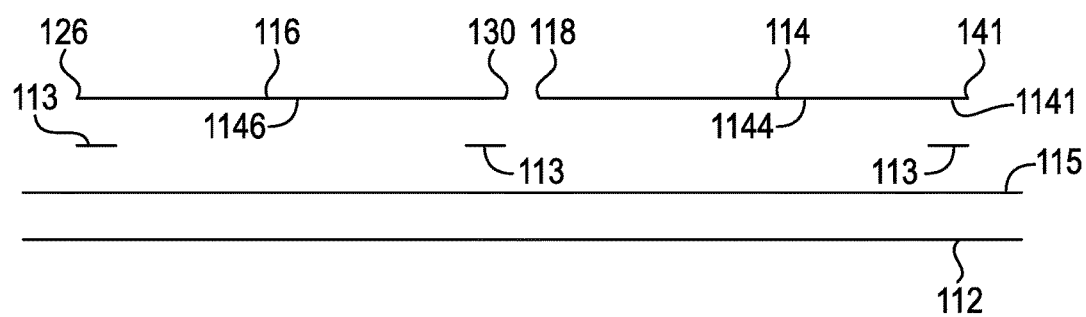
FIG. 25A shows a cross-sectional view of a multi-part upper and lower label system according to at least one embodiment of the present disclosure.

FIG. 25A shows a cross-sectional view of a multi-part upper and lower label system according to at least one embodiment of the present disclosure taken on line XXV-XXV of FIG. 25. The multi-part upper and lower label system is shown in FIG. 25A in a semi-exploded state for purposes of clarity. Shown in FIG. 25A are carrier 112, adhesive 113, lower label 114 including leading edge 118, a trailing tab 141 and a segment 1141, release coating 115, upper label 116 including leading edge 126 and trailing edge 130. As shown in this embodiment of a multi-part upper and lower label system according to the present disclosure, second portion 1146 is free of adhesive 113 and underside 1144 is free of adhesive 113.

Figure 25B:
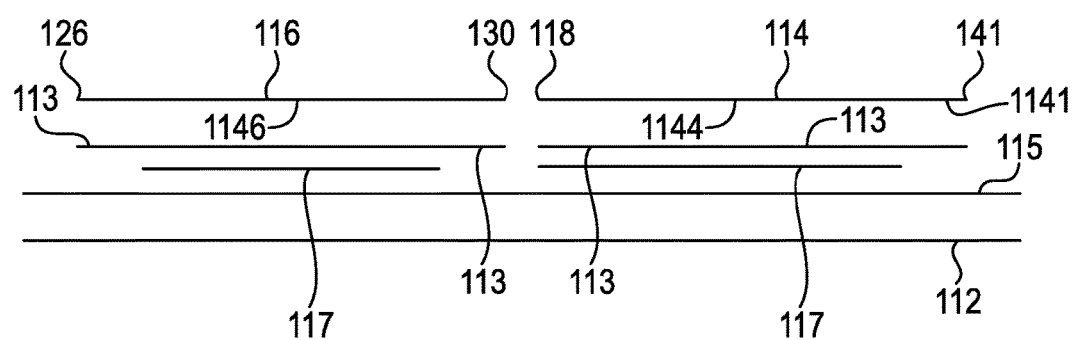
FIG. 25B shows a cross-sectional view of a multi-part upper and lower label system according to at least one embodiment of the present disclosure.

FIG. 25B shows a cross-sectional view of a multi-part upper and lower label system according to at least one embodiment of the present disclosure taken on line XXV-XXV of FIG. 23. The multi-part upper and lower label system is shown in FIG. 25B in a semi-exploded state for purposes of clarity. Shown in FIG. 25B are carrier 112, adhesive 113, lower label 114 including leading edge 118, a trailing tab 141 and a segment 1141, release coating 115, upper label 116 including leading edge 126 and trailing edge 130, and adhesive deadening agent 117. In at least one other embodiment of the present disclosure, underside 1144 comprises adhesive 113 on all of or substantially all of or a majority of its surface area, but adhesive deadening agent 117 such as, for example, a non-adhesive varnish, covers adhesive 113 in that area. Second portion 1146 also comprises adhesive 113 on all of or substantially all of or a majority of its surface area, but adhesive deadening agent 117 such as, for example, a non-adhesive varnish, covers adhesive 113 in that area.

Multi-part upper and lower label system 103 according to at least one embodiment of the present disclosure may be automatically applied to a surface through the use of apparatuses and processes substantially similar to the apparatuses and processes shown and described in FIGS. 12A-15 and this written description. Multi-part upper and lower label system 102 according to at least one embodiment of the present disclosure may be used in a manner substantially similar to manner shown and described in FIGS. 16A-16B and this written description, provided that when removable region 144 is removed the surface to which it is applied, removable region 144 is separated from lower label 114 along lines of weakness 136 and 137, and by tearing trailing tabs 141.

Figure 26:
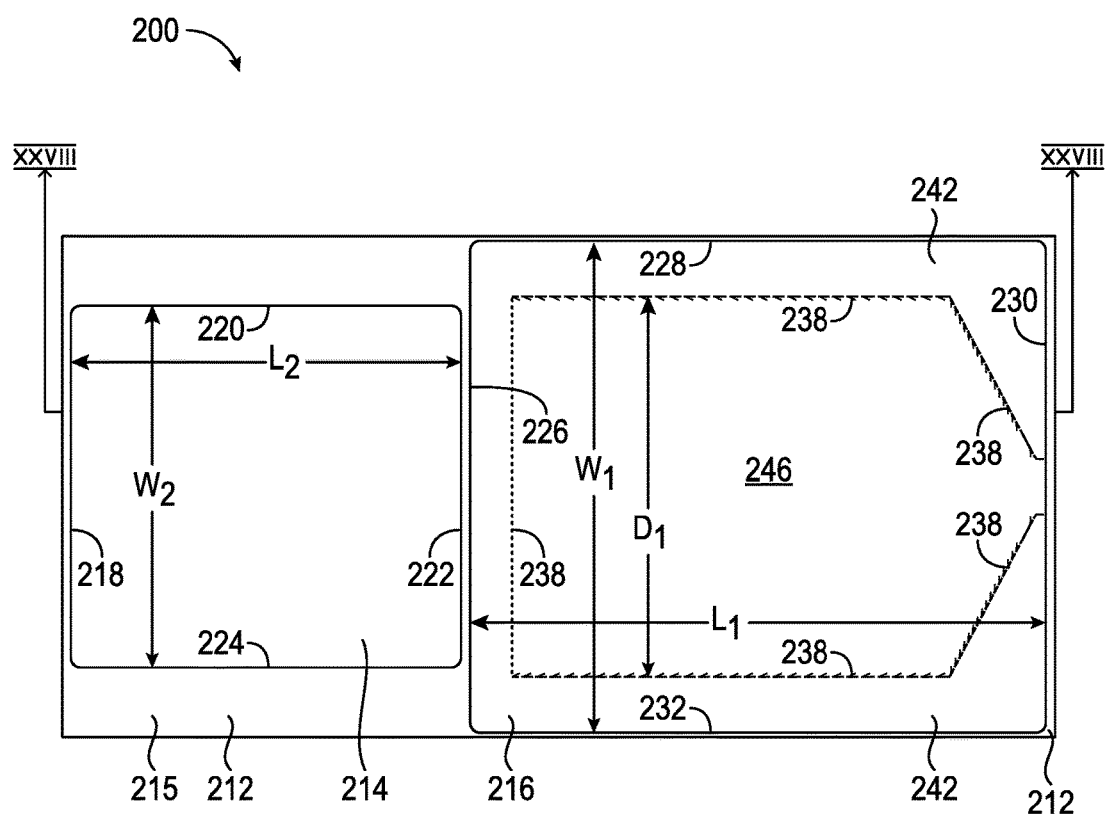
FIG. 26 shows a multi-part upper and lower label system according to at least one embodiment of the present disclosure.

FIG. 26 shows a first and second label system 200 according to at least one embodiment of the present disclosure. Shown in FIG. 26 are first label 214 and second label 216 on carrier 212. In at least one embodiment of a first and second label system according to the present disclosure, a plurality of first labels 214 and second labels 216 reside alternately on carrier 212. In at least one embodiment of a first and second label system 200 according to the present disclosure, each first label 214 comprises a packing list label, and each second label 216 comprises a shipping label.

According to at least one embodiment of a first and second label system 200 according to the present disclosure, first label 214 is bounded by leading edge 218, trailing edge 222, and side edges 220 and 224. According to at least one embodiment of a first and second label system 200 according to the present disclosure, second label 216 is bounded by leading edge 226, trailing edge 230, and side edges 228 and 232. One or more lines of weakness 238 define a boundary of removable segment 246 in second label 216. Frame 242 lies between lines of weakness 238 and leading edge 226, trailing edge 230, and side edges 228 and 232.

According to at least one embodiment of a first and second label system 200 according to the present disclosure, the area of first label 214 bounded by leading edge 218, trailing edge 222, and side edges 220 and 224 is smaller than the area of second label 216 bounded by leading edge 226, trailing edge 230, and side edges 228 and 232. According to at least one embodiment of a first and second label system according to the present disclosure, the area of first label 214 is no larger than the area of removable segment 246. According to at least one embodiment of a first and second label system 200 according to the present disclosure, second label 216 comprises a length $L_1$ that is the closest distance between leading edge 226 said trailing edge 230, and first label 214 comprises a length $L_2$ that is the closest distance between leading edge 218 and trailing edge 222, and $L_1 > L_2$. According to at least one embodiment of a first and second label system 200 according to the present disclosure, second label 216 comprises a width $W_1$ that is the closest distance between first side edge 228 and second side edge 232, and first label 214 comprises a width $W_2$ that is the closest distance between first side edge 220 and second side edge 224, and $W_1 > W_2$. According to at least one embodiment of a first and second label system 200 according to the present disclosure, second label 216 comprises a distance $D_1$ that is the closest distance between parallel segments of lines of weakness 238, and $D_1 > W_2$.

According to at least one embodiment of a first and second label system according to the present disclosure, second label 216 and first label 214 are deployed adjacent to each other on carrier 212 and removably adhered to carrier 212, thereby enabling second label 216 and first label 214 to be dispensed from carrier 212 in sequence as discussed herein. Carrier 212 comprises, in at least one embodiment, release coating 215 on the surface of carrier 212 facing the undersides of first label 214 and second label 216. In at least one embodiment of the present disclosure, release coating 215 is a silicone release coating. According to at least one embodiment of label system 200 according to the present disclosure, adhesive 213 is interposed between release coat 215 and first label 214 and second label 216, as discussed hereinafter. In at least one embodiment of the present disclosure, adhesive 213 is a pressure sensitive adhesive.

Figure 27:
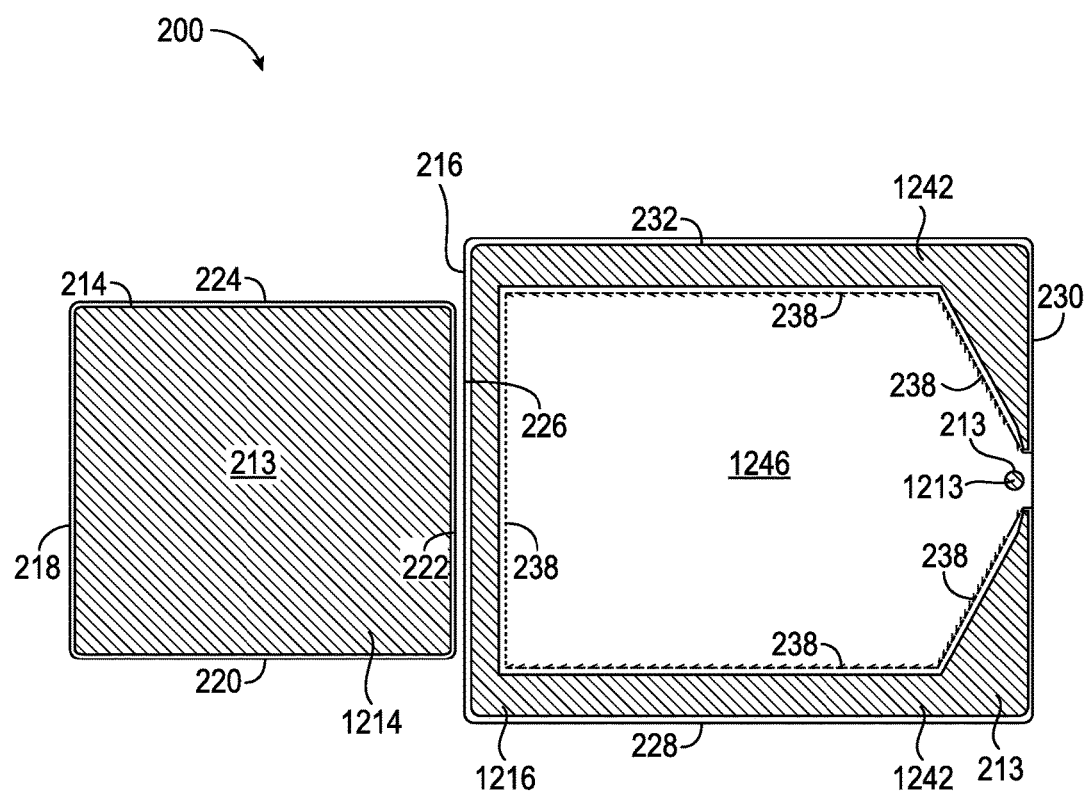
FIG. 27 shows the underside of a lower label and the undersurface of an upper label according to at least one embodiment of the present disclosure.

FIG. 27 shows the underside of first label 214 and the undersurface of second label 216 according to at least one embodiment of a first and second label system according to the present disclosure, with carrier 212 not visible for purposes of clarity. Shown in FIG. 27 is underside 1214 of first label 214, which is bounded by leading edge 218, trailing edge 222, and side edges 220 and 224. Also shown in FIG. 27 is undersurface 1216 of second label 216, which is bounded by leading edge 226, trailing edge 230, and side edges 228 and 232.

In at least one embodiment, underside 1214 of first label 214 comprises adhesive 213 on all of or substantially all of or a majority of its surface area. In at least one embodiment of the present disclosure, undersurface 1216 of second label 216 comprises a first portion 1242 and a second portion 1246, separated by a lines of weakness 238. First portion 1242 comprises the undersurface of frame 242. Second portion 1246 comprises the undersurface of removable segment 246. In at least one embodiment, first portion 1242 comprises adhesive 213 on all of or substantially all of or a majority of its surface area. In at least one embodiment, second portion 1246 is free of or substantially free of adhesive. In the embodiment of label system 200 shown in FIG. 27, second portion 1246 comprises spot 1213 of adhesive 213 near trailing edge 230.

Figure 28:
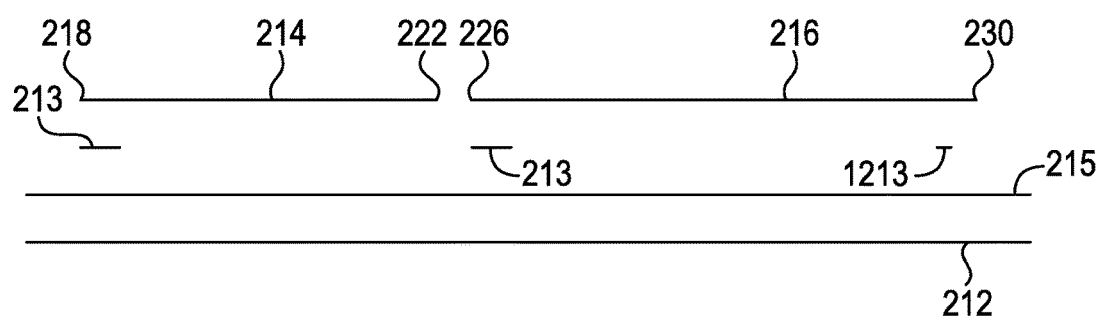
FIG. 28 shows a cross-sectional view of a multi-part upper and lower label system according to at least one embodiment of the present disclosure.

FIG. 28 shows a cross-sectional view of a first and second label system according to at least one embodiment of the present disclosure taken on line XXVIII-XXVIII of FIG. 26. The first and second label system 200 is shown in FIG. 28 in a semi-exploded state for purposes of clarity. Shown in FIG. 28 are carrier 212, adhesive 213, first label 214 comprising leading edge 218 and trailing edge 222, release coating 215, and second label 216 comprising leading edge 226 and trailing edge 230.

Figure 29:
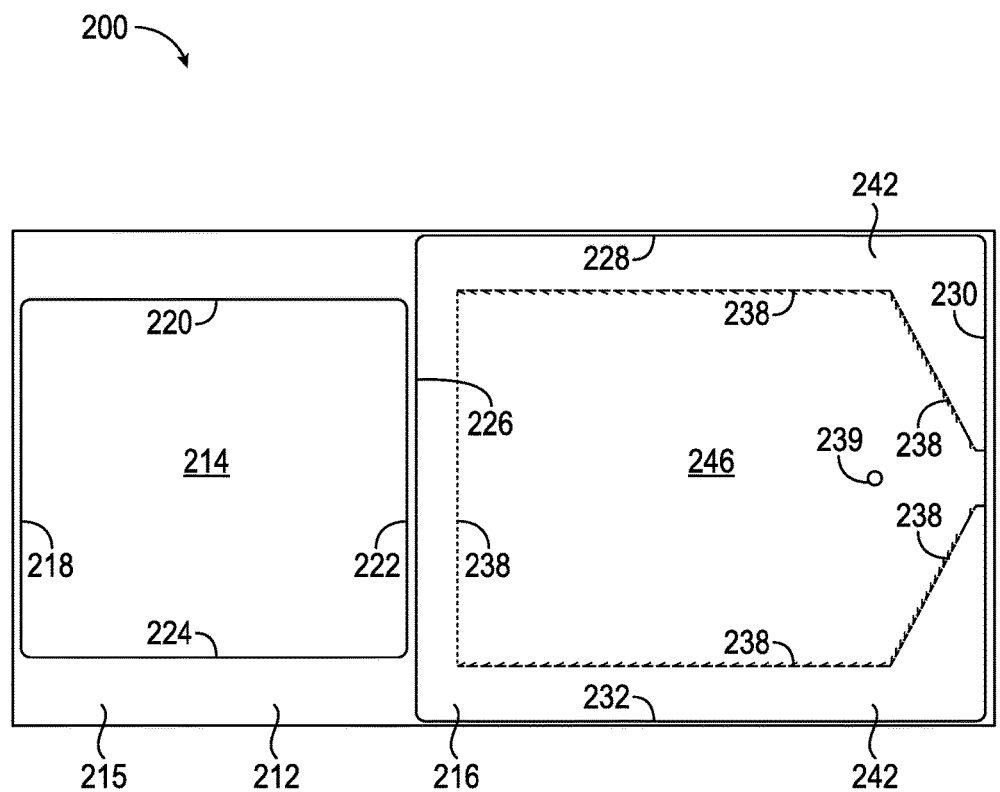
FIG. 29 shows a multi-part upper and lower label system according to at least one embodiment of the present disclosure.
Figure 30:
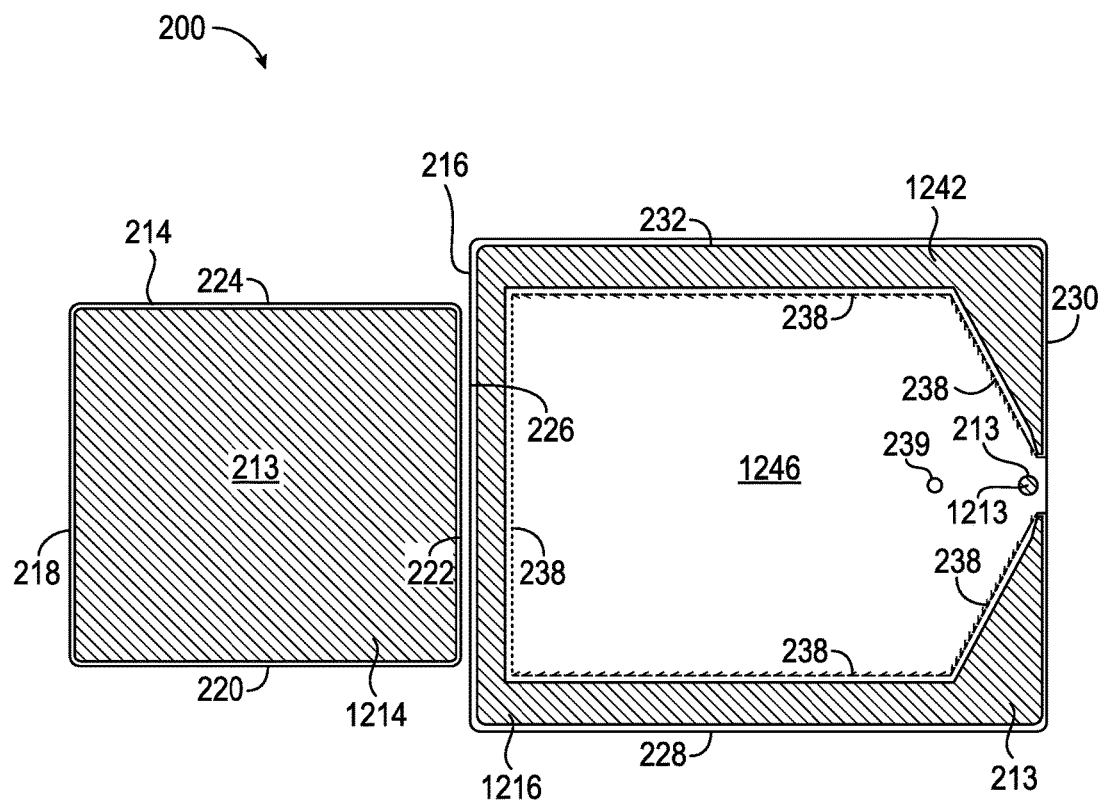
FIG. 30 shows the underside of a lower label and the undersurface of an upper label according to at least one embodiment of the present disclosure.

FIG. 29 shows a first and second label system 200 according to at least one embodiment of the present disclosure, comprising first label 214 and second label 216 as discussed hereinabove. FIG. 30 shows the underside of first label 214 and the undersurface of second label 216, with carrier 212 not visible for purposes of clarity. In the embodiment of first and second label system 200 shown in FIGS. 29-30, second label 216 comprises hole 239. Other embodiments of label system 200 may have a greater number of holes. According to at least one embodiment of the present disclosure, hole 239 extends through removable segment 246 and carrier 212. In at least one embodiment of the present disclosure, hole 239 extends only through removable segment 246.

Figure 31:
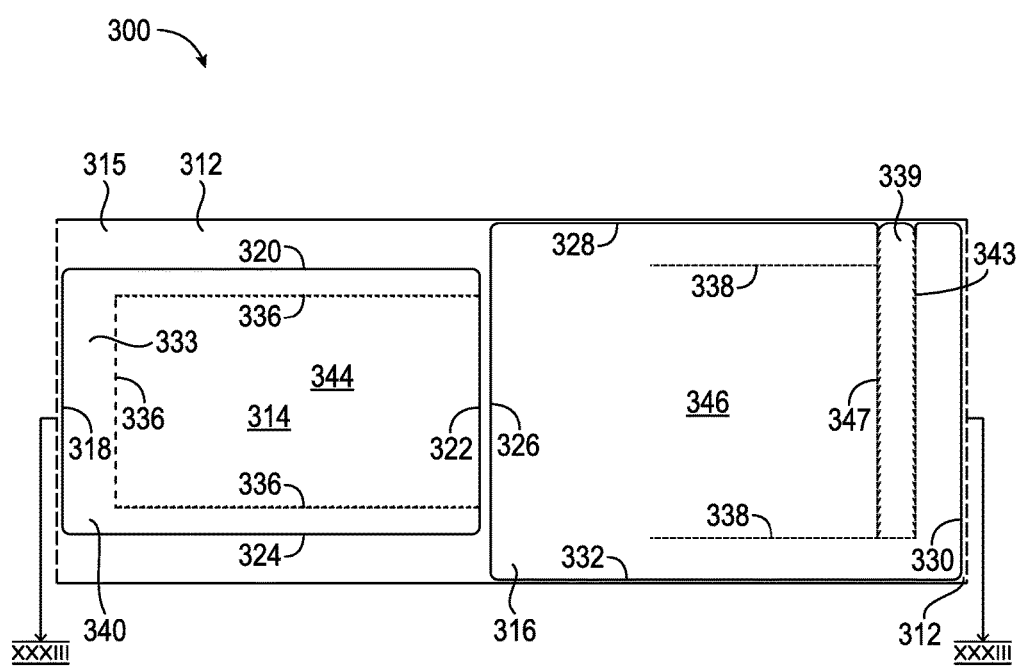
FIG. 31 shows a multi-part upper and lower label system according to at least one embodiment of the present disclosure.

FIG. 31 shows a first and second label system 300 according to at least one embodiment of the present disclosure. Shown in FIG. 31 are first label 314 and second label 316 on carrier 312. In at least one embodiment of a first and second label system according to the present disclosure, a plurality of first labels 314 and second labels 316 reside alternately on carrier 312. In at least one embodiment of a first and second label system 300 according to the present disclosure, each first label 314 comprises a packing list label, and each second label 316 comprises a shipping label.

According to at least one embodiment of a first and second label system according to the present disclosure, first label 314 is bounded by leading edge 318, trailing edge 322, and side edges 320 and 324. One or more lines of weakness 336 define a boundary of removable region 344 in first label 314. In at least one embodiment of the present disclosure where first label 314 comprises a packing list label, removable region 344 comprises a removable packing list. Frame 340 exists between line of weakness 336, and leading edge 318 and side edges 320 and 324. Frame 340 comprises leading frame segment 333.

According to at least one embodiment of a first and second label system according to the present disclosure, second label 316 is bounded by leading edge 326, trailing edge 330, and side edges 328 and 332. Second label 316 comprises tear strip 339 framed by parallel lines of weakness 343, 347. Lines of weakness 338 define a boundary of displaceable segment 346. According to at least one embodiment of a first and second label system according to the present disclosure, the area of first label 314 bounded by leading edge 318, trailing edge 322, and side edges 320 and 324 is smaller than the area of second label 316 bounded by leading edge 326, trailing edge 330, and side edges 328 and 332.

According to at least one embodiment of a first and second label system 300 according to the present disclosure, first label 314 and second label 316 are deployed adjacent to each other on carrier 312 and removably adhered to carrier 312, thereby enabling first label 314 and second label 316 to be dispensed from carrier 312 in sequence as discussed herein. Carrier 312 comprises, in at least one embodiment, release coating 315 on the surface of carrier 312 facing first label 314 and second label 316. In at least one embodiment of the present disclosure, release coating 315 is a silicone release coating. According to at least one embodiment of label system 300 according to the present disclosure, adhesive 313 is interposed between release coat 315 and the undersides of first label 314 and second label 316, as discussed hereinafter. In at least one embodiment of the present disclosure, adhesive 313 is a pressure sensitive adhesive.

Figure 32:
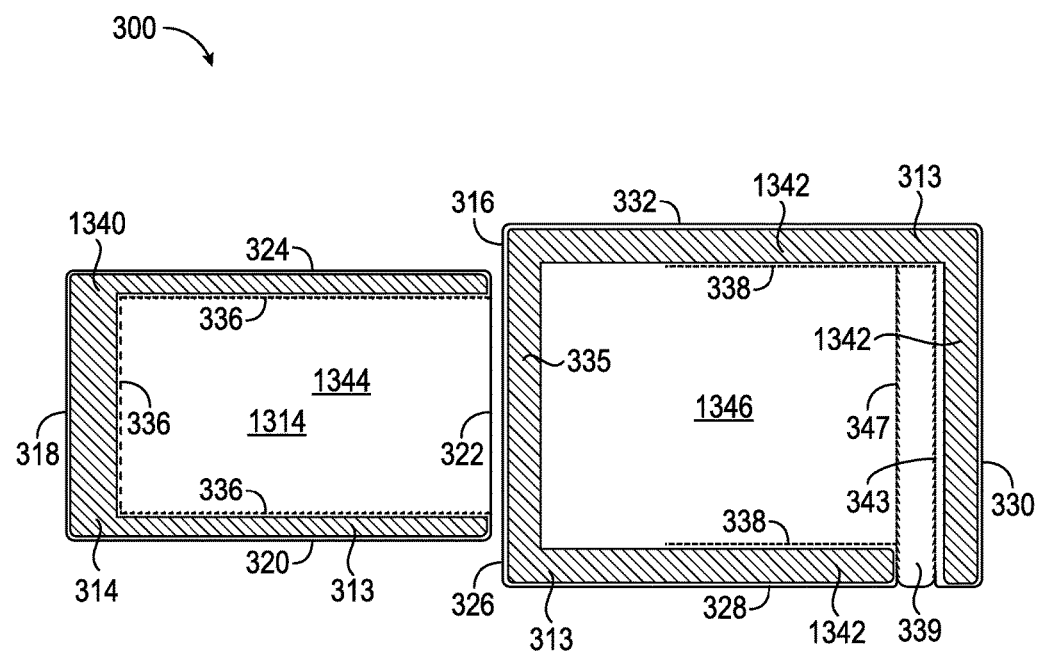
FIG. 32 shows the underside of a lower label and the undersurface of an upper label according to at least one embodiment of the present disclosure.

FIG. 32 shows the underside of first label 314 and the undersurface of second label 316 according to at least one embodiment of a first and second label system according to the present disclosure, with carrier 312 not visible for purposes of clarity. Shown in FIG. 32 is underside 1314 of first label 314, which is bounded by leading edge 318, trailing edge 322, and side edges 320 and 324. Also shown in FIG. 32 is undersurface 1316 of second label 316, which is bounded by leading edge 326, trailing edge 330, and side edges 328 and 332.

In at least one embodiment, underside 1314 of first label 314 comprises a first portion 1340 and a second portion 1344, separated by a line of weakness 336. First portion 1340 comprise the underside of frame 340. Second portion 1344 comprises the underside of removable region 344. In at least one embodiment, first portion 1340 comprises adhesive 313 on all of or substantially all of or a majority of its surface area. In at least one embodiment, second portion 1344 is free of or substantially free of adhesive.

In at least one embodiment of the present disclosure, undersurface 1316 of second label 316 comprises a first portion 1342 and a second portion 1346. In at least one embodiment, first portion 1342 comprises adhesive 313 on all of or substantially all of or a majority of its surface area. First portion 1342 comprises leading adhesive segment 335. In at least one embodiment, second portion 1346 is free of or substantially free of adhesive, as is the undersurface of tear strip 339.

Figure 33:
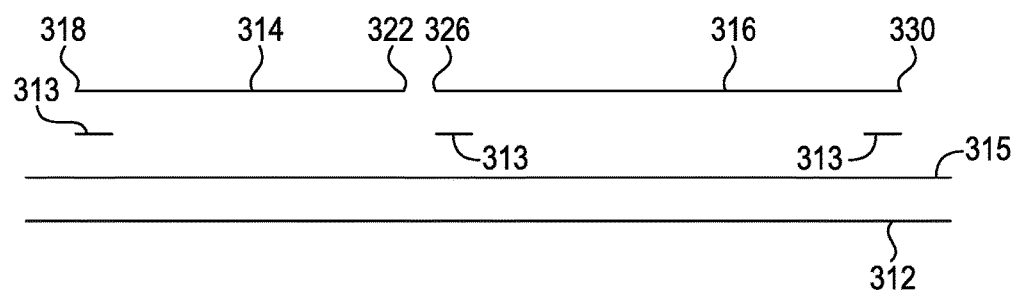
FIG. 33 shows a cross-sectional view of a multi-part upper and lower label system according to at least one embodiment of the present disclosure.

FIG. 33 shows a cross-sectional view of a first and second label system according to at least one embodiment of the present disclosure taken on line XXXIII-XXXIII of FIG. 31. The first and second label system is shown in FIG. 33 in a semi-exploded state for purposes of clarity. Shown in FIG. 33 are carrier 312, adhesive 313, first label 314 comprising leading edge 318 and trailing edge 322, release coating 315, and second label 316 comprising leading edge 326 and trailing edge 330.

Figure 34:
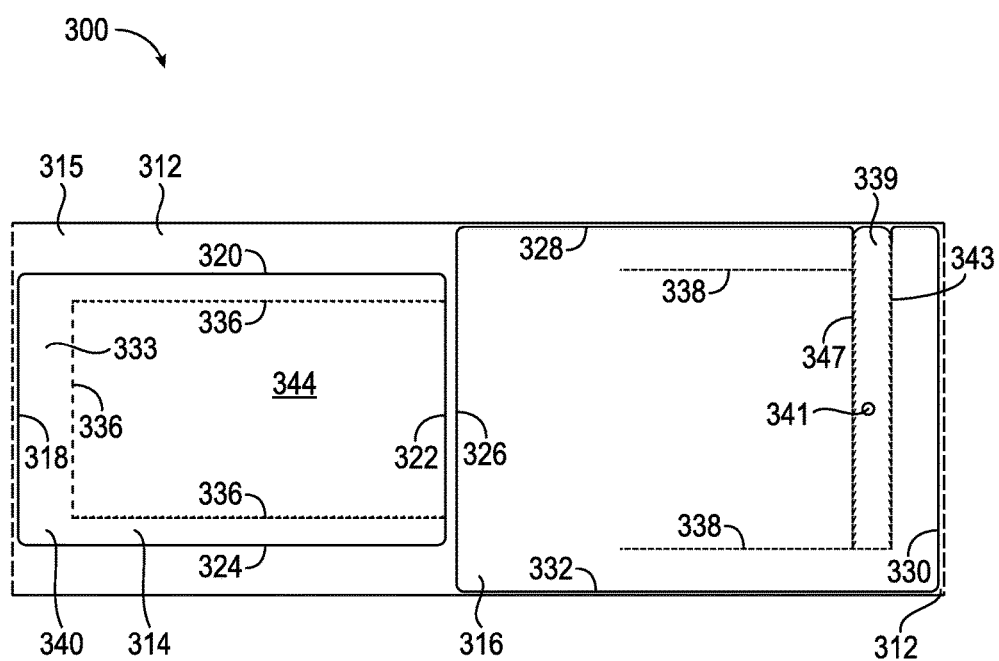
FIG. 34 shows a multi-part upper and lower label system according to at least one embodiment of the present disclosure.
Figure 35:
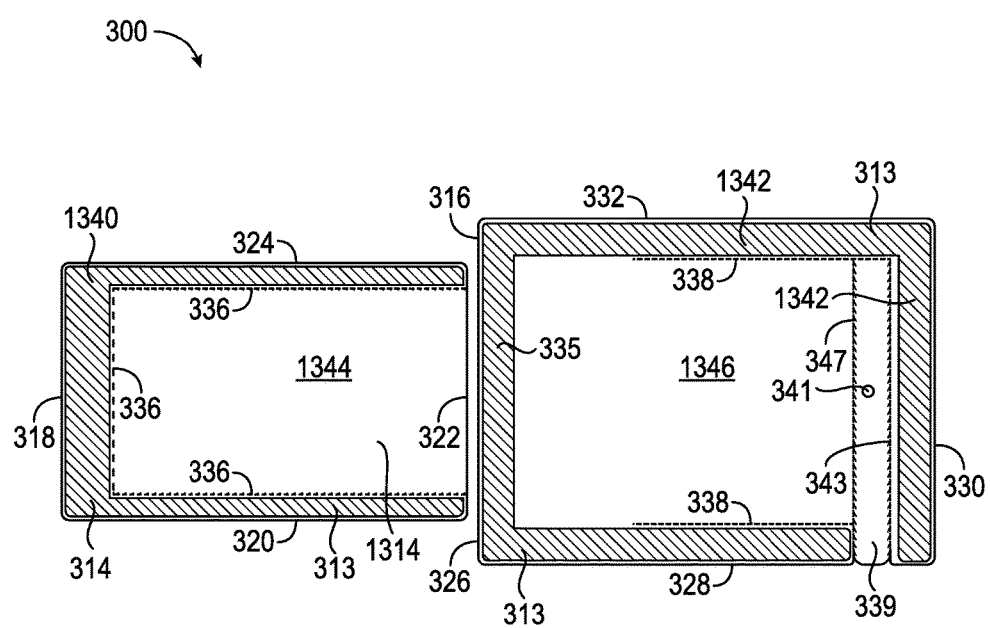
FIG. 35 shows the underside of a lower label and the undersurface of an upper label according to at least one embodiment of the present disclosure.

FIG. 34 shows a first and second label system 300 according to at least one embodiment of the present disclosure, comprising first label 314 and second label 316 as discussed hereinabove. FIG. 35 shows the underside of first label 314 and the undersurface of second label 316, with carrier 312 not visible for purposes of clarity. In the embodiment of first and second label system 300 shown in FIGS. 34-35, second label 316 comprises hole 341. Other embodiments of label system 300 may have a greater number of holes. According to at least one embodiment of the present disclosure, hole 341 extends through second label 316 and carrier 312. In at least one embodiment of the present disclosure, hole 341 extends only through second label 316.

Figure 36:
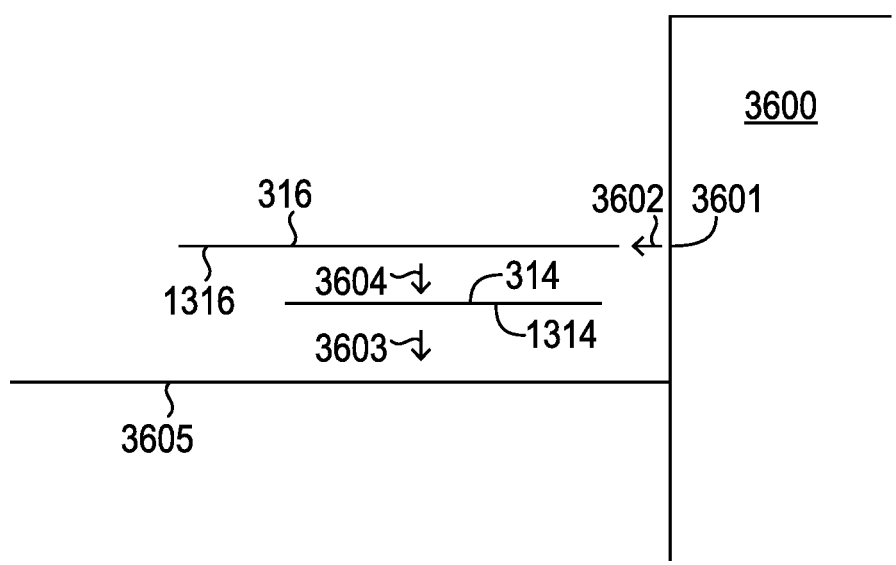
FIG. 36 shows two labels dispensed from a label printer onto a tray for future application to a surface, according to at least one embodiment of the present disclosure.

FIG. 36 shows the dispensing of first and second label system 300 from label printer 3600 according to at least one embodiment of the present disclosure. Shown in FIG. 36 is label printer 3600, comprising a printing mechanism (not shown), dispensing mechanism 3601, and tray 3605. Label printer 3600 may comprise an ink jet printer, a laser printer, a thermal transfer printer, a direct thermal printer, or another type of printing device capable of applying indicia to first label 314 and second label 316. According to at least one embodiment of the present disclosure, tray 3605 is horizontal or substantially horizontal. In other embodiments tray 3605 may be oriented at an inclining or declining angle. As shown in FIG. 36, according to at least one embodiment of the present disclosure, a plurality of first labels 314 and second labels 316 are provided to label printer 3600 in an alternating arrangement on a carrier 312. For example, a plurality of first labels 314 and second labels 316 are removably adhered to carrier 312 in a rolled configuration or in a fan-folded configuration, and are supplied to label printer 3600 in a manner anticipating printing by and dispensing from label printer 3600. As shown in FIG. 36, according to at least one embodiment of the present disclosure first label 314 and second label 316 are dispensed in sequence from label printer 3600. First label 314 and second label 316 are dispensed by dispensing mechanism 3601 of label printer 3600 in the direction of arrow 3602, and then come to rest, in registration with one another, on tray 3605 of label printer 3600. Thereafter, the pair of first label 314 and second label 316, in registration with one another and adhered together, can be retrieved from tray 3605, either mechanically (such as, for example, by a label applicator apparatus) or by hand, and applied to a surface (such as, for example, surface 601 of container 600), either mechanically (such as, for example, by a label applicator apparatus) or by hand.

In at least one embodiment of the present disclosure, prior to or in conjunction with the dispensing of first label 314 onto tray 3605 of label printer 3600, indicia is added to removable region 344 of first label 314 by the printing mechanism (not shown) of label printer 3600. For example, where first label 314 is intended to serve as a packing list, such indicia may comprise the contents of a container to which first label 314 will be adhered, such as container 600.

First label 314 is dispensed from label printer 3600 such that underside 1314 of first label 314 faces tray 3605 of label printer 3600. First label 314 moves in the direction shown by arrow 3603 until underside 1314 of first label 314 comes into contact with tray 3605 of label printer 3600. Because no pressure is exerted on first label 314, adhesive 313 on underside 1314 of first label 314 does not adhere first portion 1340 of first label 314 to tray 3605 of label printer 3600. In at least one embodiment, tray 3605 comprises a non-stick surface that retards adherence of adhesive 313 to tray 3605. Second portion 1344 of first label 314 also is adjacent to tray 3605 of label printer 3600, but because second portion 1344 of first label 314 is free of adhesive, second portion 1344 of first label 314 also does not adhere to tray 3605 of label printer 3600.

In at least one embodiment of the present disclosure, second label 316 then is dispensed from label printer 3600. Second label 316 comes to rest on top of, and in registration with, first label 314. In at least one embodiment, prior to or in conjunction with the dispensing of second label 316 onto tray 3605 of label printer 3600, indicia is added to second label 316, such as within displaceable segment 346 of second label 316, by the printer mechanism (not shown) of label printer 3600. For example, where second label 316 is intended to serve as a shipping label, such indicia may comprise the address to which a container to which first label 314 and second label 316 will be adhered, such as container 600, is to be shipped, a return address, bar codes, maxicodes, identifying numbers, and the like.

Second label 316 is dispensed from label printer 3600 such that undersurface 1316 of second label 316 faces the upper surface of first label 314. Second label 316 moves in the direction shown by arrow 504 until adhesive 313 on undersurface 1316 of second label 316 comes into contact with first label 314. In at least one embodiment, adhesive on leading adhesive segment 335 comes into contact with leading frame segment 333 of first label 314. In such an embodiment, adhesive 313 on leading adhesive segment 335 of second label 316 adheres first portion 1342 of second label 316 to frame 340 of first label 314 to a sufficient degree that the pair of labels can be handled as a unit, either mechanically (such as, for example, by a label applicator apparatus) or by hand. Second portion 1346 of second label 316 also is adjacent to, and in registration with, removable region 344 of first label 314, but because second portion 1346 of second label 316 has reduced adhesive properties and/or may be completely free of adhesive, second portion 1346 of second label 316 does not adhere to removable region 344 of first label 314. In such an embodiment, after second label 316 is adhered to first label 314, the adhered-together first label 314 and second label 316 then are applied simultaneously to a surface, such as a surface 601 of container 600, either mechanically (such as, for example, by a label applicator apparatus) or by hand.

Figure 37:
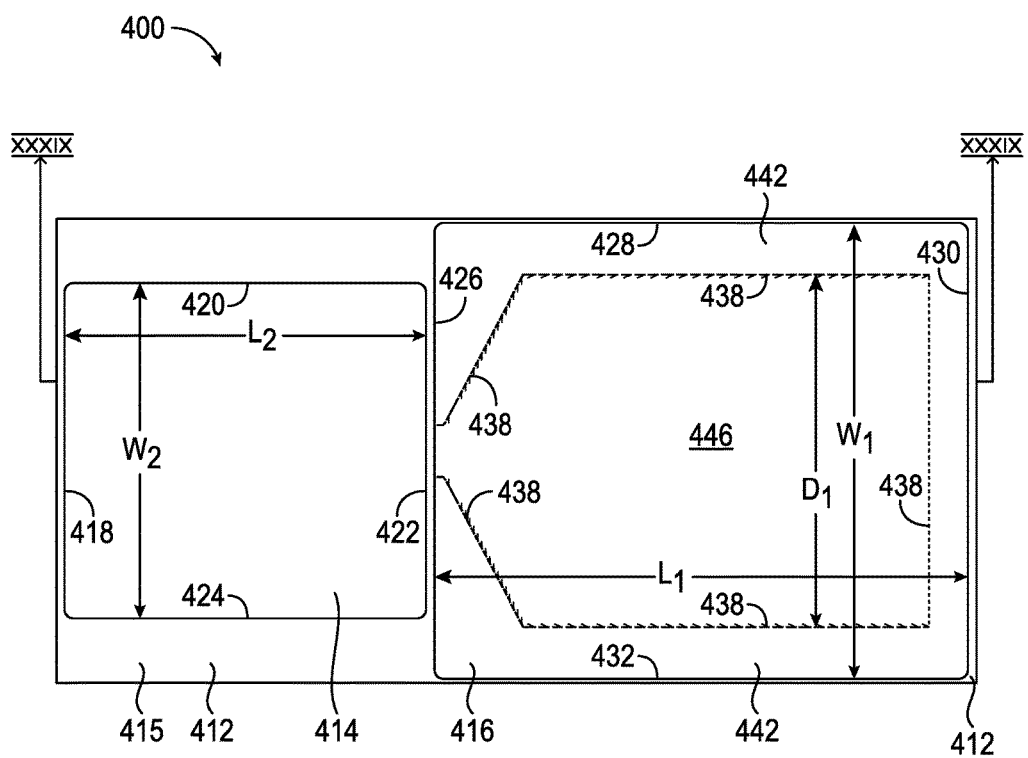
FIG. 37 shows a multi-part upper and lower label system according to at least one embodiment of the present disclosure.

FIG. 37 shows a first and second label system 400 according to at least one embodiment of the present disclosure. Shown in FIG. 37 are first label 414 and second label 416 on carrier 412. In at least one embodiment of a first and second label system according to the present disclosure, a plurality of first labels 414 and second labels 416 reside alternately on carrier 412. In at least one embodiment of a first and second label system 400 according to the present disclosure, each first label 414 comprises a packing list label, and each second label 416 comprises a shipping label.

According to at least one embodiment of a first and second label system 400 according to the present disclosure, first label 414 is bounded by leading edge 418, trailing edge 422, and side edges 420 and 424. According to at least one embodiment of a first and second label system 400 according to the present disclosure, second label 416 is bounded by leading edge 426, trailing edge 430, and side edges 428 and 432. One or more lines of weakness 438 define a boundary of removable segment 446 in second label 416. Frame 442 lies between lines of weakness 438 and leading edge 426, trailing edge 430, and side edges 428 and 432.

According to at least one embodiment of a first and second label system 400 according to the present disclosure, the area of first label 414 bounded by leading edge 418, trailing edge 422, and side edges 420 and 424 is smaller than the area of second label 416 bounded by leading edge 426, trailing edge 430, and side edges 428 and 432. According to at least one embodiment of a first and second label system according to the present disclosure, the area of first label 414 is no larger than the area of removable segment 446. According to at least one embodiment of a first and second label system 400 according to the present disclosure, second label 416 comprises a length $L_1$ that is the closest distance between leading edge 426 said trailing edge 430, and first label 414 comprises a length $L_2$ that is the closest distance between leading edge 418 and trailing edge 422, and $L_1 > L_2$. According to at least one embodiment of a first and second label system 400 according to the present disclosure, second label 416 comprises a width $W_1$ that is the closest distance between first side edge 428 and second side edge 432, and first label 414 comprises a width $W_2$ that is the closest distance between first side edge 420 and second side edge 424, and $W_1 > W_2$. According to at least one embodiment of a first and second label system 400 according to the present disclosure, second label 416 comprises a distance $D_1$ that is the closest distance between parallel segments of lines of weakness 438, and $D_1 > W_2$.

According to at least one embodiment of a first and second label system according to the present disclosure, second label 416 and first label 414 are deployed adjacent to each other on carrier 412 and removably adhered to carrier 412, thereby enabling second label 416 and first label 414 to be dispensed from carrier 412 in sequence as discussed herein. Carrier 412 comprises, in at least one embodiment, release coating 415 on the surface of carrier 412 facing the undersides of first label 414 and second label 416. In at least one embodiment of the present disclosure, release coating 415 is a silicone release coating. According to at least one embodiment of label system 400 according to the present disclosure, adhesive 413 is interposed between release coat 415 and first label 414 and second label 416, as discussed hereinafter. In at least one embodiment of the present disclosure, adhesive 413 is a pressure sensitive adhesive.

Figure 38:
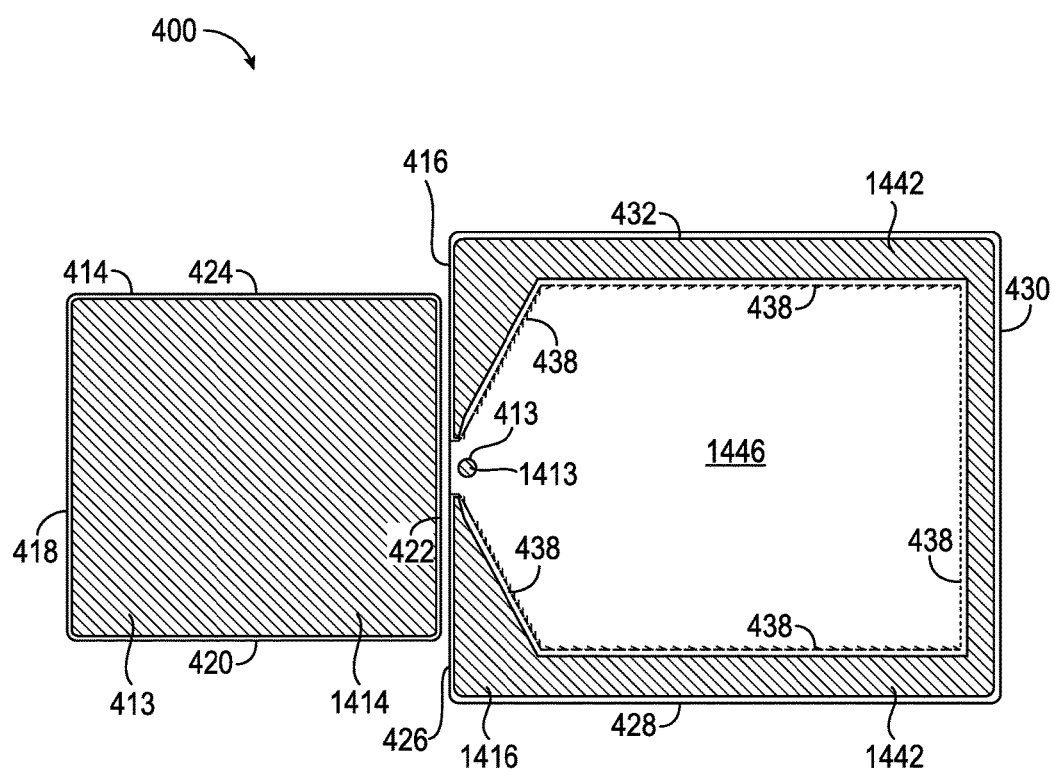
FIG. 38 shows the underside of a lower label and the undersurface of an upper label according to at least one embodiment of the present disclosure.

FIG. 38 shows the underside of first label 414 and the undersurface of second label 416 according to at least one embodiment of a first and second label system according to the present disclosure, with carrier 412 not visible for purposes of clarity. Shown in FIG. 38 is underside 1414 of first label 414, which is bounded by leading edge 418, trailing edge 422, and side edges 420 and 424. Also shown in FIG. 38 is undersurface 1416 of second label 416, which is bounded by leading edge 426, trailing edge 430, and side edges 428 and 432.

In at least one embodiment, underside 1414 of first label 414 comprises adhesive 413 on all of or substantially all of or a majority of its surface area. In at least one embodiment of the present disclosure, undersurface 1416 of second label 416 comprises a first portion 1442 and a second portion 1446, separated by lines of weakness 438. First portion 1442 comprises the undersurface of frame 442. Second portion 1446 comprises the undersurface of removable segment 446. In at least one embodiment, first portion 1442 comprises adhesive 413 on all of or substantially all of or a majority of its surface area. In at least one embodiment, second portion 1446 is free of or substantially free of adhesive. In the embodiment of label system 400 shown in FIG. 38, second portion 1446 comprises spot 1413 of adhesive 413 near leading edge 426.

Figure 39:
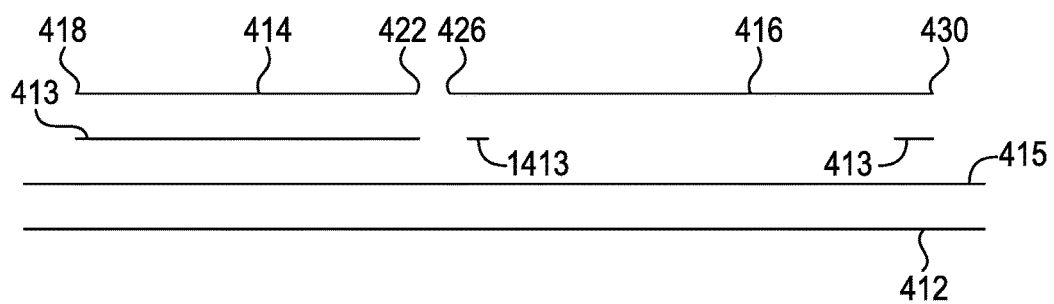
FIG. 39 shows a cross-sectional view of a multi-part upper and lower label system according to at least one embodiment of the present disclosure.

FIG. 39 shows a cross-sectional view of a first and second label system according to at least one embodiment of the present disclosure taken on line XXXIX-XXXIX of FIG. 37. The first and second label system 400 is shown in FIG. 39 in a semi-exploded state for purposes of clarity. Shown in FIG. 39 are carrier 412, adhesive 413, first label 414 comprising leading edge 418 and trailing edge 422, release coating 415, and second label 416 comprising leading edge 426 and trailing edge 430.

Figure 40:
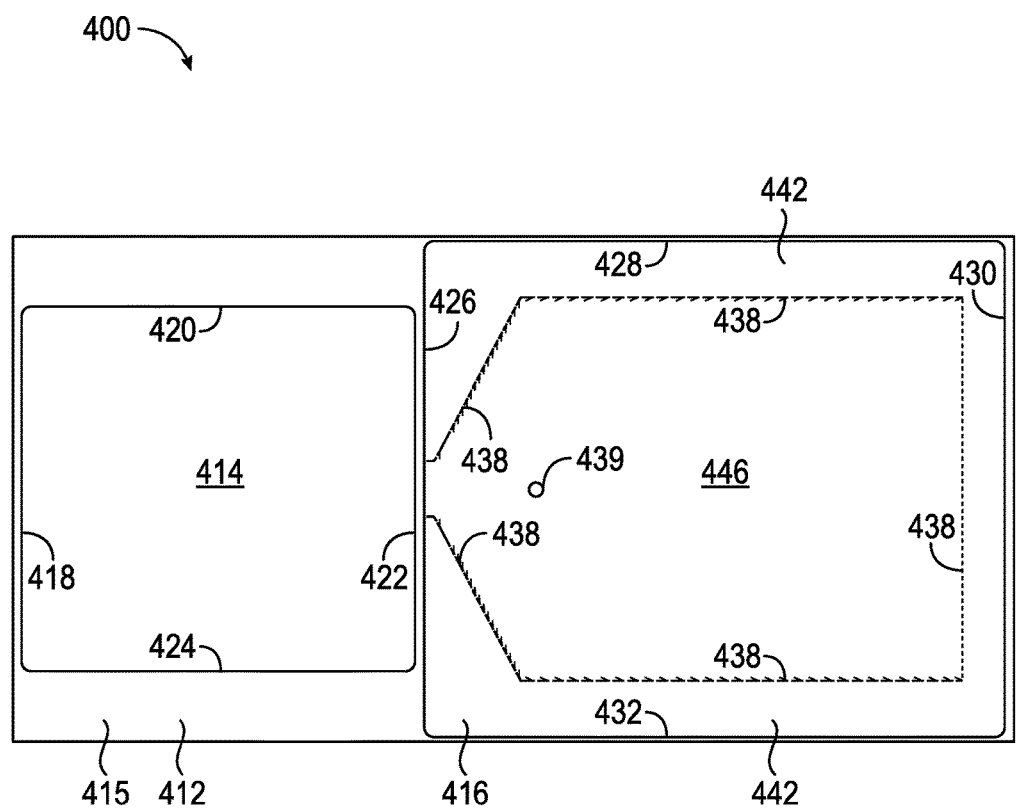
FIG. 40 shows a multi-part upper and lower label system according to at least one embodiment of the present disclosure.
Figure 41:
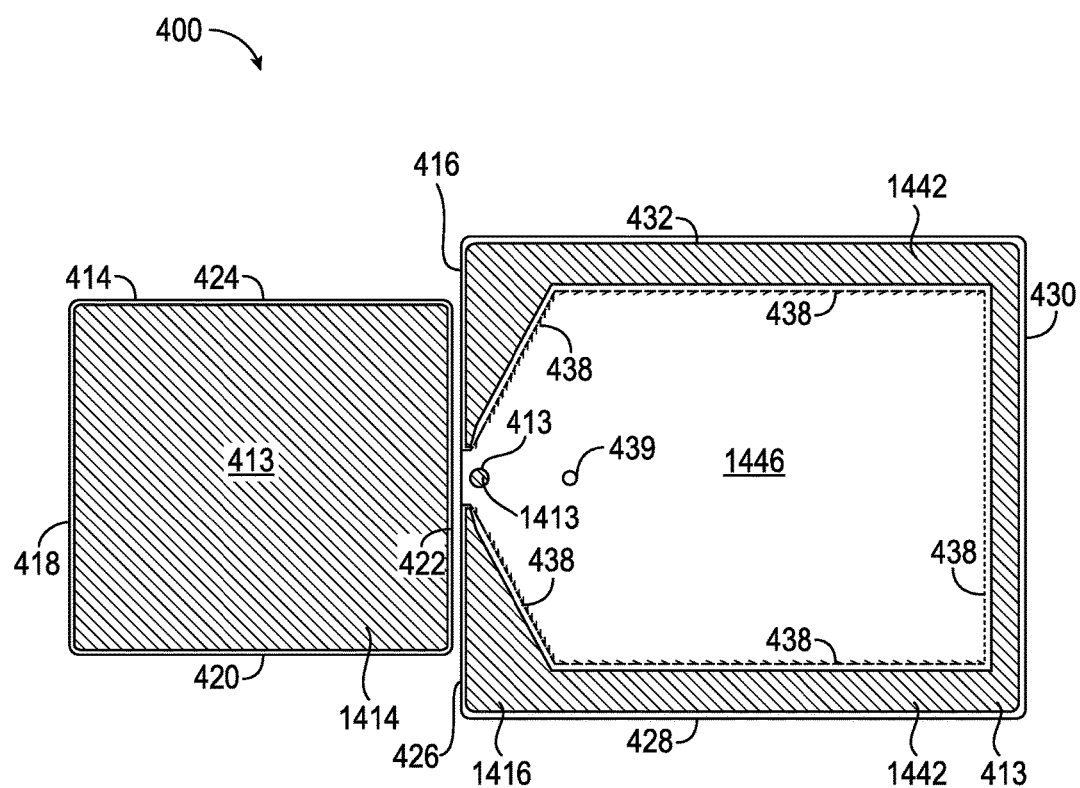
FIG. 41 shows the underside of a lower label and the undersurface of an upper label according to at least one embodiment of the present disclosure.

FIG. 40 shows a first and second label system 400 according to at least one embodiment of the present disclosure, comprising first label 414 and second label 416 as discussed hereinabove. FIG. 41 shows the underside of first label 414 and the undersurface of second label 416, with carrier 412 not visible for purposes of clarity. In the embodiment of first and second label system 400 shown in FIGS. 40-41, second label 416 comprises hole 439. Other embodiments of label system 400 may have a greater number of holes. According to at least one embodiment of the present disclosure, hole 439 extends through removable segment 446 and carrier 412. In at least one embodiment of the present disclosure, hole 439 extends only through removable segment 446.

Figure 42:
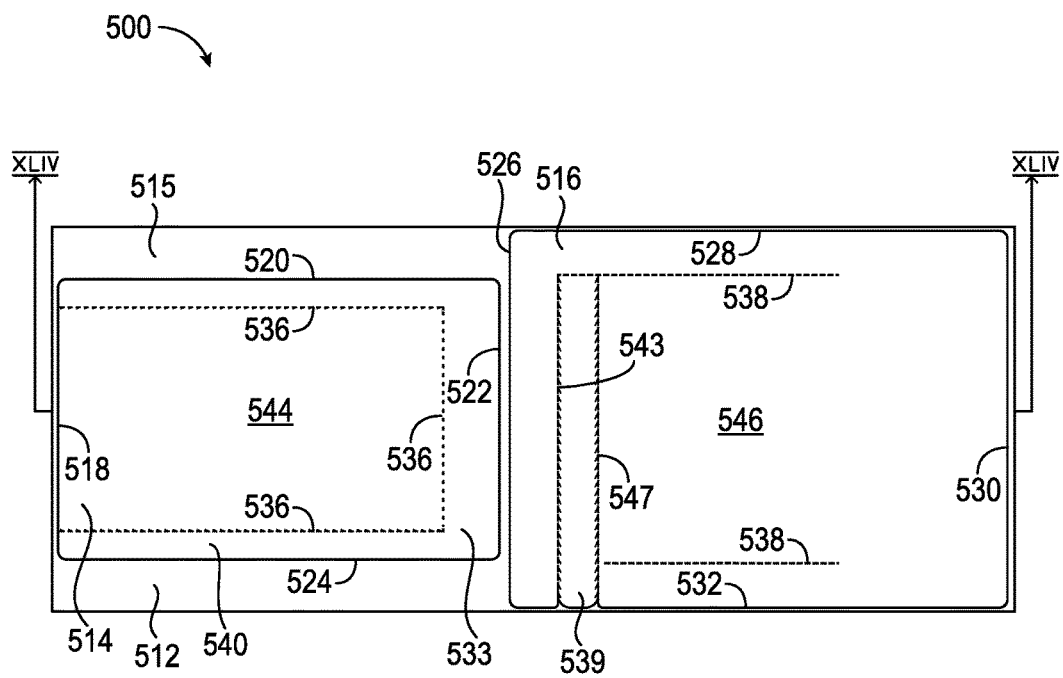
FIG. 42 shows a multi-part upper and lower label system according to at least one embodiment of the present disclosure.

FIG. 42 shows a first and second label system 500 according to at least one embodiment of the present disclosure. Shown in FIG. 42 are first label 514 and second label 516 on carrier 512. In at least one embodiment of a first and second label system according to the present disclosure, a plurality of first labels 514 and second labels 516 reside alternately on carrier 512. In at least one embodiment of a first and second label system 500 according to the present disclosure, each first label 514 comprises a packing list label, and each second label 516 comprises a shipping label.

According to at least one embodiment of a first and second label system according to the present disclosure, first label 514 is bounded by leading edge 518, trailing edge 522, and side edges 520 and 524. One or more lines of weakness 536 define a boundary of removable region 544 in first label 514. In at least one embodiment of the present disclosure where first label 514 comprises a packing list label, removable region 544 comprises a removable packing list. Frame 540 exists between line of weakness 536, and leading edge 518 and side edges 520 and 524. Frame 540 comprises trailing frame segment 533.

According to at least one embodiment of a first and second label system according to the present disclosure, second label 516 is bounded by leading edge 526, trailing edge 530, and side edges 528 and 532. Second label 516 comprises tear strip 539 framed by parallel lines of weakness 543, 547. Lines of weakness 538 define a boundary of displaceable segment 546. According to at least one embodiment of a first and second label system according to the present disclosure, the area of first label 514 bounded by leading edge 518, trailing edge 522, and side edges 520 and 524 is smaller than the area of second label 516 bounded by leading edge 526, trailing edge 530, and side edges 528 and 532.

According to at least one embodiment of a first and second label system 500 according to the present disclosure, first label 514 and second label 516 are deployed adjacent to each other on carrier 512 and removably adhered to carrier 512, thereby enabling first label 514 and second label 516 to be dispensed from carrier 512 in sequence as discussed herein. Carrier 512 comprises, in at least one embodiment, release coating 515 on the surface of carrier 512 facing first label 514 and second label 516. In at least one embodiment of the present disclosure, release coating 515 is a silicone release coating. According to at least one embodiment of label system 500 according to the present disclosure, adhesive 513 is interposed between release coat 515 and the undersides of first label 514 and second label 516, as discussed hereinafter. In at least one embodiment of the present disclosure, adhesive 513 is a pressure sensitive adhesive.

Figure 43:
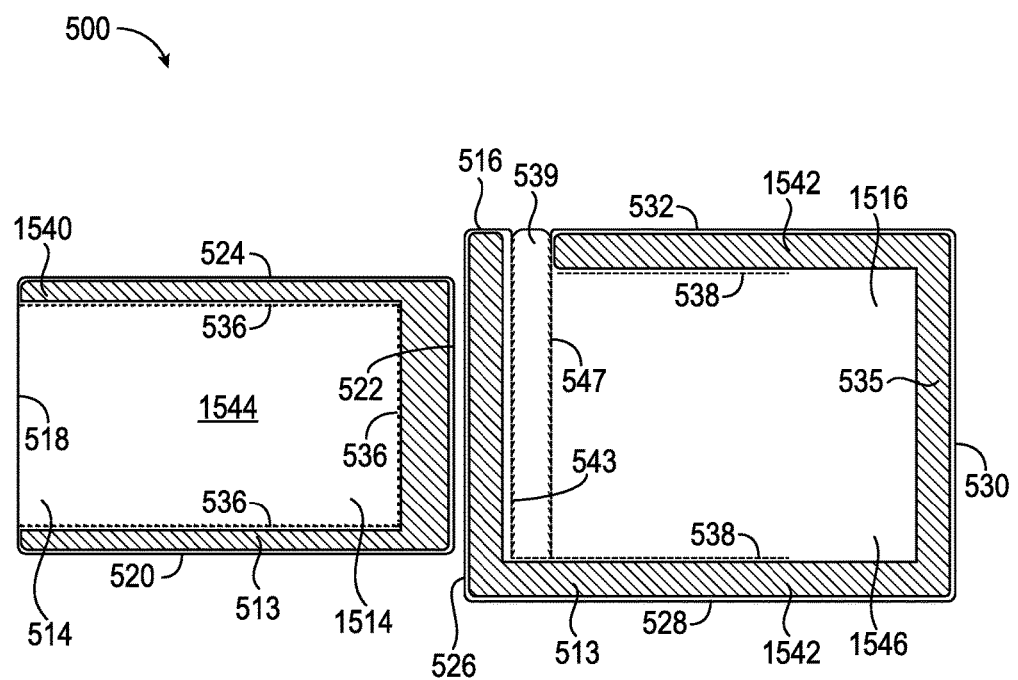
FIG. 43 shows the underside of a lower label and the undersurface of an upper label according to at least one embodiment of the present disclosure.

FIG. 43 shows the underside of first label 514 and the undersurface of second label 516 according to at least one embodiment of a first and second label system according to the present disclosure, with carrier 512 not visible for purposes of clarity. Shown in FIG. 43 is underside 1514 of first label 514, which is bounded by leading edge 518, trailing edge 522, and side edges 520 and 524. Also shown in FIG. 43 is undersurface 1516 of second label 516, which is bounded by leading edge 526, trailing edge 530, and side edges 528 and 532.

In at least one embodiment, underside 1514 of first label 514 comprises a first portion 1540 and a second portion 1544, separated by a line of weakness 536. First portion 1540 comprise the underside of frame 540. Second portion 1544 comprises the underside of removable region 544. In at least one embodiment, first portion 1540 comprises adhesive 513 on all of or substantially all of or a majority of its surface area. In at least one embodiment, second portion 1544 is free of or substantially free of adhesive.

In at least one embodiment of the present disclosure, undersurface 1516 of second label 516 comprises a first portion 1542 and a second portion 1546. In at least one embodiment, first portion 1542 comprises adhesive 513 on all of or substantially all of or a majority of its surface area. First portion 1542 comprises trailing adhesive segment 535. In at least one embodiment, second portion 1546 is free of or substantially free of adhesive, as is the undersurface of tear strip 539.

Figure 44:
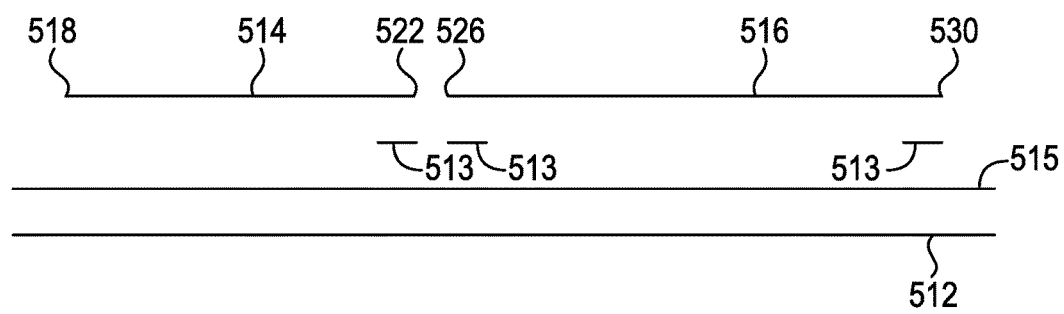
FIG. 44 shows a cross-sectional view of a multi-part upper and lower label system according to at least one embodiment of the present disclosure.

FIG. 44 shows a cross-sectional view of a first and second label system according to at least one embodiment of the present disclosure taken on line LXIV-LXIV of FIG. 42. The first and second label system is shown in FIG. 44 in a semi-exploded state for purposes of clarity. Shown in FIG. 44 are carrier 512, adhesive 513, first label 514 comprising leading edge 518 and trailing edge 522, release coating 515, and second label 516 comprising leading edge 526 and trailing edge 530.

Figure 45:
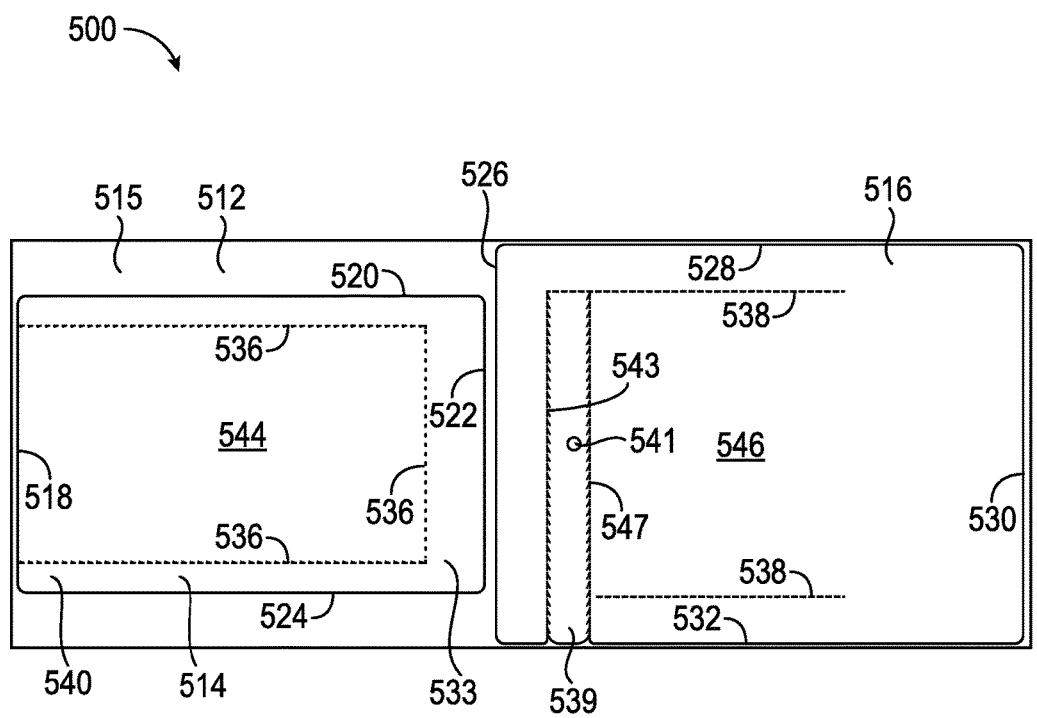
FIG. 45 shows a multi-part upper and lower label system according to at least one embodiment of the present disclosure.
Figure 46:
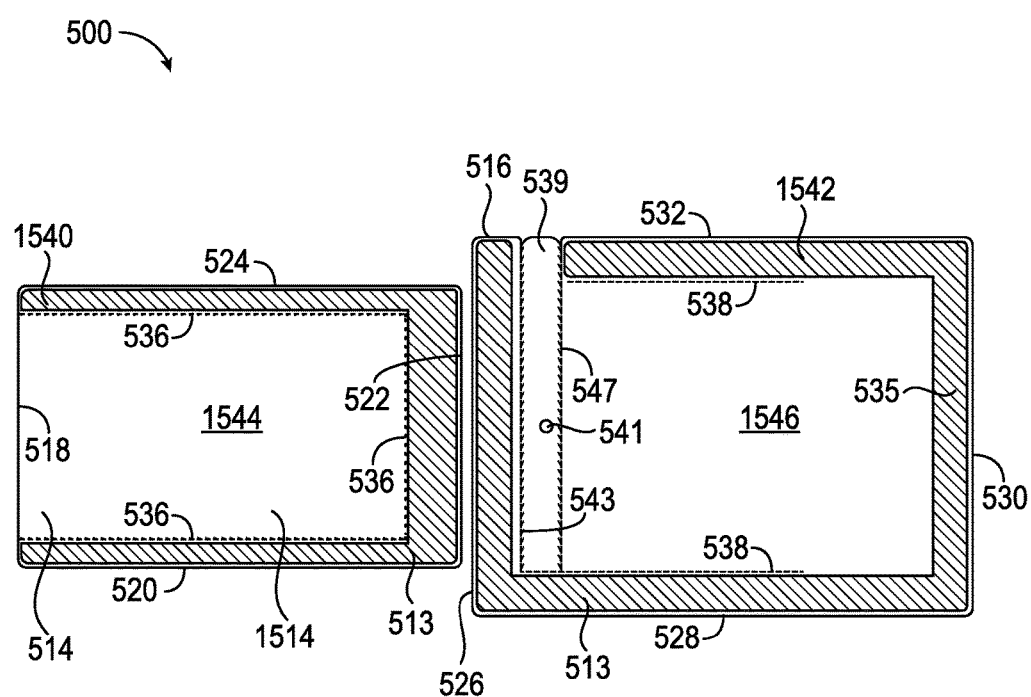
FIG. 46 shows the underside of a lower label and the undersurface of an upper label according to at least one embodiment of the present disclosure.

FIG. 45 shows a first and second label system 500 according to at least one embodiment of the present disclosure, comprising first label 514 and second label 516 as discussed hereinabove. FIG. 46 shows the underside of first label 514 and the undersurface of second label 516, with carrier 512 not visible for purposes of clarity. In the embodiment of first and second label system 500 shown in FIGS. 45-46, second label 516 comprises hole 541. Other embodiments of label system 500 may have a greater number of holes. According to at least one embodiment of the present disclosure, hole 541 extends through second label 516 and carrier 512. In at least one embodiment of the present disclosure, hole 541 extends only through second label 516.

Figure 47:
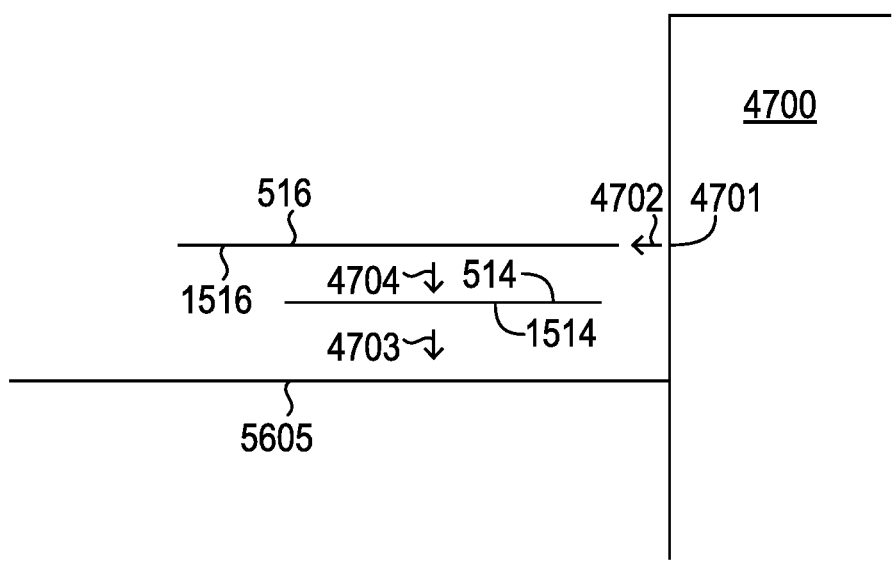
FIG. 47 shows two labels dispensed from a label printer onto a tray for future application to a surface, according to at least one embodiment of the present disclosure.

FIG. 47 shows the dispensing of first and second label system 500 from label printer 4700 according to at least one embodiment of the present disclosure. Shown in FIG. 47 is label printer 4700, comprising a printing mechanism (not shown), dispensing mechanism 4701, and tray 5605. Label printer 4700 may comprise an ink jet printer, a laser printer, a thermal transfer printer, a direct thermal printer, or another type of printing device capable of applying indicia to first label 514 and second label 516. According to at least one embodiment of the present disclosure, tray 5605 is horizontal or substantially horizontal. In other embodiments tray 5605 may be oriented at an inclining or declining angle. As shown in FIG. 47, according to at least one embodiment of the present disclosure, a plurality of first labels 514 and second labels 516 are provided to label printer 4700 in an alternating arrangement on a carrier 512. For example, a plurality of first labels 514 and second labels 516 are removably adhered to carrier 512 in a rolled configuration or in a fan-folded configuration, and are supplied to label printer 4700 in a manner anticipating printing by and dispensing from label printer 4700. As shown in FIG. 47, according to at least one embodiment of the present disclosure first label 514 and second label 516 are dispensed in sequence from label printer 4700. First label 514 and second label 516 are dispensed by dispensing mechanism 4701 of label printer 4700 in the direction of arrow 4702, and then come to rest, in registration with one another, on tray 5605 of label printer 4700. Thereafter, the pair of first label 514 and second label 516, in registration with one another and adhered together, can be retrieved from tray 5605, either mechanically (such as, for example, by a label applicator apparatus) or by hand, and applied to a surface (such as, for example, surface 601 of container 600), either mechanically (such as, for example, by a label applicator apparatus) or by hand.

In at least one embodiment of the present disclosure, prior to or in conjunction with the dispensing of first label 514 onto tray 5605 of label printer 4700, indicia is added to removable region 544 of first label 514 by the printing mechanism (not shown) of label printer 4700. For example, where first label 514 is intended to serve as a packing list, such indicia may comprise the contents of a container to which first label 514 will be adhered, such as container 600.

First label 514 is dispensed from label printer 4700 such that underside 1514 of first label 514 faces tray 5605 of label printer 4700. First label 514 moves in the direction shown by arrow 4703 until underside 1514 of first label 514 comes into contact with tray 5605 of label printer 4700. Because no pressure is exerted on first label 514, adhesive 513 on underside 1514 of first label 514 does not adhere first portion 1540 of first label 514 to tray 5605 of label printer 4700. In at least one embodiment, tray 5605 comprises a non-stick surface that retards adherence of adhesive 513 to tray 5605. Second portion 1544 of first label 514 also is adjacent to tray 5605 of label printer 4700, but because second portion 1544 of first label 514 is free of adhesive, second portion 1544 of first label 514 also does not adhere to tray 5605 of label printer 4700.

In at least one embodiment of the present disclosure, second label 516 then is dispensed from label printer 4700. Second label 516 comes to rest on top of, and in registration with, first label 514. In at least one embodiment, prior to or in conjunction with the dispensing of second label 516 onto tray 5605 of label printer 4700, indicia is added to second label 516, such as within displaceable segment 546 of second label 516, by the printer mechanism (not shown) of label printer 4700. For example, where second label 516 is intended to serve as a shipping label, such indicia may comprise the address to which a container to which first label 514 and second label 516 will be adhered, such as container 600, is to be shipped, a return address, bar codes, maxicodes, identifying numbers, and the like.

Second label 516 is dispensed from label printer 4700 such that undersurface 1516 of second label 516 faces the upper surface of first label 514. Second label 516 moves in the direction shown by arrow 4702 until adhesive 513 on undersurface 1516 of second label 516 comes into contact with first label 514. In at least one embodiment, adhesive on trailing adhesive segment 535 comes into contact with trailing frame segment 533 of first label 514. In such an embodiment, adhesive 513 on trailing adhesive segment 535 of second label 516 adheres first portion 1542 of second label 516 to frame 540 of first label 514 to a sufficient degree that the pair of labels can be handled as a unit, either mechanically (such as, for example, by a label applicator apparatus) or by hand. Second portion 1546 of second label 516 also is adjacent to, and in registration with, removable region 544 of first label 514, but because second portion 1546 of second label 516 has reduced adhesive properties and/or may be completely free of adhesive, second portion 1546 of second label 516 does not adhere to removable region 544 of first label 514. In such an embodiment, after second label 516 is adhered to first label 514, the adhered-together first label 514 and second label 516 then are applied simultaneously to a surface, such as a surface 601 of container 600, either mechanically (such as, for example, by a label applicator apparatus) or by hand.

Figure 48:
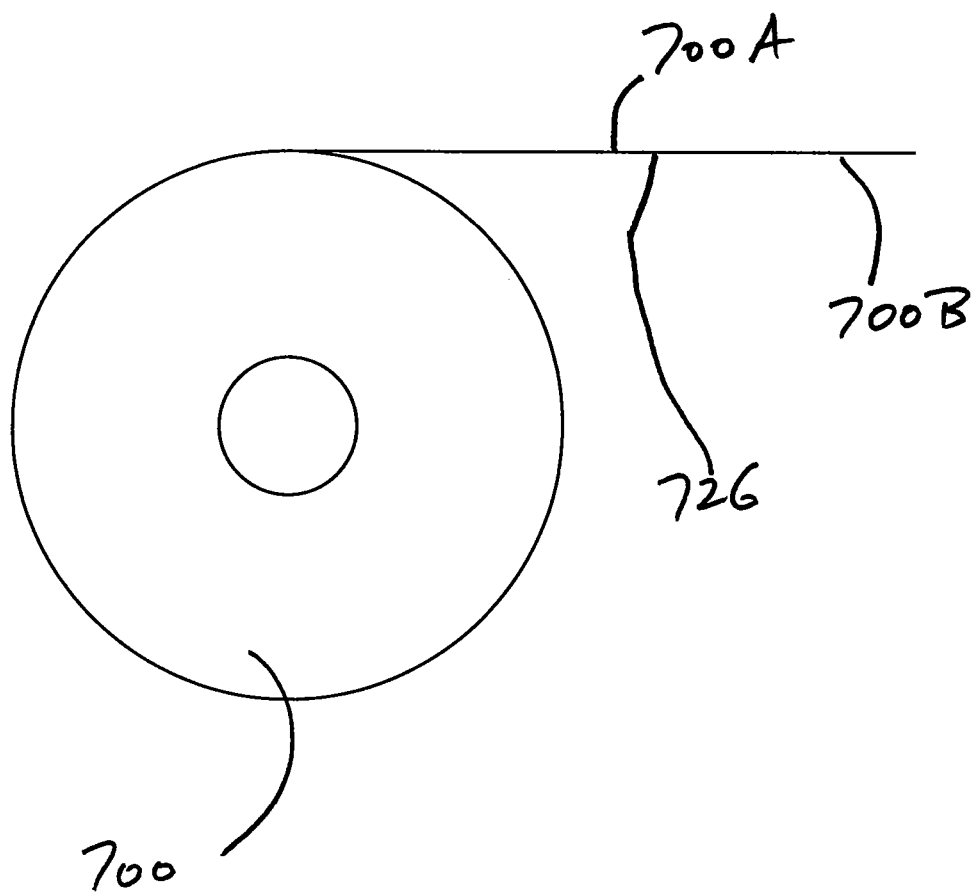
FIG. 48 shows a side view of a linerless label roll according to at least one embodiment of the present disclosure.

FIG. 48 shows a side view of linerless label roll 700 according to at least one embodiment of the present disclosure. In at least one embodiment, linerless label roll 700 comprises a continuous roll of label material having upper side 700A and lower side 700B. Adhesive 726 at least partially covers lower side 700B. According to the present disclosure, linerless label roll 700 does not include any carrier material or other liner. Upper side 700A is at least partially coated with a release coating to prevent the permanent adhesion of adhesive 726 to adjacent surfaces of linerless label roll 700, thereby facilitating the unrolling and use of linerless label roll 700 as discussed hereinafter.

Figure 49:
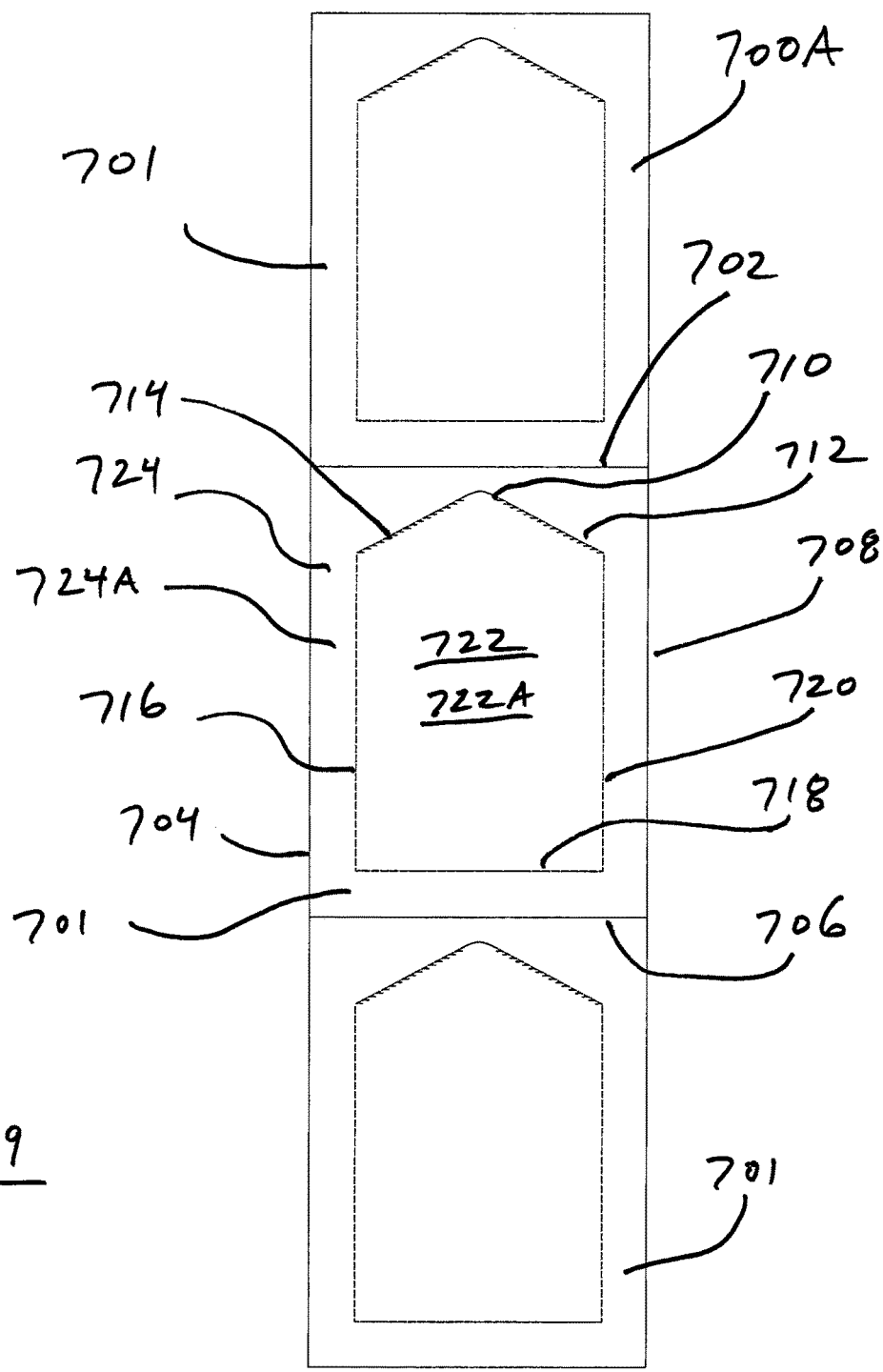
FIG. 49 shows a top view of a linerless label roll according to at least one embodiment of the present disclosure.

FIG. 49 shows upper side 700A of linerless label roll 700 according to at least one embodiment of the present disclosure. In at least one embodiment of the present disclosure, linerless label roll 700 comprises a label stock material such as, for example, paper, polyester, or another polymer material. In at least one embodiment of the present disclosure, linerless label roll 700 comprises a label stock material receptive to the printing of indicia thereon. For example, linerless label roll 700 may be exposed to an ink jet printer, a laser printer, a thermal transfer printer, a direct thermal printer, or another type of printing device capable of applying indicia to linerless label roll 700. The inks, toners, and/or other printing materials used in the application of indicia to linerless label roll 700 are selected to be compatible with the printing device used to apply such indicia, the material used for linerless label roll 700, and the intended use of linerless label roll 700.

As shown in FIG. 49, linerless label roll 700 comprises a plurality of labels 701 in a continuous web. In at least one embodiment of the present disclosure, each label 701 is bounded by leading edge 702, trailing edge 706, and side edges 704, 708. Each label 701 also comprises removable region 722 and frame region 724. Removable region 722 comprises removable region upper surface 722A, and is bounded by lines of weakness 710, 712, 714, 716, 718, 720. Frame region 724 comprises the portion of each label 701 outside of lines of weakness 710, 712, 714, 716, 718, 720, but within leading edge 702, trailing edge 706, and side edges 704, 708. As shown in FIG. 49, frame region 724 comprises frame region upper surface 724A. In at least one embodiment of the present disclosure, indicia is added to upper side 700A of each label 701. For example, indicia may be added to removable region upper surface 722A of each label 701, or to frame region upper surface 724A of each label 701, or to both removable region upper surface 722A and frame region upper surface 724A of each label 701.

Lines of weakness 710, 712, 714, 716, 718, 720 serve to weaken the boundary between removable region 722 and frame region 724, facilitating the removal of removable region 722 from frame region 724. Lines of weakness 710, 712, 714, 716, 718, 720 may comprise cuts or perforations that extend partially or completely through each label 701.

In at least one embodiment, line of weakness 710 comprises a curvilinear cut that completely severs removable region 722 from frame region 724. In at least one embodiment, line of weakness 710 comprises a curvilinear cut that is the connecting an end of line of weakness 712 to an end of line of weakness 714.

In at least one embodiment, lines of weakness 712, 714 each comprises a series of angular perforations generally having a V-shape or a Y-shape. The vertex of each angular perforation of line of weakness 712 is oriented in the direction of line of weakness 720, as shown in FIG. 49. The series of angular perforations comprising line of weakness 712 is arranged so that one side of each angular perforation is substantially coincident with a line extending between an end of line of weakness 710 and an end of line of weakness 720, and the other side of each angular perforation is oriented toward removable region 722 rather than toward frame region 724. The vertex of each angular perforation of line of weakness 714 is oriented in the direction of line of weakness 716, as shown in FIG. 49. The series of angular perforations comprising line of weakness 714 is arranged so that one side of each angular perforation is substantially coincident with a line extending between an end of line of weakness 710 and an end of line of weakness 716, and the other side of each angular perforation is oriented toward removable region 722 rather than toward frame region 724.

In at least one embodiment, the angle between line of weakness 712 and lines of weakness 720 is greater than 900. In at least one embodiment, the angle between line of weakness 714 and lines of weakness 716 is greater than 900. In at least one embodiment, the angle between line of weakness 718 and line of weakness 720 is about 900. In at least one embodiment, the angle between line of weakness 718 and line of weakness 716 is about 900. The use of angular perforations in lines of weakness 712, 714, and the obtuse angles between line of weakness 712 and lines of weakness 720 and between line of weakness 714 and lines of weakness 716, facilitates removal of removable region 722 from frame 724 in one motion without tearing the material of removable region 722.

Figure 50:
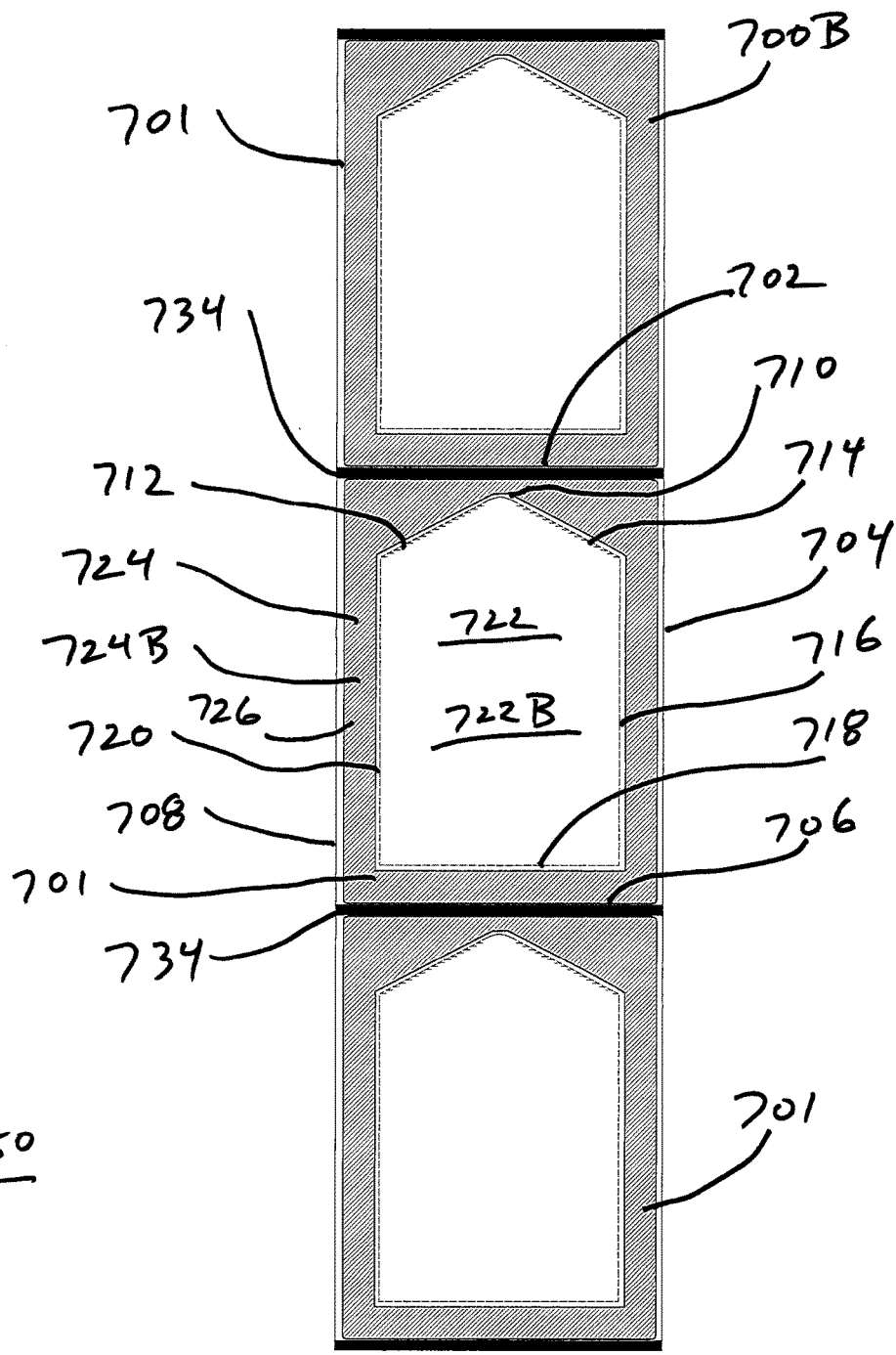
FIG. 50 shows a bottom view of a linerless label roll according to at least one embodiment of the present disclosure.

FIG. 50 shows lower side 700B of linerless label roll 700 according to at least one embodiment of the present disclosure. Shown in FIG. 50 is the plurality of labels 701, each bounded by leading edge 702, trailing edge 706, and side edges 704, 708. Removable region 722 of each label 701 also is shown in FIG. 50, bounded by lines of weakness 710, 712, 714, 716, 718, 720. Frame region 724 of each label 701 also is shown in FIG. 50, comprising the area of each label 701 outside of lines of weakness 710, 712, 714, 716, 718, 720, but within leading edge 702, trailing edge 706, and side edges 704, 708. As shown in FIG. 50, removable region 722 comprises removable region lower surface 722B. As shown in FIG. 50, frame region 724 comprises frame region lower surface 724B. As shown in FIG. 50, frame region lower surface 724B is at least partially covered with adhesive 726, while removable region lower surface 722B has reduced adhesive properties or may be completely free of adhesive. In at least one other embodiment of the present disclosure, removable region lower surface 722B and frame region lower surface 724B are fully or partially covered with adhesive 726. In at least one embodiment of the present disclosure, indicia is added to lower side 700B of each label 701. For example, indicia may be added to removable region lower surface 722B of each label 701, or to any adhesive-free area of frame region lower surface 724B of each label 701, or to both removable region lower surface 722B and to any adhesive-free area of frame region lower surface 724B of each label 701.

In at least one embodiment of linerless label roll 700 according to the present disclosure, lower side 700B of linerless label roll 700 comprises a plurality of transverse stripes 734, as shown in FIG. 50. Each transverse stripe 734 comprises a color or shading of a region of lower side 700B of linerless label roll 700 that is different from the color of the remainder of lower side 700B of linerless label roll 700. In at least one embodiment of linerless label roll 700 according to the present disclosure, transverse stripes 734 are spaced at regular intervals on lower side 700B of linerless label roll 700. In such an embodiment, transverse stripes 734 are used in conjunction with a detection apparatus for purposes of synchronizing the dispensing of labels 701 as discussed hereinafter.

Figure 51:
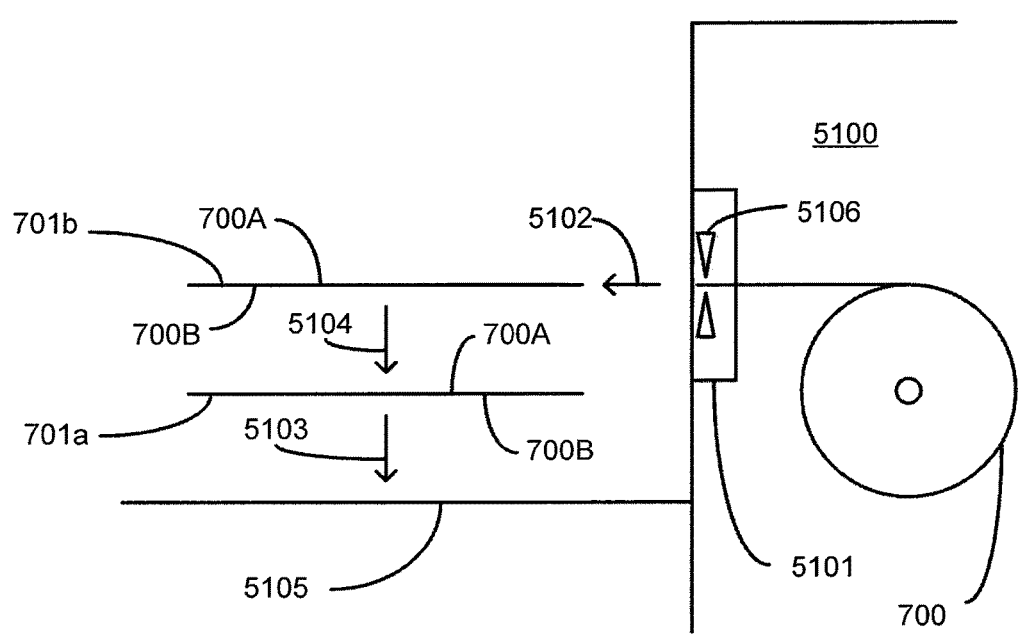
FIG. 51 shows two labels dispensed from a label printer onto a tray for future application to a surface, according to at least one embodiment of the present disclosure.

FIG. 51 shows the dispensing of labels 701 from linerless label roll 700 by label printer 5100, according to at least one embodiment of the present disclosure. Shown in FIG. 51 is label printer 5100, comprising a printing mechanism (not shown), dispensing mechanism 5101, and tray 5105. Dispensing mechanism 5101 comprises label cutter 5106. Label printer 5100 may comprise an ink jet printer, a laser printer, a thermal transfer printer, a direct thermal printer, or another type of printing device capable of applying indicia to labels 701. According to at least one embodiment of the present disclosure, tray 5105 is horizontal or substantially horizontal. In other embodiments tray 5105 may be oriented at an inclining or declining angle. As shown in FIG. 51, according to at least one embodiment of the present disclosure, linerless label roll 700 is provided to label printer 5100 in a manner anticipating printing by and dispensing from label printer 5100. As shown in FIG. 51, according to at least one embodiment of the present disclosure, two labels 701 (labels 701*a* and 701*b*) are dispensed in sequence from label printer 5100. Labels 701 are dispensed by dispensing mechanism 5101 of label printer 5100 in the direction of arrow 5102, and then come to rest, in registration with one another, on tray 5105. Thereafter, the pair of labels 701, in registration with one another and adhered together, can be retrieved from tray 5105, either mechanically (such as, for example, by a label applicator apparatus) or by hand, and applied to a surface (such as, for example, surface 601 of container 600), either mechanically (such as, for example, by a label applicator apparatus) or by hand.

In at least one embodiment of the present disclosure, prior to or in conjunction with the dispensing of first label 701*a* onto tray 5105, indicia is added to first label 701*a* by the printing mechanism (not shown) of label printer 5100. For example, where first label 701*a* is intended to serve as a packing list, such indicia may be added to removable region 722 of label 701, and such indicia may comprise the contents of a container to which first label 701*a* will be adhered, such as container 600.

In at least one embodiment of the present disclosure, first label 701*a* is separated from linerless label roll 700 by label cutter 5106, and then is dispensed from label printer 5100 by dispensing mechanism 5101 such that lower side 700B of first label 701*a* faces tray 5105. First label 701*a* moves in the direction shown by arrow 5103 until lower side 700B of first label 701*a* comes into contact with tray 5105. Because no pressure is exerted on first label 701*a*, adhesive 726 on lower side 700B of first label 701*a* does not adhere lower side 700B of first label 701*a* to tray 5105. In at least one embodiment, tray 5105 comprises a non-stick surface that retards adherence of adhesive 726 to tray 5105. Removable region lower surface 722B of first label 701*a* also is adjacent to tray 5105, but because removable region lower surface 722B of first label 701*a* is free of adhesive, removable region lower surface 722B of first label 701*a* also does not adhere to tray 5105.

In at least one embodiment of the present disclosure, linerless label roll 700 is advanced to present second label 701*b* to dispensing mechanism 5101. In at least one embodiment, prior to or in conjunction with the dispensing of second label 701*b* onto tray 5105, indicia is added to second label 701*b*, such as on removable region upper surface 722A of second label 701*b*, by the printer mechanism (not shown) of label printer 5100. For example, where second label 701*b* is intended to serve as a shipping label, such indicia may comprise the address to which a container on which labels 701 will be adhered, such as container 600, is to be shipped, a return address, bar codes, maxicodes, identifying numbers, and the like.

In at least one embodiment of the present disclosure, second label 701*b* is separated from linerless label roll 700 by label cutter 5106, and then is dispensed from label printer 5100 by dispensing mechanism 5101 such that lower side 700B of second label 701*b* faces upper side 700A of first label 701*a*. In at least one embodiment of the present disclosure, dispensing mechanism 5101 is adapted with a detection apparatus (not shown). The detection apparatus is configured to identify a transverse stripe 734 on lower side 700B of linerless label roll 700, and then to activate label cutter 5106 to separate second label 701*b* from linerless label roll 700 at or adjacent to transverse stripe 734.

Second label 701*b* moves in the direction shown by arrow 5104 until adhesive 726 on lower side 700B of second label 701*b* comes into contact with upper side 700A of first label 701*a*. In such an embodiment, adhesive 726 adheres lower side 700B of second label 700 to upper side 700A of first label 701*a* to a sufficient degree that the pair of labels can be handled as a unit, either mechanically (such as, for example, by a label applicator apparatus) or by hand. Removable region 722 of second label 701b also is adjacent to, and in registration with, removable region 722 of first label 701a, but because removable region lower surface 722B of second label 701b has reduced adhesive properties and/or may be completely free of adhesive, removable region lower surface 722B of second label 701b does not adhere to removable region upper surface 722A of first label 701a. In such an embodiment, after second label 701b is adhered to first label 701a, the adhered-together labels 701 then are applied simultaneously to a surface, such as a surface 601 of container 600, either mechanically (such as, for example, by a label applicator apparatus) or by hand.

Figure 52:
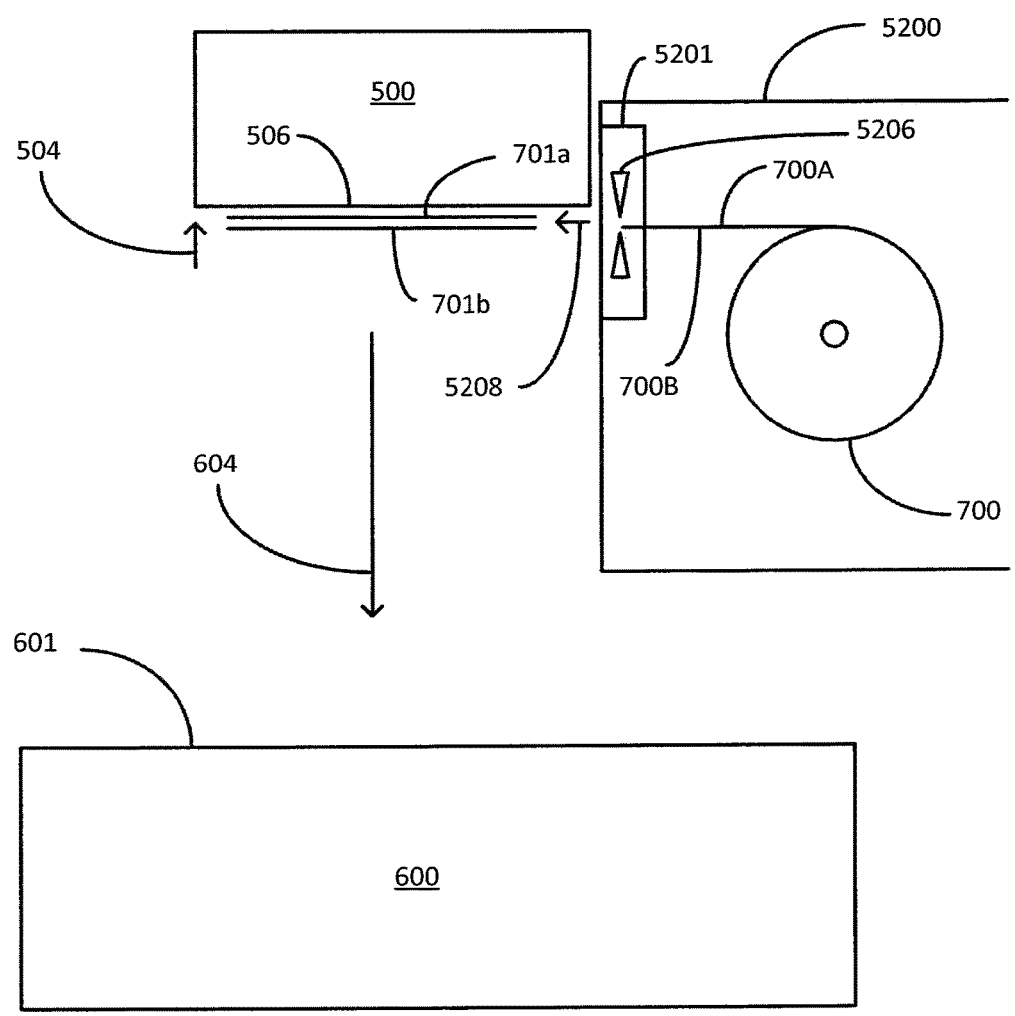
FIG. 52 shows two labels dispensed from a label printer onto a label applicator for future application to a surface, according to at least one embodiment of the present disclosure.

FIG. 52 shows the dispensing of labels 701 from linerless label roll 700 by label printer 5200, according to at least one embodiment of the present disclosure. Shown in FIG. 52 is label printer 5200, comprising a printing mechanism (not shown), and dispensing mechanism 5201. Dispensing mechanism 5201 comprises label cutter 5206. Label printer 5200 may comprise an ink jet printer, a laser printer, a thermal transfer printer, a direct thermal printer, or another type of printing device capable of applying indicia to labels 701. As shown in FIG. 52, according to at least one embodiment of the present disclosure, linerless label roll 700 is provided to label printer 5200 in a manner anticipating printing by and dispensing from label printer 5200. As shown in FIG. 52, according to at least one embodiment of the present disclosure, two labels 701 (labels 701a and 701b) are dispensed in sequence from label printer 5200.

In at least one embodiment of the present disclosure, first label 701a is separated from linerless label roll 700 by label cutter 5206, and then is dispensed from label printer 5200 by dispensing mechanism 5201. In at least one embodiment of the present disclosure, prior to or in conjunction with the dispensing of first label 701a from label printer 5200, indicia is added to first label 701a by the printing mechanism (not shown) of from label printer 5200. As first label 701a is dispensed from linerless label roll 700, first label 701a passes under label applicator 500. First label 701a is dispensed such that upper side 700A of first label 701a faces toward label applicator 500 and lower side 700B of first label 701a faces away from label applicator 500. Force 504 generated by label applicator 500 causes first label 701a to be lifted and held against screen 506. Screen 506 forms a lower surface of label applicator 500. In at least one embodiment of the present disclosure, force 504 is a vacuum force. In at least one embodiment of the present disclosure, force 504 is an electrostatic force.

After first label 701a is dispensed from linerless label roll 700, linerless label roll 700 is advanced in direction 5208. Second label 701b is separated from linerless label roll 700 by label cutter 5206, and then is dispensed from label printer 5200 by dispensing mechanism 5201. In at least one embodiment of the present disclosure, dispensing mechanism 5201 is adapted with a detection apparatus (not shown). The detection apparatus is configured to identify a transverse stripe 734 on lower side 700B of linerless label roll 700, and then to activate label cutter 5206 to separate second label 701b from linerless label roll 700 at or adjacent to transverse stripe 734. In at least one embodiment of the present disclosure, prior to or in conjunction with the dispensing of second label 701b from label printer 5200, indicia is added to second label 701b by the printing mechanism (not shown) of from label printer 5200.

As second label 701b is dispensed from linerless label roll 700, second label 701b passes under label applicator 500, against which first label 701a already is held. Second label 701b is dispensed such that upper side 700A of second label 701b faces toward label applicator 500 and lower side 700B of second label 701b faces away from label applicator 500. Force 504 generated by label applicator 500 causes second label 701b to be lifted and held against, and in registration with, first label 701a. At least a portion of lower side 700B of first label 701a comprises adhesive 726 after it is dispensed from linerless label roll 700. The action of force 504 on first label 701a and second label 701b causes adhesive 726 on lower side 700B of first label 701a to contact upper side 700A of second label 701b to a sufficient extent to adhere second label 701b to first label 701a.

The adhered-together labels 701 then are applied simultaneously to a surface, such as a surface 601 of container 600, by a label applicator 500. At least a portion of lower side 700B of second label 701b comprises adhesive 726 after it is dispensed from linerless label roll 700 and adhered to first label 701a. As shown in FIG. 52, label applicator 500 moves in direction 604, thereby moving the adhered-together labels 701 in direction 604 until lower side 700B of second label 701b is in contact with surface 601 of container 600. The pressure of label applicator 500 against surface 601 of container 600 causes adhesive 726 to adhere lower side 700B of second label 701b to surface 601 of container 600, and completes the adhesion of lower side 700B of first label 701a to upper side 700A of second label 701b.

In at least one embodiment, label applicator 500 comprises a printing capability such as, for example, a thermal transfer printer or a direct thermal printer. In such an embodiment, indicia may be applied to first label 701a and/or second label 701b by label applicator 500.

Figure 53:
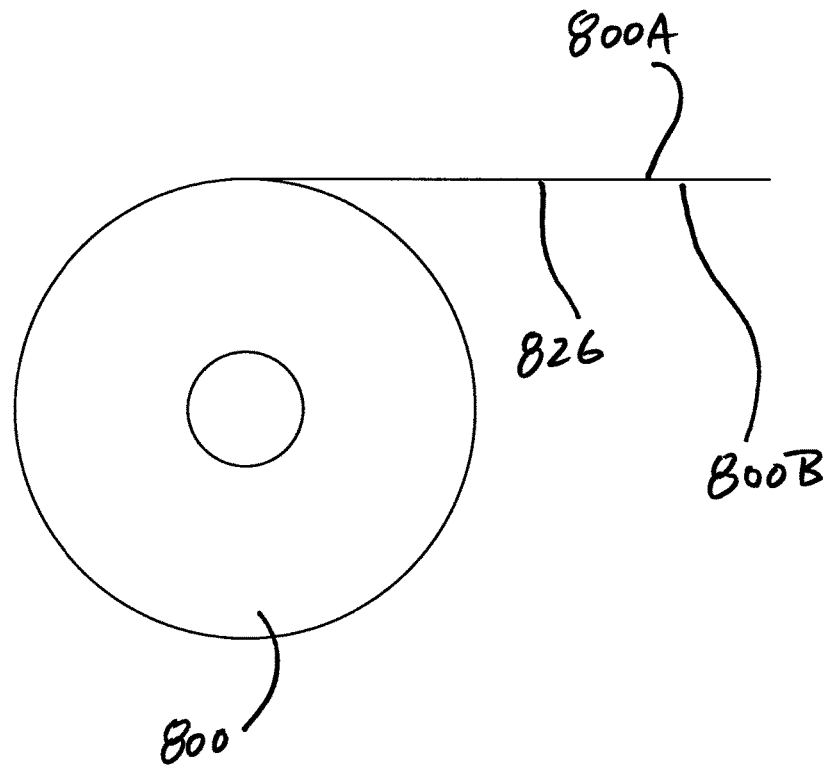
FIG. 53 shows a side view of a linerless label roll according to at least one embodiment of the present disclosure.

FIG. 53 shows a side view of linerless label roll 800 according to at least one embodiment of the present disclosure. In at least one embodiment, linerless label roll 800 comprises a continuous roll of label material having upper side 800A and lower side 800B. Adhesive 826 at least partially covers lower side 800B. According to the present disclosure, linerless label roll 800 does not include any carrier material or other liner. Upper side 800A is at least partially coated with a release coating to prevent the permanent adhesion of adhesive 826 to adjacent surfaces of linerless label roll 800, thereby facilitating the unrolling of linerless label roll 800 as discussed hereinafter.

Figure 54:
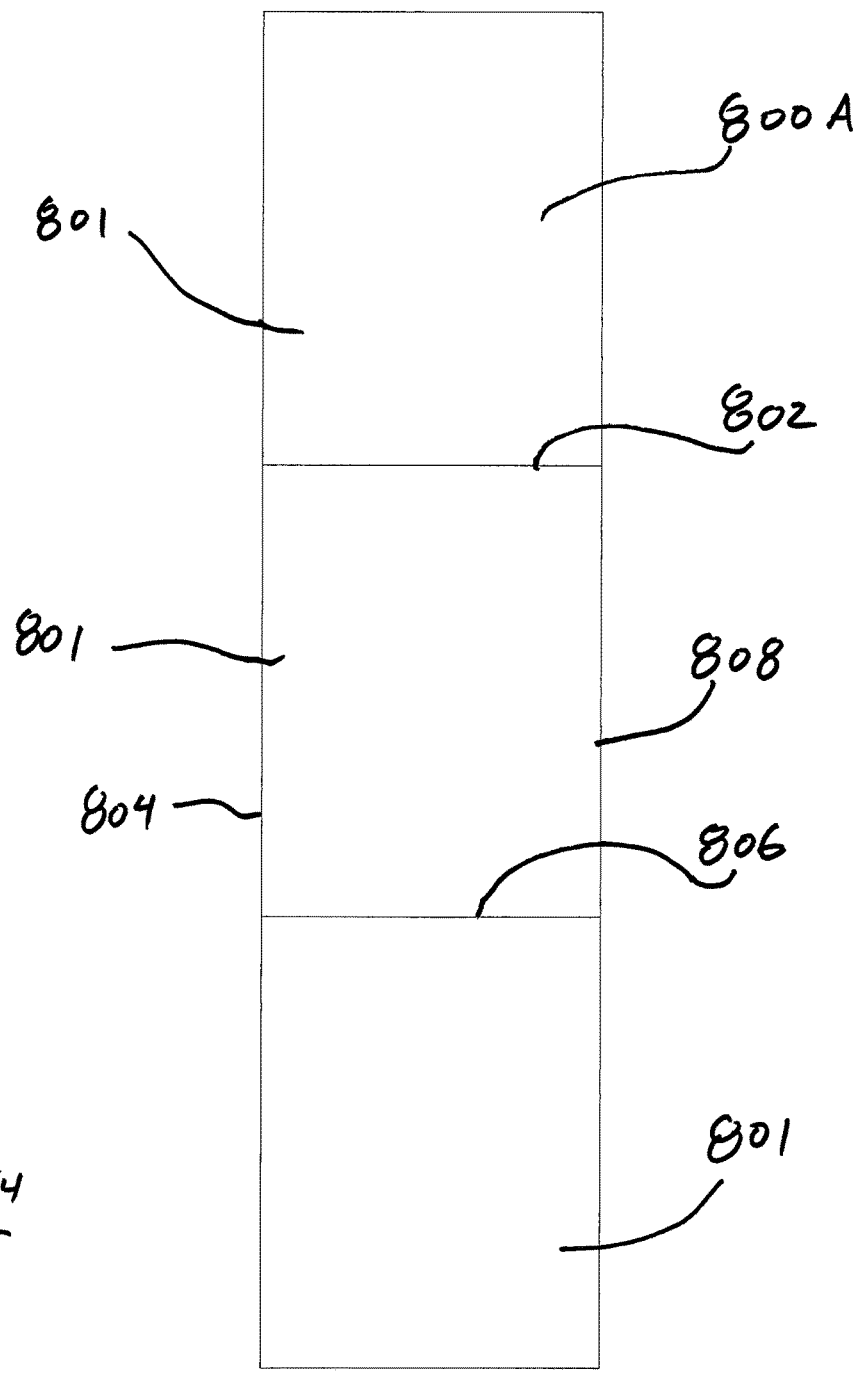
FIG. 54 shows a top view of a linerless label roll according to at least one embodiment of the present disclosure.

FIG. 54 shows upper side 800A of linerless label roll 800 according to at least one embodiment of the present disclosure. In at least one embodiment of the present disclosure, linerless label roll 800 comprises a label stock material such as, for example, paper, polyester, or another polymer material. In at least one embodiment of the present disclosure, linerless label roll 800 comprises a label stock material receptive to the printing of indicia thereon. For example, linerless label roll 800 may be exposed to an ink jet printer, a laser printer, a thermal transfer printer, a direct thermal printer, or another type of printing device capable of applying indicia to linerless label roll 800. The inks, toners, and/or other printing materials used in the application of indicia to linerless label roll 800 are selected to be compatible with the printing device used to apply such indicia, the material used for linerless label roll 800, and the intended use of linerless label roll 800.

As shown in FIG. 54, linerless label roll 800 comprises a plurality of labels 801 in a continuous web. In at least one embodiment of the present disclosure, each label 801 is bounded by leading edge 802, trailing edge 806, and side edges 804, 808. In at least one embodiment of the present disclosure, indicia is added to upper side 800A of each label 801.

Figure 55:
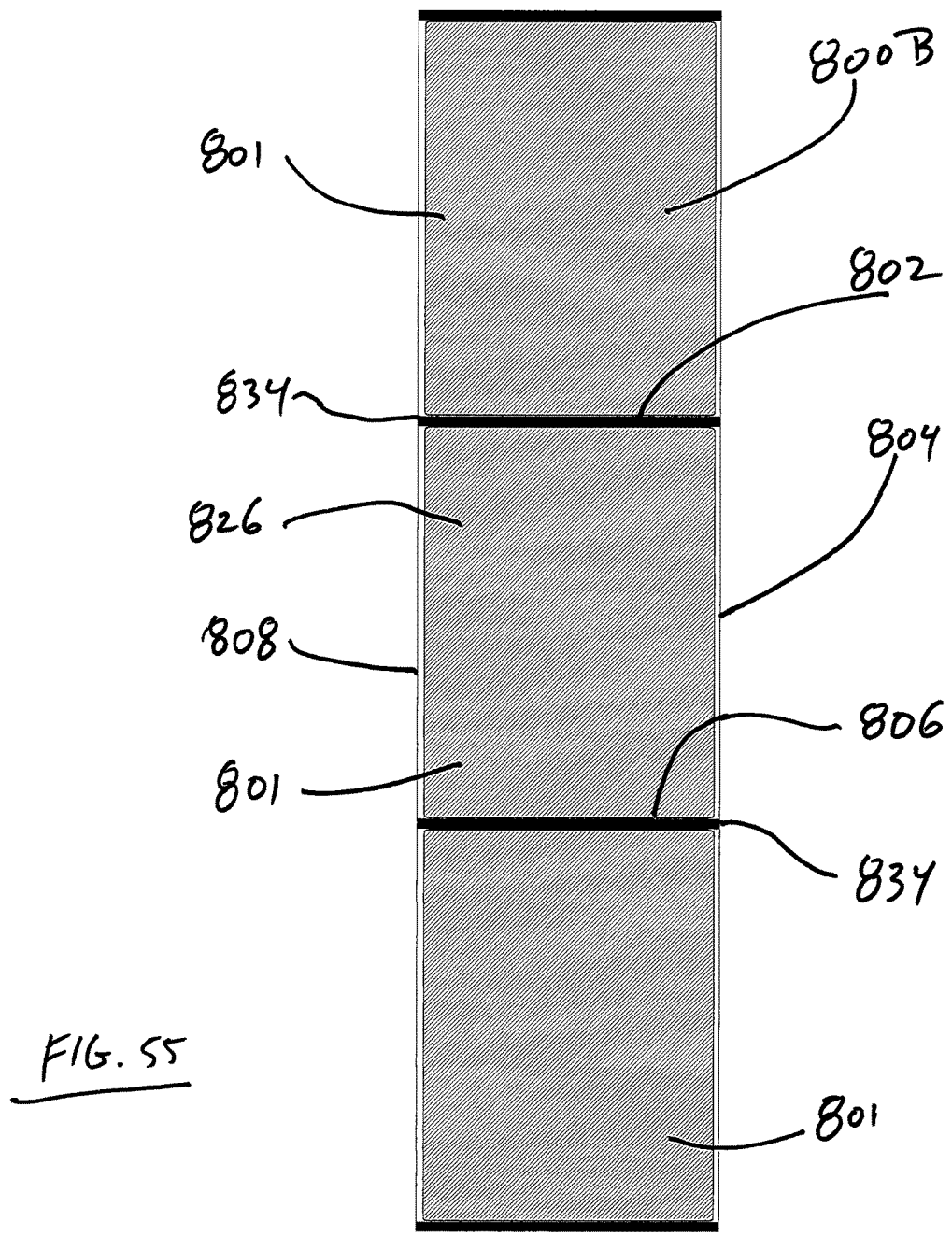
FIG. 55 shows a bottom view of a linerless label roll according to at least one embodiment of the present disclosure.

FIG. 55 shows lower side 800B of linerless label roll 800 according to at least one embodiment of the present disclosure. Shown in FIG. 55 is the plurality of labels 801, each bounded by leading edge 802, trailing edge 806, and side edges 804, 808. As shown in FIG. 55, frame region lower side 800B is at least partially covered with adhesive 826. In at least one embodiment of the present disclosure, indicia is added to lower side 800B of each label 801, or in any adhesive-free area of lower side 800B.

In at least one embodiment of linerless label roll 800 according to the present disclosure, lower side 800B of linerless label roll 800 comprises a plurality of transverse stripes 834, as shown in FIG. 55. Each transverse stripe 834 comprises a color or shading of a region of lower side 800B of linerless label roll 800 that is different from the color of the remainder of lower side 800B of linerless label roll 800. In at least one embodiment of linerless label roll 800 according to the present disclosure, transverse stripes 834 are spaced at regular intervals on lower side 800B of linerless label roll 800. In such an embodiment, transverse stripes 834 are used in conjunction with a detection apparatus for purposes of synchronizing the dispensing of labels 801 as discussed hereinafter.

Figure 56:
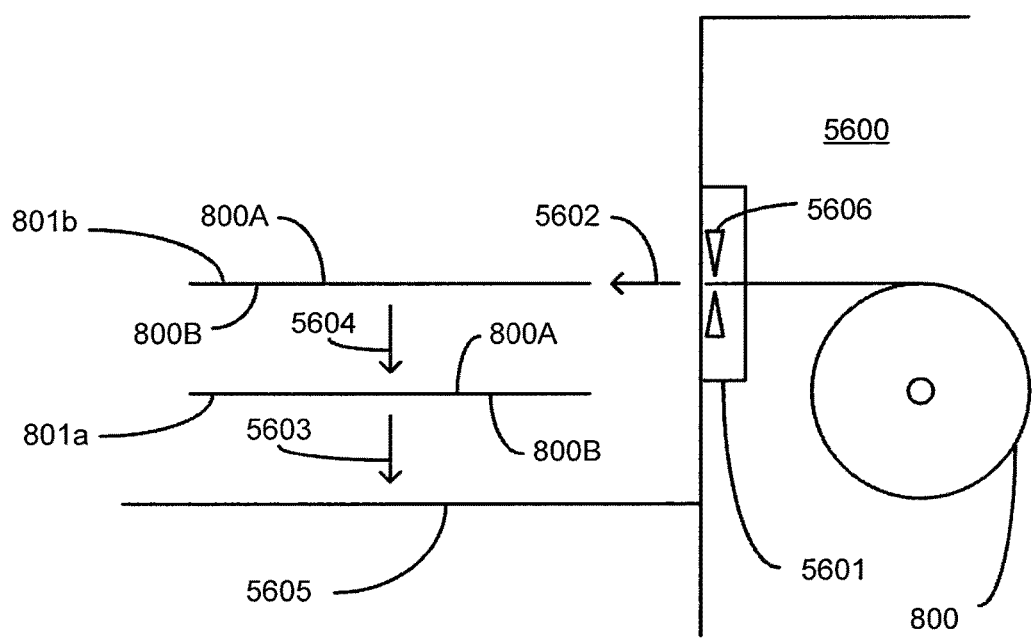
FIG. 56 shows two labels dispensed from a label printer onto a tray for future application to a surface, according to at least one embodiment of the present disclosure.

FIG. 56 shows the dispensing of labels 801 from linerless label roll 800 by label printer 5600, according to at least one embodiment of the present disclosure. Shown in FIG. 56 is label printer 5600, comprising a printing mechanism (not shown), dispensing mechanism 5601, and tray 5605. Dispensing mechanism 5601 comprises label cutter 5606. Label printer 5600 may comprise an ink jet printer, a laser printer, a thermal transfer printer, a direct thermal printer, or another type of printing device capable of applying indicia to labels 801. According to at least one embodiment of the present disclosure, tray 5605 is horizontal or substantially horizontal. In other embodiments tray 5605 may be oriented at an inclining or declining angle. As shown in FIG. 56, according to at least one embodiment of the present disclosure, linerless label roll 800 is provided to label printer 5600 in a manner anticipating printing by and dispensing from label printer 5600. As shown in FIG. 56, according to at least one embodiment of the present disclosure, two labels 801 (labels 801a and 801b) are dispensed in sequence from label printer 5600. Labels 801 are dispensed by dispensing mechanism 5601 of label printer 5600 in the direction of arrow 5602, and then come to rest, in registration with one another, on tray 5605. Thereafter, the pair of labels 801, in registration with one another and adhered together, can be retrieved from tray 5605, either mechanically (such as, for example, by a label applicator apparatus) or by hand, and applied to a surface (such as, for example, surface 601 of container 600), either mechanically (such as, for example, by a label applicator apparatus) or by hand.

In at least one embodiment of the present disclosure, prior to or in conjunction with the dispensing of first label 801a onto tray 5605, indicia is added to first label 801a by the printing mechanism (not shown) of label printer 5600. For example, such indicia may comprise the contents of a container to which first label 801a will be adhered, such as container 600.

In at least one embodiment of the present disclosure, first label 801a is separated from linerless label roll 800 by label cutter 5606, and then is dispensed from label printer 5600 by dispensing mechanism 5601 such that lower side 800B of first label 801a faces tray 5605. First label 801a moves in the direction shown by arrow 5603 until lower side 800B of first label 801a comes into contact with tray 5605. Because no pressure is exerted on first label 801a, adhesive 826 on lower side 800B of first label 801a does not adhere lower side 800B of first label 801a to tray 5605. In at least one embodiment, tray 5605 comprises a non-stick surface that retards adherence of adhesive 826 to tray 5605.

In at least one embodiment of the present disclosure, linerless label roll 800 is advanced to present second label 801b to dispensing mechanism 5601. In at least one embodiment, prior to or in conjunction with the dispensing of second label 801b onto tray 5605, indicia is added to second label 801b by the printer mechanism (not shown) of label printer 5600. For example, where second label 801b is intended to serve as a shipping label, such indicia may comprise the address to which a container on which labels 801 will be adhered, such as container 600, is to be shipped, a return address, bar codes, maxicodes, identifying numbers, and the like.

In at least one embodiment of the present disclosure, second label 801b is separated from linerless label roll 800 by label cutter 5606, and then is dispensed from label printer 5600 by dispensing mechanism 5601 such that lower side 800B of second label 801b faces upper side 800A of first label 801a. In at least one embodiment of the present disclosure, dispensing mechanism 5601 is adapted with a detection apparatus (not shown). The detection apparatus is configured to identify a transverse stripe 834 on lower side 800B of linerless label roll 800, and then to activate label cutter 5606 to separate second label 801b from linerless label roll 800 at or adjacent to transverse stripe 834.

Second label 801b moves in the direction shown by arrow 5604 until adhesive 826 on lower side 800B of second label 801b comes into contact with upper side 800A of first label 801a. In such an embodiment, adhesive 826 adheres lower side 800B of second label 800 to upper side 800A of first label 801a to a sufficient degree that the pair of labels can be handled as a unit, either mechanically (such as, for example, by a label applicator apparatus) or by hand. In such an embodiment, after second label 801b is adhered to first label 801a, the adhered-together labels 801 then are applied simultaneously to a surface, such as a surface 601 of container 600, either mechanically (such as, for example, by a label applicator apparatus) or by hand.

Figure 57:
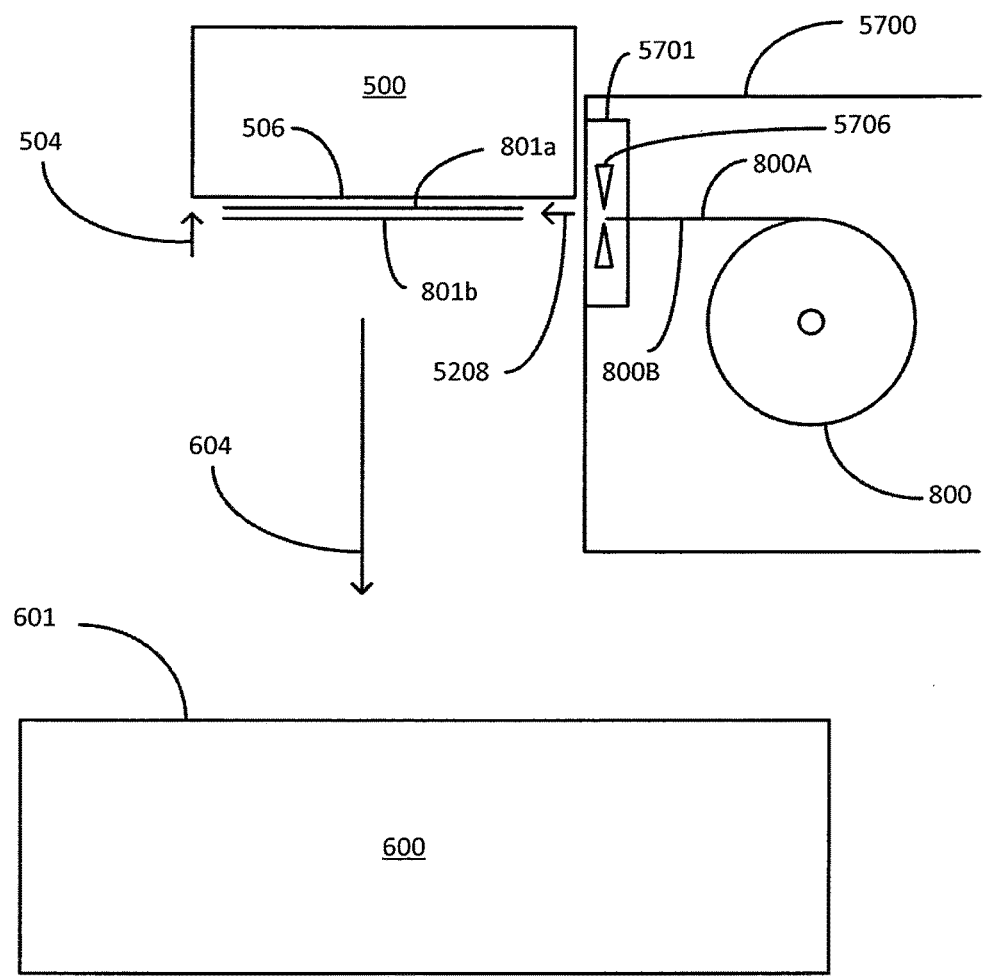
FIG. 57 shows two labels dispensed from a label printer onto a label applicator for future application to a surface, according to at least one embodiment of the present disclosure.

FIG. 57 shows the dispensing of labels 801 from linerless label roll 800 by label printer 5700, according to at least one embodiment of the present disclosure. Shown in FIG. 57 is label printer 5700, comprising a printing mechanism (not shown), and dispensing mechanism 5701. Dispensing mechanism 5701 comprises label cutter 5706. Label printer 5700 may comprise an ink jet printer, a laser printer, a thermal transfer printer, a direct thermal printer, or another type of printing device capable of applying indicia to labels 801. As shown in FIG. 57, according to at least one embodiment of the present disclosure, linerless label roll 800 is provided to label printer 5700 in a manner anticipating printing by and dispensing from label printer 5700. As shown in FIG. 57, according to at least one embodiment of the present disclosure, two labels 801 (labels 801a and 801b) are dispensed in sequence from label printer 5700.

In at least one embodiment of the present disclosure, first label 801a is separated from linerless label roll 800 by label cutter 5706, and then is dispensed from label printer 5700 by dispensing mechanism 5701. As first label 801a is dispensed from linerless label roll 800, first label 801a passes under label applicator 500. First label 801a is dispensed such that upper side 800A of first label 801a faces toward label applicator 500 and lower side 800B of first label 801a faces away from label applicator 500. Force 504 generated by label applicator 500 causes first label 801a to be lifted and held against screen 506. Screen 506 forms a lower surface of label applicator 500. In at least one embodiment of the present disclosure, force 504 is a vacuum force. In at least one embodiment of the present disclosure, force 504 is an electrostatic force.

After first label 801a is dispensed from linerless label roll 800, linerless label roll 800 is advanced in direction 5208. Second label 801b is separated from linerless label roll 800 by label cutter 5706, and then is dispensed from label printer 5700 by dispensing mechanism 5701. In at least one embodiment of the present disclosure, dispensing mechanism 5701 is adapted with a detection apparatus (not shown). The detection apparatus is configured to identify a transverse stripe 834 on lower side 800B of linerless label roll 800, and then to activate label cutter 5706 to separate second label 801b from linerless label roll 800 at or adjacent to transverse stripe 834. In at least one embodiment of the present disclosure, prior to or in conjunction with the dispensing of second label 801b from label printer 5700, indicia is added to second label 801b by the printing mechanism (not shown) of from label printer 5700.

As second label 801b is dispensed from linerless label roll 800, second label 801b passes under label applicator 500, against which first label 801a already is held. Second label 801b is dispensed such that upper side 800A of second label 801b faces toward label applicator 500 and lower side 800B of second label 801b faces away from label applicator 500. Force 504 generated by label applicator 500 causes second label 801b to be lifted and held against, and in registration with, first label 801a. At least a portion of lower side 800B of first label 801a comprises adhesive 726 after it is dispensed from linerless label roll 800. The action of force 504 on first label 801a and second label 801b causes adhesive 726 on lower side 800B of first label 801a to contact upper side 800A of second label 801b to a sufficient extent to adhere second label 801b to first label 801a.

The adhered-together labels 801 then are applied simultaneously to a surface, such as a surface 601 of container 600, by a label applicator 500. At least a portion of lower side 800B of second label 801b comprises adhesive 726 after it is dispensed from linerless label roll 800 and adhered to first label 801a. As shown in FIG. 57, label applicator 500 moves in direction 604, thereby moving the adhered-together labels 801 in direction 604 until lower side 800B of second label 801b is in contact with surface 601 of container 600. The pressure of label applicator 500 against surface 601 of container 600 causes adhesive 726 to adhere lower side 800B of second label 801b to surface 601 of container 600, and completes the adhesion of lower side 800B of first label 801a to upper side 800A of second label 801b.

In at least one embodiment, label applicator 500 comprises a printing capability such as, for example, a thermal transfer printer or a direct thermal printer. In such an embodiment, indicia may be applied to first label 801a and/or second label 801b by label applicator 500.

While this disclosure has been described as having preferred designs, the apparatus and methods according to the present disclosure can be further modified within the scope and spirit of this disclosure. This application is therefore intended to cover any variations, uses, or adaptations of the disclosure using its general principles. For example, any method disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains.

We claim:

1. A method of assembling a multi-layer label, the method comprising the steps of:
providing a label dispensing apparatus, said label dispensing apparatus comprising a dispensing mechanism and a receptacle;
providing a roll of linerless labels to said label dispensing apparatus, said roll of linerless labels being separable into at least a first label and a second label, said first label comprising a top side and an opposing underside, said second label comprising a top surface and an opposing undersurface;
with said label dispensing apparatus, dispensing said first label from said roll of linerless labels onto said receptacle, whereby said underside of said first label is against said receptacle and said top side of said first label is exposed;
while said first label is on said receptacle, with said label dispensing apparatus, dispensing said second label from said roll of linerless labels, wherein said second label alights on said first label such that said second label is layered over and aligned with said first label with said undersurface of said second label in contact with said top side of said first label.

2. The method of claim 1, wherein said first label comprises a first label removable region and said second label comprises a second label removable region, and wherein after said second label is dispensed onto said receptacle, said second label removable region and said first label removable region are in registration.

3. The method of claim 1, wherein said undersurface comprises an adhesive-free zone, and wherein said underside comprises an adhesive-free area, and wherein after said second label is dispensed onto said receptacle, said adhesive-free zone and said adhesive-free area are in registration.

4. The method of claim 3, wherein said first label comprises a first label removable region that includes said adhesive-free area and said second label comprises a second label removable region that includes said adhesive-free zone, and wherein after said second label is dispensed onto said receptacle, said second label removable region and said first label removable region are in registration.

5. The method of claim 1, wherein at least a portion of said underside comprises adhesive.

6. The method of claim 1, wherein at least a portion of said undersurface comprises adhesive.

7. The method of claim 1, wherein said first label comprises a first label leading edge and said second label comprises a second label leading edge, and wherein after said second label is dispensed onto said receptacle, said first label leading edge and said second label leading edge are in alignment.

8. The method of claim 1, wherein said first label comprises a first label trailing edge and said second label comprises a second label trailing edge, and wherein after said second label is dispensed onto said receptacle, said first label trailing edge and said second label trailing edge are in alignment.

9. The method of claim 1, wherein said first label comprises opposing first label side edges and said second label comprises opposing second label side edges, and wherein after said second label is dispensed onto said receptacle, said first label side edges and said second side edges are in alignment.

10. A method of applying a multi-layer label to a surface, the method comprising the steps of:
providing a roll of linerless labels, said roll of linerless labels being separable into at least a first label and a second label, said first label comprising a top side and an opposing adhesive-bearing underside, said second label comprising a top surface and an opposing adhesive-bearing undersurface;
dispensing said second label onto a label applicator apparatus, whereby said top surface of said second label is held in position against said label applicator apparatus and said undersurface is exposed;
while said second label is held in position against said label applicator apparatus, dispensing said first label onto said label applicator apparatus, whereby said top side of said first label is held in position against said undersurface of said second label.

11. The method of claim 10, further comprising the step of:
applying said second label and said first label to a surface simultaneously using said label applicator apparatus, whereby after application said underside of said first label is in contact with said surface and said undersurface of said second label is in contact with said top side of said first label.

12. The method of claim 10, wherein said first label comprises a first label removable region and said second label comprises a second label removable region, and wherein after said first label is dispensed onto said label applicator apparatus, said second label removable region and said first label removable region are in registration.

13. The method of claim 10, wherein said undersurface comprises an adhesive-free zone, and wherein said underside comprises an adhesive-free area, and wherein after said first label is dispensed onto said label applicator apparatus, said adhesive-free zone and said adhesive-free area are in registration.

14. The method of claim 13, wherein said first label comprises a first label removable region that includes said adhesive-free area and said second label comprises a second label removable region that includes said adhesive-free zone, and wherein after said first label is dispensed onto said label applicator apparatus, said second label removable region and said first label removable region are in registration.

15. The method of claim 10, wherein at least a portion of said underside comprises adhesive.

16. The method of claim 10, wherein at least a portion of said undersurface comprises adhesive.

17. The method of claim 10, wherein said first label comprises a first label leading edge and said second label comprises a second label leading edge, and wherein after said first label is dispensed onto said label applicator apparatus, said first label leading edge and said second label leading edge are in alignment.

18. The method of claim 10, wherein said first label comprises a first label trailing edge and said second label comprises a second label trailing edge, and wherein after said first label is dispensed onto said label applicator apparatus, said first label trailing edge and said second label trailing edge are in alignment.

19. The method of claim 10, wherein said first label comprises opposing first label side edges and said second label comprises opposing second label side edges, and wherein after said first label is dispensed onto said label applicator apparatus, said first label side edges and said second side edges are in alignment.

* * * * *